United States Patent
Handa et al.

(10) Patent No.: US 9,899,928 B2
(45) Date of Patent: Feb. 20, 2018

(54) POWER CONVERSION APPARATUS HAVING AN AUXILIARY COIL FUNCTIONING AS A FLYBACK TRANSFORMER

(71) Applicant: DENSO CORPORATION, Kariya, Aichi-pref. (JP)

(72) Inventors: Yuuichi Handa, Kariya (JP); Seiji Iyasu, Nishio (JP); Kimikazu Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/222,628

(22) Filed: Jul. 28, 2016

(65) Prior Publication Data

US 2017/0033696 A1    Feb. 2, 2017

(30) Foreign Application Priority Data

Jul. 31, 2015 (JP) .................................. 2015-152846
Nov. 9, 2015 (JP) .................................. 2015-219821
May 12, 2016 (JP) .................................. 2016-96305
Jul. 21, 2016 (JP) .................................. 2016-143725

(51) Int. Cl.
H02M 3/335 (2006.01)

(52) U.S. Cl.
CPC .............................. *H02M 3/33584* (2013.01)

(58) Field of Classification Search
CPC .............. H02M 1/08; H02M 3/33507; H02M 3/33553; H02M 3/33576
USPC ............ 363/17, 21.04, 21.06, 25, 26, 97, 98
See application file for complete search history.

(56) References Cited

U.S. PATENT DOCUMENTS

| | | | | |
|---|---|---|---|---|
| 4,675,796 A | * | 6/1987 | Gautherin | H01F 38/02 363/134 |
| 5,381,327 A | * | 1/1995 | Yan | H02M 3/33576 363/24 |
| 5,442,539 A | * | 8/1995 | Cuk | H02M 3/005 363/16 |
| 5,600,293 A | * | 2/1997 | Hunter | F42D 1/05 123/143 B |
| 5,706,182 A | * | 1/1998 | Faulk | H02M 3/005 363/131 |
| 5,815,380 A | * | 9/1998 | Cuk | H02M 3/33569 363/131 |
| 6,304,460 B1 | * | 10/2001 | Cuk | H02M 1/34 363/131 |

(Continued)

*Primary Examiner* — Jeffrey Sterrett
(74) *Attorney, Agent, or Firm* — Oliff PLC

(57) ABSTRACT

A power conversion apparatus includes a power conversion circuit, a choke coil, an auxiliary coil, and a rectifier element. The choke coil is disposed between the power conversion circuit and an input side direct current power source. The auxiliary coil is magnetically coupled to the choke coil and is connected in parallel with an output side circuit. The auxiliary coil is wound in a direction so that an excitation current flows from a negative electrode to a positive electrode of the output side circuit when an excitation current flows from a positive electrode to a negative electrode of the direct current power source through the choke coil. The rectifier element is series connection with the auxiliary coil, and cuts off power supply from the direct current power source to the output side circuit through the auxiliary coil and power supply from the output side circuit to the input side.

23 Claims, 37 Drawing Sheets

(56) References Cited

U.S. PATENT DOCUMENTS

2009/0108674 A1  4/2009  Ozaki et al.
2017/0033696 A1* 2/2017  Handa .............. H02M 3/33584

* cited by examiner

POWER CONVERSION APPARATUS HAVING AN AUXILIARY COIL FUNCTIONING AS A FLYBACK TRANSFORMER

CROSS REFERENCE TO RELATED APPLICATION

This application is based on Japanese Patent Application No. 2015-152846 filed on Jul. 31, 2015, Japanese Patent Application No. 2015-219821 filed on Nov. 9, 2015, Japanese Patent Application No. 2016-096305 filed on May 12, 2016, and Japanese Patent Application No. 2016-143725 filed on Jul. 21, 2016, the disclosures of which are incorporated herein by references.

TECHNICAL FIELD

The present disclosure relates to a power conversion apparatus.

BACKGROUND

A power supply control device described in JP 2007-295699 A outputs power supplied from a direct current power source (hereinafter referred to as a DC power supply), which is connected to an input side, via a transformer. The power supply control device described in JP 2007-295699 A (corresponding to US 2009/0108674 A1) includes a main electrical power storage device, a capacity load connected between power lines of the main electrical power storage device, and an auxiliary electrical power storage device connected between the power lines of the main electrical power storage device in parallel with the capacity load via a two-way converter. Power is exchanged between the main electrical power storage device and the auxiliary electrical power storage device with the use of the two-way converter. By supplying power of the auxiliary electrical power storage device to the capacity load using the two-way converter, the capacity load is charged until a voltage across the capacity load becomes equal to a voltage across the main electrical power storage device.

When the two-way converter in the power supply control device described in JP 2007-295699 A includes a choke coil on the auxiliary electrical power storage device side, the capacity load is charged by an increase and decrease of a current repetitively flowing through the choke coil. The power supply control device described in JP 2007-295699 A does not include a current limiting resistor or the like used to prevent an inrush current for reducing system cost and system size.

A current flowing through the choke coil decreases under a condition that a voltage across the auxiliary electrical power storage device is smaller than a value found by dividing a voltage across the capacity load by a turn ratio of coils. Herein, the coils are provided as the two-way converter. Hence, in a case where a voltage across the capacity load is small at the beginning of a charging operation, a current flowing through the choke coil continues to increase. As a result, a DC-to-DC converter may eventually deteriorate or break. On the other hand, by turning off switching elements to decrease a current flowing through the choke coil, a counter-electromotive force is induced by an avalanche current, and the switching elements may possibly deteriorate or break.

SUMMARY

In view of the foregoing difficulties, it is an object of the present disclosure to provide a power conversion apparatus which improves a power supplying efficiency and restricts performance deterioration and breaking of switching elements included in a circuit.

According to an aspect of the present disclosure, a power conversion apparatus which supplies power from an input side that is connected to a direct current power source to an output side includes a power conversion circuit, a choke coil, an auxiliary coil, and a rectifier element. The power conversion circuit includes a transformer and switching elements. The transformer includes a first coil and a second coil and the second coil is magnetically coupled to the first coil. The choke coil is disposed between the power conversion circuit and the direct current power source. The auxiliary coil is magnetically coupled to the choke coil and is connected in parallel with an output side circuit disposed on the output side. The auxiliary coil is wound in a direction so that an excitation current in the output side circuit flows from a negative electrode of the output side circuit to a positive electrode of the output side circuit when an excitation current of the direct current power source flows from a positive electrode of the direct current power source to a negative electrode of the direct current power source through the choke coil. The auxiliary coil functions as a flyback transformer. The rectifier element is connected to the auxiliary coil in series. The rectifier element cuts off a power supply from the direct current power source to the output side circuit through the auxiliary coil and cuts off a power supply from the output side circuit to the input side.

In the above power conversion apparatus, when a control is performed to include a period during which a power supply from the DC power supply is cut off, an avalanche current induced in the circuit is supplied to the output side via the auxiliary coil. Hence, performance deterioration or breaking of a circuit on the input side can be restricted. Herein, the performance deterioration or breaking of the circuit is caused by the avalanche current. Further, power remaining in the circuit on the input side can be supplied to the output side. Hence, power supplying efficiency to the output side can be enhanced while restricting performance deterioration and breaking of the circuit on the input side.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
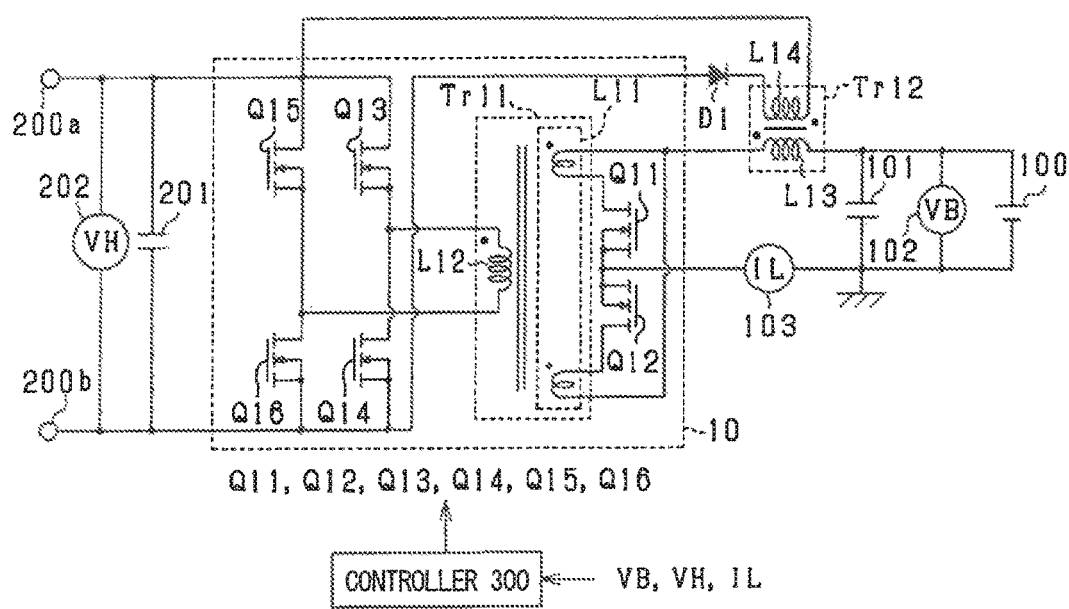
FIG. 1 is a circuit diagram showing a configuration of a power conversion apparatus according to a first embodiment of the present disclosure.

Hereinafter, respective embodiments will be described according to the drawings. In the respective embodiments below, same or equivalent portions are indicated by same reference symbols in the drawings and a same description applies to a portion indicated by the same reference symbol.

First Embodiment

A power conversion apparatus according to the present embodiment is installed to a hybrid car. The hybrid car is equipped with a secondary cell and a high-voltage storage battery. The secondary cell may be provided by ding a lead battery having a nominal voltage of 12 volts, and the high-voltage storage battery may be provided by a lithium-ion battery having a nominal voltage of several hundred volts.

FIG. 1 is a circuit diagram showing a configuration of the power conversion apparatus of the present embodiment. The power conversion apparatus of the present embodiment supplies power from a secondary cell 100 to a power supply target. The secondary cell 100, which supplies direct current (DC) power, is connected to an input side of the power conversion apparatus through a power conversion circuit 10, and the power supply target is connected to an output side of the power conversion apparatus.

The power conversion circuit 10 includes a transformer Tr11 and first through sixth switching elements Q11 through Q16 which are provided by MOSFETs. The transformer Tr11 includes a first coil L11 and a second coil L12 magnetically coupled to each other. The first coil L11 has a center tap. The number of turns in the second coil L12 is N/2 times the number of turns in the first coil L11. That is to say, the number of turns in the second coil L12 is N times the number of turns in the first coil L11 from either end to the center tap.

Both ends of the first coil L11 are respectively connected to a drain of the first switching element Q11 and a drain of the second switching element Q12. On the other hand, a source of the first switching element Q11 and a source of the second switching element Q12 are connected to each other.

The secondary cell 100 is connected to the power conversion circuit 10 via a choke coil L13. More specifically, one end of the choke coil L13 is connected to a positive electrode of the secondary cell 100 and the other end of the choke coil L13 is connected to the center tap of the first coil L11.

On the other hand, the source of the first switching element Q11 is connected with the source of the second switching element Q12 at a connection point, and a negative electrode of the secondary cell 100 is connected to the connection point. In addition, a capacitor 101 is connected to the secondary cell 100 in parallel.

One end of the second coil L12 is connected to a source of the third switching element Q13 and a drain of a fourth switching element Q14. The other end of the second coil L12 is connected to a source of the fifth switching element Q15 and a drain of the sixth switching element Q16. A drain of the third switching element Q13 and a drain of the fifth switching element Q15 are connected to a positive-electrode output terminal 200a. A source of the fourth switching element Q14 and a source of the sixth switching element Q16 are connected to a negative-electrode output terminal 200b. A capacitor 201 is connected in parallel with the power conversion circuit 10 between the positive-electrode output terminal 200a and the negative-electrode output terminal 200b.

The power conversion apparatus further includes an auxiliary coil L14 magnetically coupled to the choke coil L13. The choke coil L13 and the auxiliary coil L14 together form a second transformer Tr12 functioning as a flyback transformer. The auxiliary coil L14 is connected to the power conversion circuit 10 in parallel, and is connected between the positive-electrode output terminal 200a and the negative-electrode output terminal 200b.

The auxiliary coil L14 is wound in a direction so that an excitation current flows from a negative electrode side to a positive electrode side in a circuit disposed on an output side when an excitation current flows through the choke coil L13 from a positive electrode side of the secondary cell 100 to a negative electrode side of the secondary cell 100. A turn ratio of the auxiliary coil L14 to the choke coil L13 is N:1. In addition, a diode D1 is connected to the auxiliary coil L14 in series on a side of the negative-electrode output terminal 200b. When a voltage is applied across the choke coil L13 from the positive electrode of the secondary cell 100, a power supply to the output side via the auxiliary coil L14 is cut off by the diode D1. When a voltage is applied across the auxiliary coil L14 from a side of the positive-electrode output terminal 200a, a power supply to the choke coil L13 is cut off by the diode D1.

The power conversion apparatus includes an input-side voltage detection portion 102 detecting an input-side voltage VB which is a voltage across the secondary cell 100, a current detection portion 103 detecting a reactor current IL which is a current flowing through the choke coil L13 (current flowing through a circuit on the input side), and an output-side voltage detection portion 202 detecting an output-side voltage VH which is a voltage on the output side (voltage across the capacitor 201). The power conversion apparatus further includes a controller 300, and the input-side voltage VB, the output-side voltage VH, and the reactor current IL detected by the corresponding detection portions are inputted to the controller 300.

The controller 300 performs a calculation on the basis of the inputted detection values, namely, the input-side voltage VB, the output-side voltage VH, and the reactor current IL, and sends a control signal to the first switching element Q11 and the second switching element Q12. Herein, the controller 300 performs a control by selecting one of first through third modes depending on a charging state of the capacitor 201 disposed on the output side.

Figure 2:
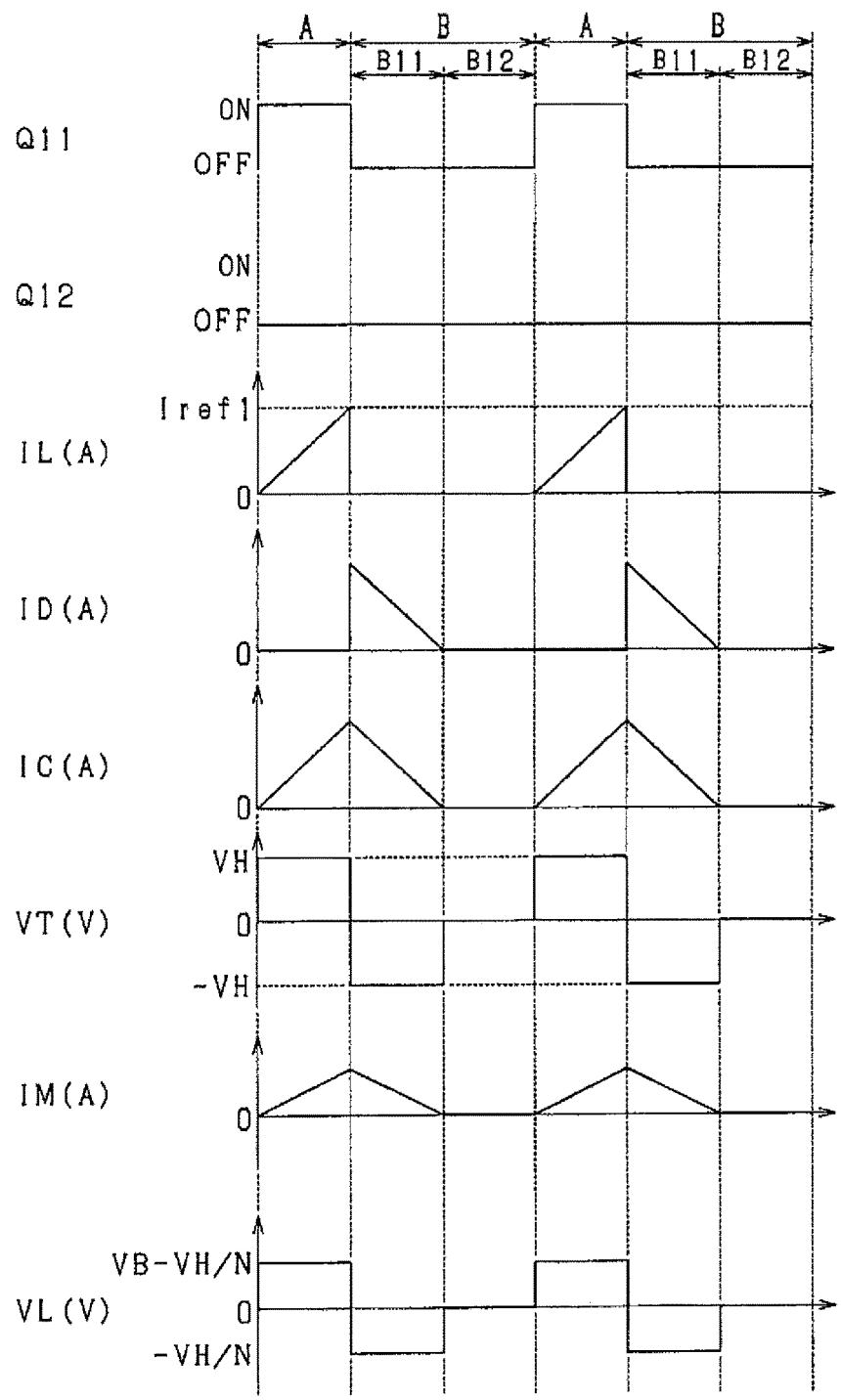
FIG. 2 is a time chart showing a first mode control.

A control in the first mode (hereinafter, referred to as a first mode control) will be described with reference to a time chart of FIG. 2. In the first mode control, a control A and a control B are alternately performed. In control A, the first switching element Q11 is in ON state and the second switching element Q12 is in OFF state. In the control B, both of the first switching element Q11 and the second switching element Q12 are in OFF states. In other words, the second switching element Q12 is normally in OFF state while the first switching element Q11 is alternately switched between ON state and OFF state.

In the control A, a variation in the reactor current IL per unit time is determined by a reactor voltage VL which is a voltage applied across the choke coil L13. The reactor voltage VL is found by subtracting, from the input-side voltage VB, a value found by dividing the output-side voltage VH by the turn ratio N. As to an output-side current IC which is a current flowing through the second coil L12, a variation per unit time is found by dividing a variation in the reactor current IL per unit time, dIL/dt, by the turn ratio N. An excitation voltage VT which is a voltage applied across the second coil L12 is equal to the output-side voltage VH. Because a time variation in an excitation current IM is found by dividing the excitation voltage VT by excitation inductance, the excitation current IM monotonically increases in a linear fashion. Herein, a flow direction from the positive-electrode output terminal 200a to the negative-electrode output terminal 200b is defined as a forward direction of the excitation current IM.

Figure 3A:
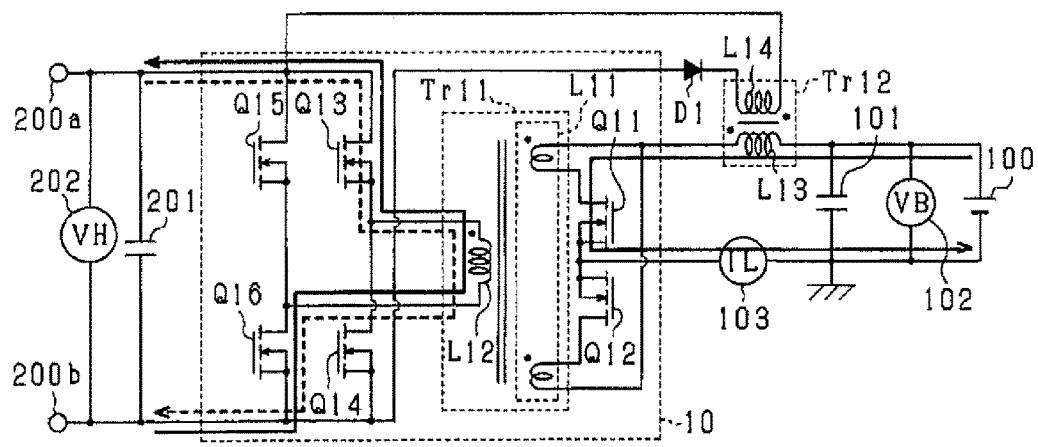
FIG. 3A and FIG. 3B are diagrams showing current pathways in the first mode control.

Current pathways during the execution of control A will be described with reference to FIG. 3A. In FIG. 3A, current pathways are indicated by arrows and a pathway of the excitation current IM is indicated by a broken-line arrow. On the side of the first coil L11, a current supplied from the secondary cell 100 takes a pathway along which the current sequentially passes through the choke coil L13, the first coil L11, and the first switching element Q11. On the side of the second coil L12, the current takes a pathway along which the current sequentially passes through the sixth switching element Q16, the second coil L12, and the third switching element Q13. The excitation current IM takes a pathway along which the excitation current IM sequentially passes through the third switching element Q13, the second coil L12, and the sixth switching element Q16.

Because the reactor current IL monotonically increases in the control A, the control B is performed to decrease the reactor current IL when the reactor current IL increases to a preliminarily determined value, herein, a first command value Iref1.

In the control B, the reactor current IL becomes zero. On the contrary, a counter-electromotive force is induced in the choke coil L13 and the reactor voltage VL takes a negative value of a value found by dividing the output-side voltage VH by the turn ratio N. Hence, a flyback current ID monotonically decreases in a linear fashion in response to the value of the reactor voltage VL. Accordingly, the output-side current IC also monotonically decreases in a linear fashion. The excitation voltage VT takes a negative value of the output-side voltage VH and therefore the excitation current IM monotonically decreases.

Figure 3B:
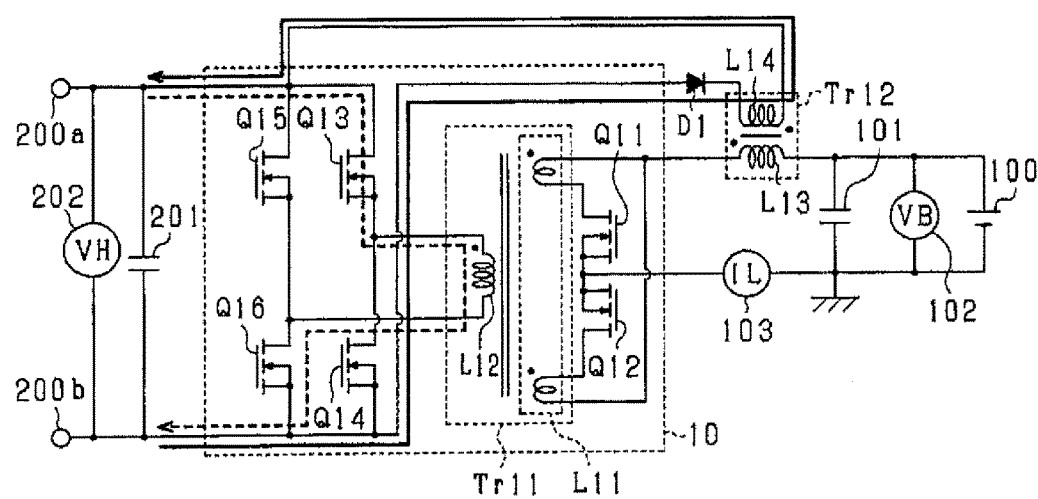

Current pathways during the execution of control B will be described with reference to FIG. 3B. The current pathways shown in the drawing are pathways in a period B11 which is a first half of the control B. In the control B, power is not supplied from the secondary cell 100 disposed on the first coil L11 side because both of the first switching element Q11 and the second switching element Q12 are controlled to remain OFF states. On the contrary, because a counter-electromotive force is induced due to the reactor current IL remaining in the choke coil L13, power is supplied on the second coil L12 side due to the reactor current IL via the auxiliary coil L14. The excitation current IM takes a pathway along which the excitation current IM sequentially passes through the third switching element Q13, the second coil L12, and the sixth switching element Q16. Because no current flows in a period B12 which is a second half of the control B, a description of current pathways is omitted herein.

Figure 4A:
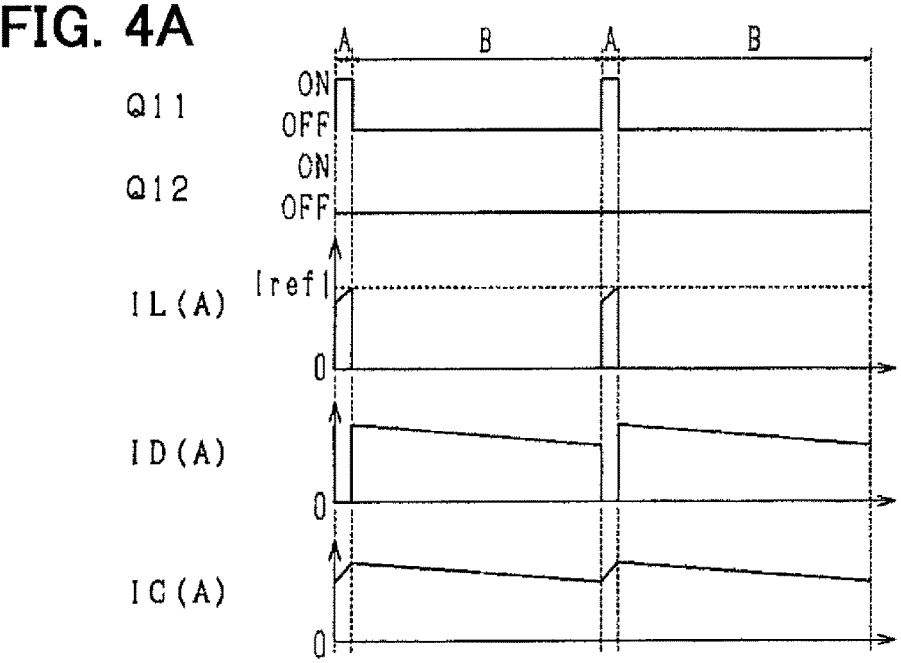
FIG. 4A through FIG. 4C are diagrams showing a control transition in the first mode control.

As described above, the flyback voltage ID in the first mode control monotonically decreases in a linear fashion in response to a value of the reactor voltage VL in the period during which the control B is performed. The reactor voltage VL changes corresponding to the output-side voltage VH in the control B. Hence, a decrease amount of the flyback current ID per unit time varies depending on a charge state of capacitor 201 disposed on the output side. The flyback current ID in such a case will be described with reference to FIG. 4A through FIG. 4C. FIG. 4A is a time chart in a state where the output-side voltage VH is close to zero volt. For example, the output-side voltage VH is close to zero at the beginning of a charging to the capacitor 201. Herein, the flyback current ID does not decrease sufficiently in the period of the control B, and the output-side current IC is supplied continuously via the transformer Tr11 in the period of the control A and is supplied continuously via the second transformer Tr12 in the period of the control B.

Figure 4B:
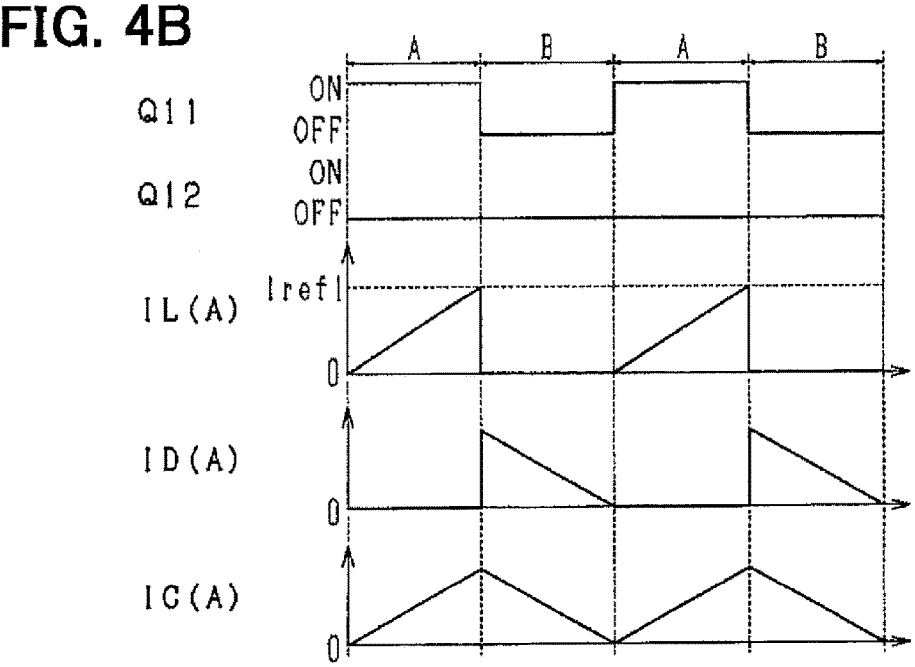

FIG. 4B is a time chart in a case where a value of the output-side voltage VH is approximately half a value found by multiplying the input-side voltage VB by the turn ratio N. As shown in the time chart, at this time, an increase amount of the output-side current IC per unit time in the control A is equal to a decrease amount of the output-side current IC per unit time in the control B. Hence, by setting the first command value Iref1 so that an execution period of the control A is equal to an execution period of the control B, the flyback current ID can be decreased to 0 at an end of the control B. Hence, an excessive increase of the reactor current IL and the flyback current ID can be restricted while the capacitor 201 is charged efficiently.

Figure 4C:
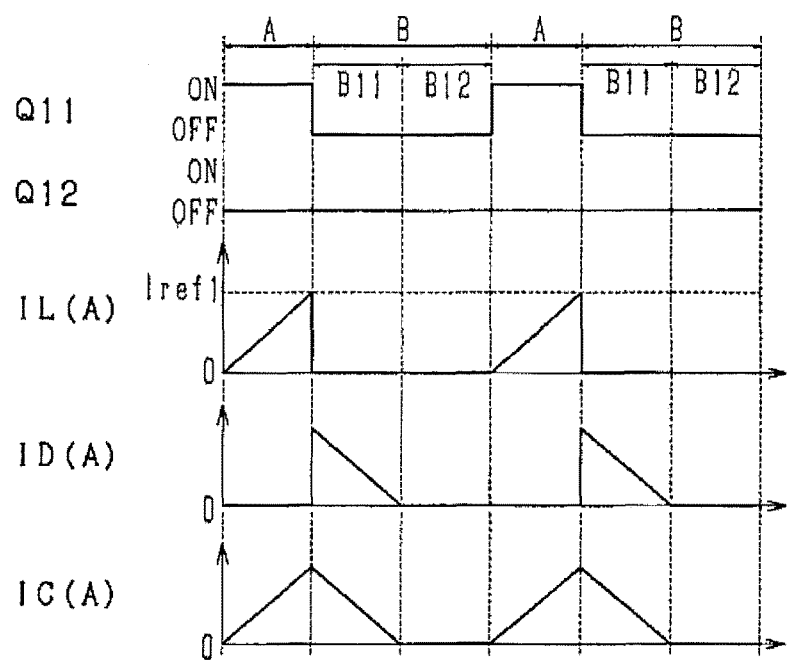

FIG. 4C is a time chart in a case where the capacitor 201 is charged further and a value of the output-side voltage VH becomes close to a value found by VB×N. Herein, during the period B12 which is the second half of the control B, the output-side current IC is set equal to zero.

Figure 5:
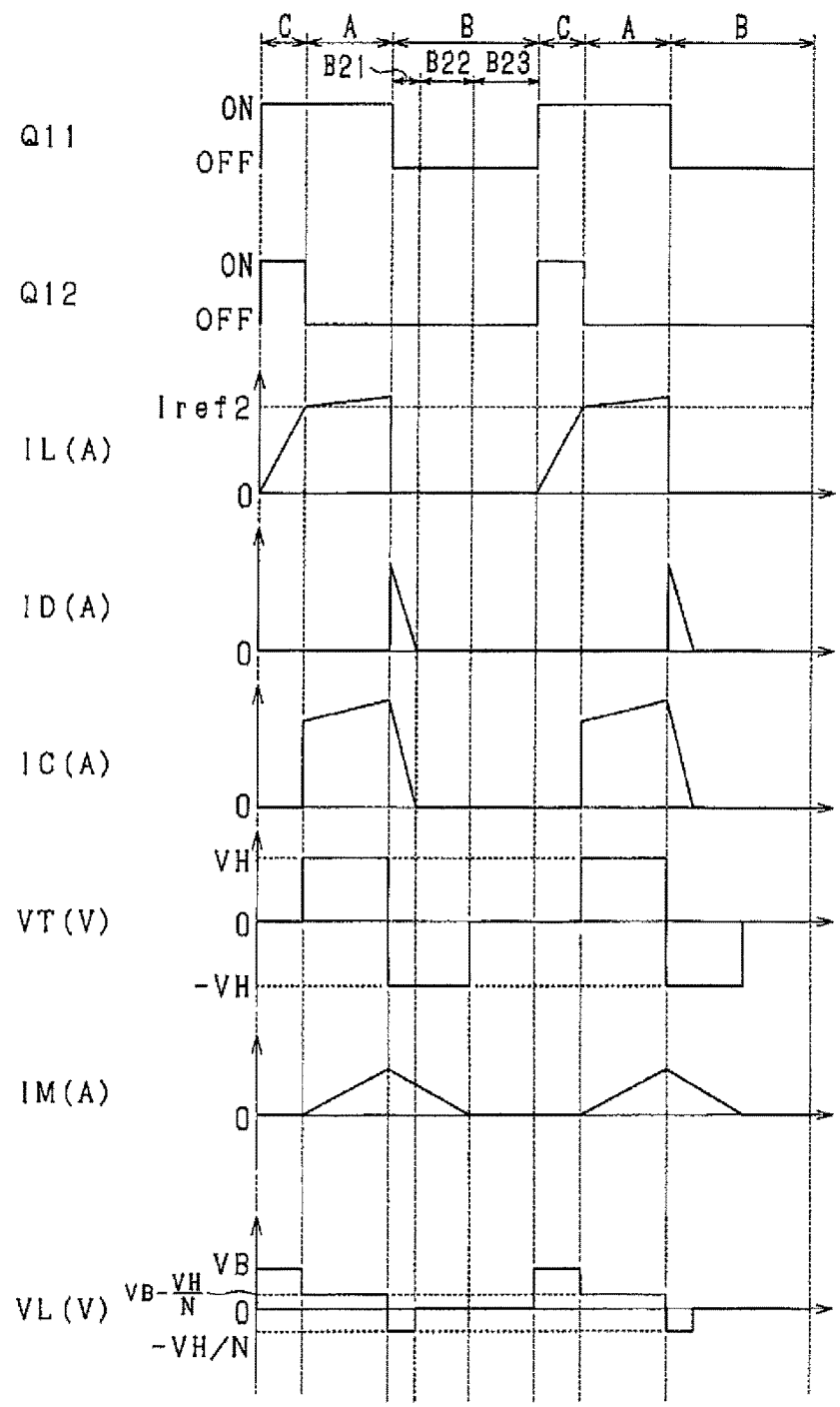
FIG. 5 is a time chart showing a second mode control.

A control in the second mode (hereinafter, referred to as the second mode control) will now be described with reference to a time chart of FIG. 5. In the second mode control, a control C, a control A, and a control B are sequentially performed, and are repeated in this sequence. In the control C, both of the first switching element Q11 and the second switching element Q12 are ON states. In the control A, the first switching element Q11 is in ON state and the second switching element Q12 is in OFF state. In the control B, both of the first switching element Q11 and the second switching element Q12 are in OFF states.

In the control C, the reactor voltage VL applied across the choke coil L13 is equal to the input-side voltage VB applied by the secondary cell 100. In short, the reactor current IL monotonically increases in a linear fashion. Herein, the output-side current IC is equal to zero because no current flows through the first coil L11.

Figure 6A:
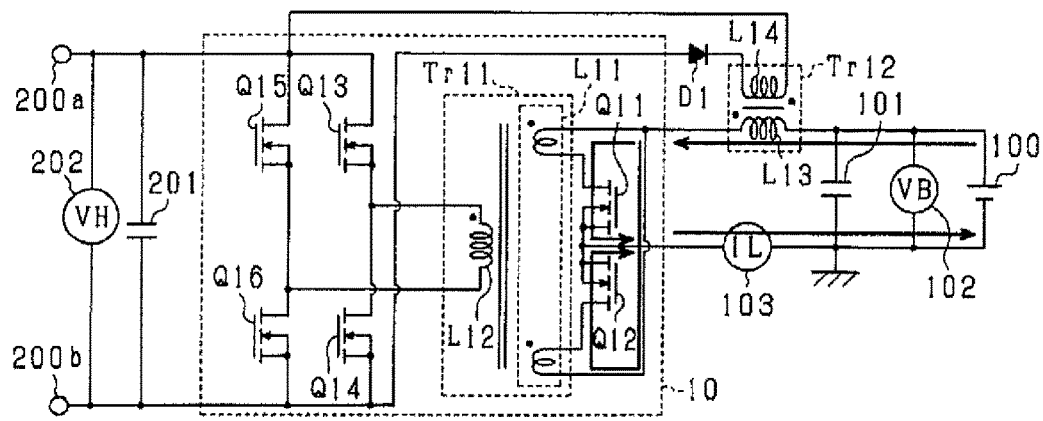
FIG. 6A to FIG. 6D are diagrams showing current pathways in the second mode control.

Current pathways during the execution of control C will be described with reference to FIG. 6A. Because both of the first switching element Q11 and the second switching element Q12 are ON states, power is not supplied from the first coil L11 to the second coil 112. In addition, a supply of power from the choke coil L13 to the auxiliary coil L14 is cut off by the diode D1. Hence, the reactor current IL flowing through the choke coil L13 increases during the control C.

The reactor current IL monotonically increases in the control C as described above. When the reactor current IL increases to a preliminarily determined value, such as a preliminarily determined second command value Iref2, the control C shifts to the control A.

Figure 6B:
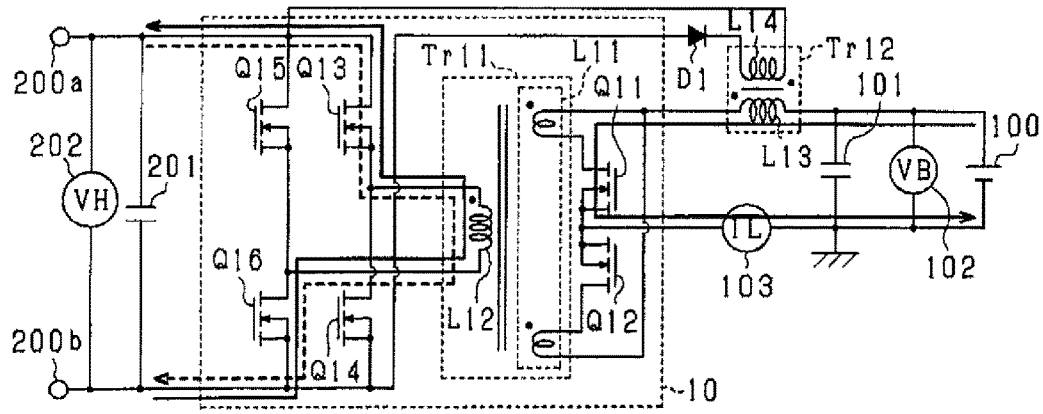

In the subsequent control A, as is shown in FIG. 6B, current pathways are same as the current pathways in the control A in the first mode control described above and a detailed description is omitted herein. The control A may be switched to the control B on condition that a predetermined time has elapsed from a start time of the control C or on condition that a predetermined time has elapsed from a start time of the control A. In the time chart of FIG. 5, the reactor current IL monotonically increases in the control A. It should be noted that the reactor current IL may remain the same or monotonically decrease depending on a relation between the input-side voltage VB and the output-side voltage VH.

In the control B, because both of the first switching element Q11 and the second switching element Q12 are in OFF states, a current is not supplied from the secondary cell 100 on the side of the first coil L11 and therefore the reactor current IL is equal to zero. On the contrary, a counter-electromotive force is induced in the choke coil L13 and the reactor voltage VL takes a negative value of a value found by dividing the output-side voltage VH by the turn ratio N. Hence, the flyback current ID monotonically decreases in a linear fashion. Accordingly, the output-side current IC also monotonically decreases in a linear fashion. The excitation voltage VT takes a negative value of the output-side voltage VH and therefore the excitation current IM monotonically decreases.

Figure 6C:
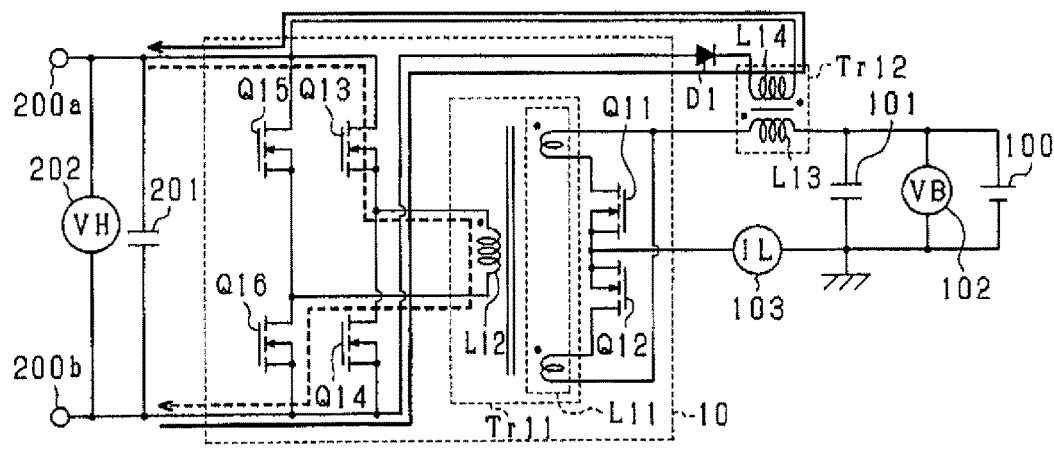
Figure 6D:
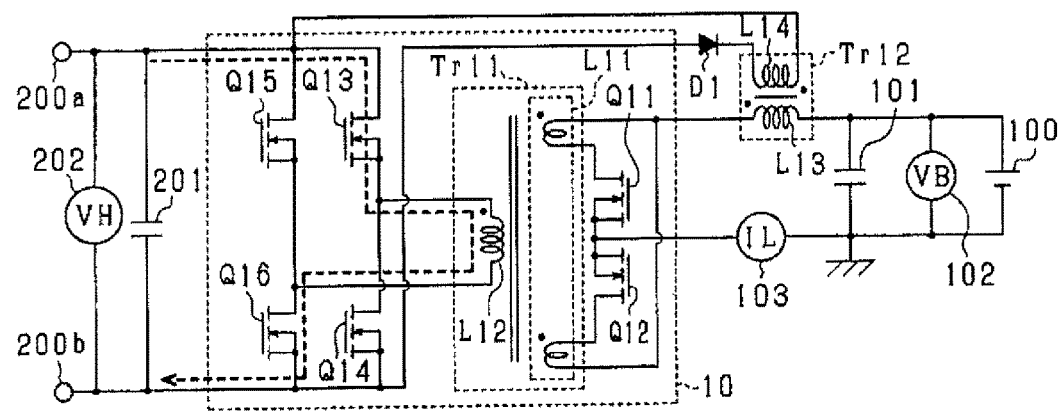

Current pathways during the execution of control B will be described with reference to FIG. 6C and FIG. 6D. Current pathways of FIG. 6C are pathways in a period B21 which is a first segment of the control B. In the control B, power is not supplied from the secondary cell 100 on the side of the first coil L11 because both of the first switching element Q11 and the second switching element Q12 are in OFF states. On the contrary, because a counter-electromotive force is induced due to the reactor current IL remaining in the choke coil L13, power is supplied on the side of the second coil L12 due to the reactor current IL via the auxiliary coil L14. In addition, the excitation current IM takes a pathway along which the excitation current IM sequentially passes through the third switching element Q13, the second coil L12, and the sixth switching element Q16. A current pathway in a second segment B22 of the control B, which is a segment after the flyback current ID decreases to zero, is shown in FIG. 6D. That is to say, a supply of power via the auxiliary coil L14 ends and the excitation current IM flows in a pathway sequentially passing through the third switching element Q13, the second coil L12, and the sixth switching element Q16 on the output side. Similar to the first mode control described above, no current flows in a third segment B23 of the control B, which is a last segment of the control B. Thus, a description of current pathways is omitted herein.

Figure 7:
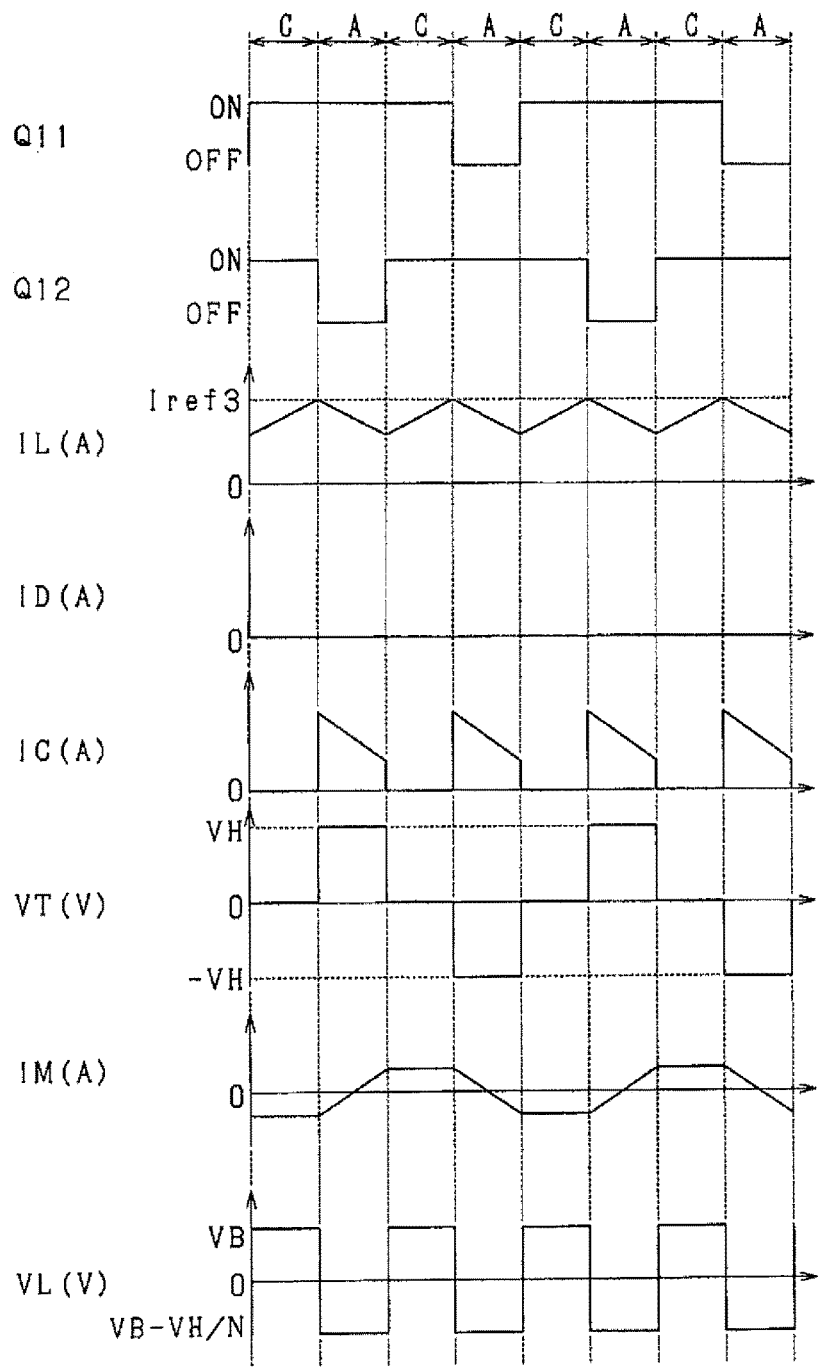
FIG. 7 is a time chart showing a third mode control.

A control in the third mode (hereinafter, referred to as the third mode control) will now be described with reference to a time chart of FIG. 7. In the third mode control, a control C and a control A are alternately performed. In the control C, both of the first switching element Q11 and the second switching element Q12 are in ON states. In the control A, one of the first switching element Q11 and the second switching element Q12 is in ON state and the other one is in OFF state. In the next control A, the one of the first switching element Q11 and the second switching element Q12 is in OFF state and the other one is in ON state. That is, the states of the switching elements Q11 are alternated in next control A. In the control A, a pattern to switch the first switching element Q11 ON and the second switching element Q12 OFF and another pattern to switch the first switching element Q11 OFF and the second switching element Q12 ON are performed alternately.

In the control C, the reactor voltage VL is equal to the input-side voltage VB applied from the secondary cell 100 and the reactor current IL monotonically increases in a linear fashion as in the second mode control above. Herein, the output-side current IC is equal to zero because no current flows through the first coil L11.

Figure 8A:
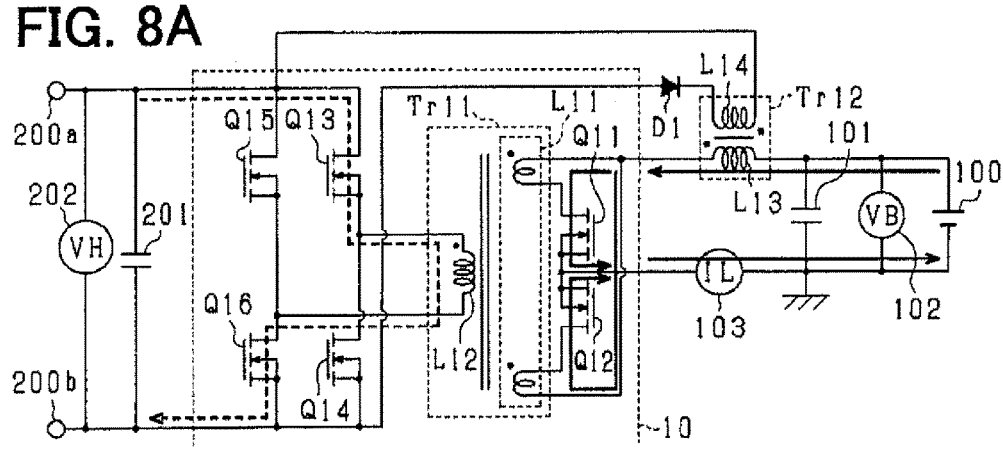
FIG. 8A to FIG. 8C are diagrams showing current pathways in the third mode control.

Current pathways during the execution of control C will be described with reference to FIG. 8A. Because both of the first switching element Q11 and the second switching element Q12 are in ON states, power is not supplied from the first coil L11 to the second coil L12. In addition, a supply of power from the choke coil L13 to the auxiliary coil L14 is cut off by the diode D1. Hence, the reactor current IL flowing through the choke coil L13 increases. The reactor current IL monotonically increases in the control C as described above. When, the reactor current IL increases to a preliminarily determined value, such as a third command value Iref3, the control C shifts to the control A.

In the subsequent control A, the reactor current IL monotonically decreases in a linear fashion. That is to say, a variation in the output-side current IC per unit time takes a value found by dividing a variation in the reactor current IL per unit time, dIL/dt, by the turn ratio N. The excitation voltage VT which is a voltage applied across the second coil L12 is equal to the output-side voltage VH. A polarity of the excitation voltage VT reverses depending on which one of the first switching element Q11 and the second switching element Q12 is turned ON. Hence, whether the excitation current IM increases or decreases is determined according to the polarity of the excitation voltage VT.

Figure 8B:
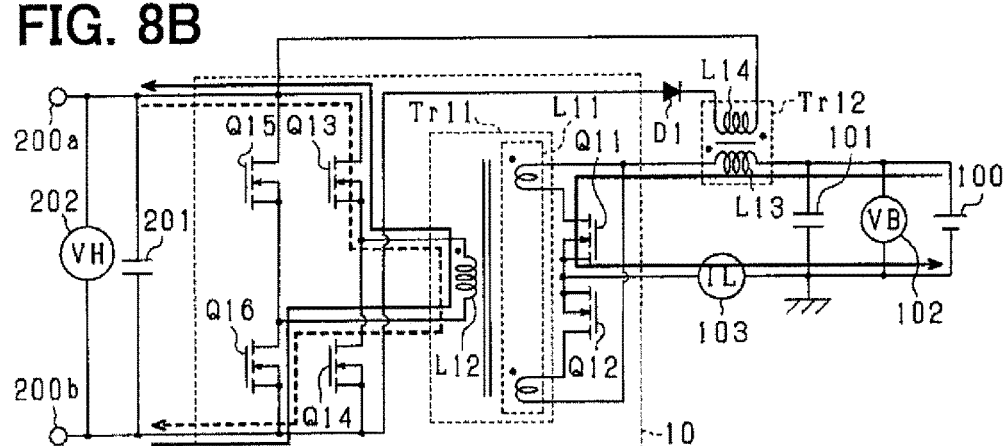
Figure 8C:
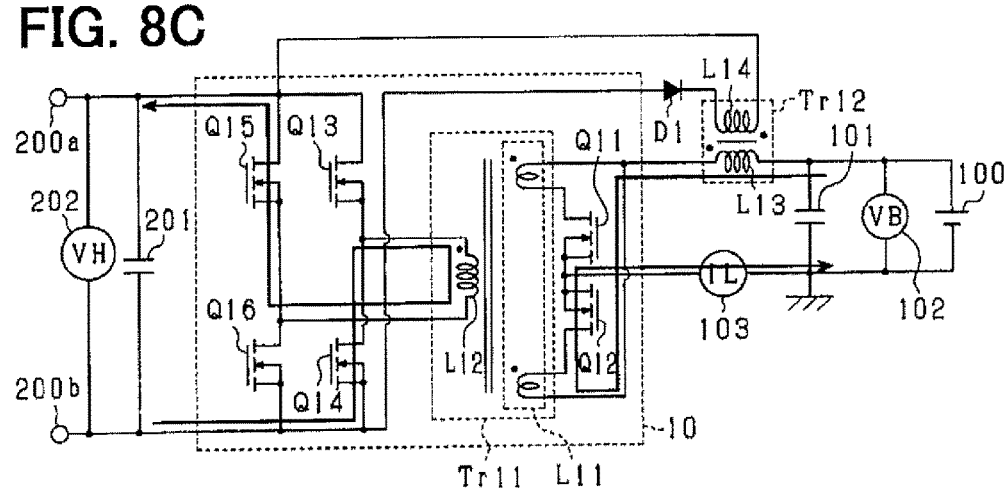

Current pathways during the execution of control A will be described with reference to FIG. 8B and FIG. 8C. FIG. 8B shows a pattern in which the first switching element Q11 is in ON state and the second switching element Q12 is in OFF state. On the side of the first coil L11, a current supplied from the secondary cell 100 takes a pathway along which the current sequentially passes through the choke coil L13, the first coil L11, and the first switching element Q11. On the side of the second coil L12, the current takes a pathway along which the current sequentially passes through the sixth switching element Q16, the second coil L12, and the third switching element Q13. FIG. 8C shows another pattern in which the first switching element Q11 is in OFF state and the second switching element Q12 is in ON state. On the side of the first coil L11, a current supplied from the secondary cell 100 takes a pathway along which the current sequentially passes through the choke coil L13, the first coil L11, and the second switching element Q12. On the side of the second coil L12, the current takes a pathway along which the current sequentially passes through the fourth switching element Q14, the second coil L12, and the fifth switching element Q15.

The first mode control, the second mode control, and the third mode control are switched according to a value of the output-side voltage VH. The first mode control is performed when a charge to the capacitor 201 begins. When and after the output-side voltage VH becomes higher than a first predetermined value V1 with a charging of the capacitor 201 proceeds, the second mode control is performed. When and after the output-side voltage VH becomes higher than a second predetermined value V2 with a further charging of the capacitor 201, the third mode control is performed.

Power can be supplied from the input side to the output side by the first mode control when a value found by multiplying the input-side voltage VB by the turn ratio N is larger than the output-side voltage VH. Hence, given that the input-side voltage VB is invariable, then the first predetermined value V1 is set to be smaller than at least a value found by multiplying the input-side voltage VB as a constant value by the turn ratio N. In addition, the condition for the reactor current IL to decrease in the control A by the third mode control is that a value found by multiplying the input-side voltage VB by the turn ratio N is smaller than the output-side voltage VH. Hence, given that the input-side voltage VB is invariable, then the second predetermined value V2 is set to be higher than at least a value found by multiplying the input-side voltage VB as a constant value by the turn ratio N.

The control A, the control B, and the control C may be referred to also as a first control, a second control, and a third control, respectively.

Figure 9:
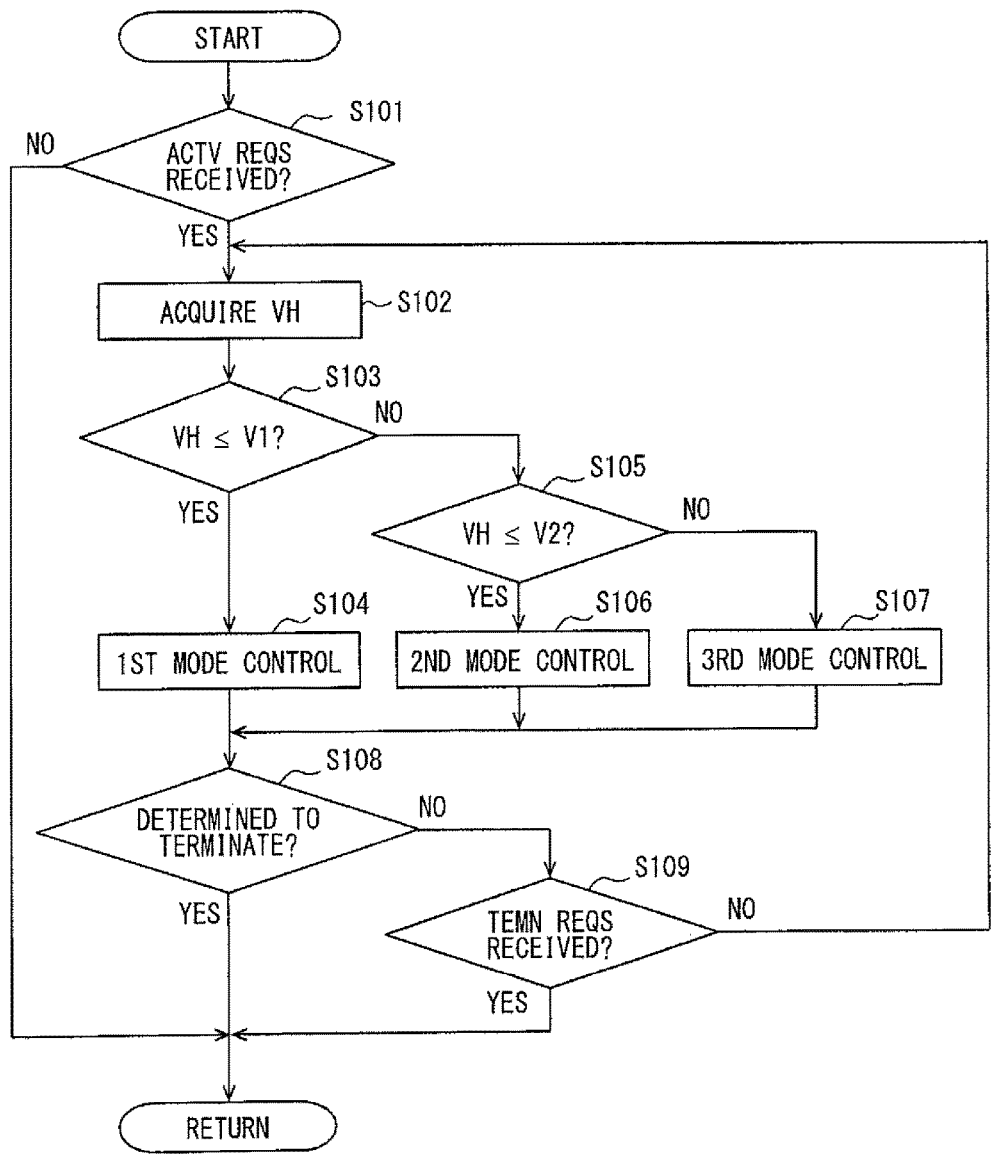
FIG. 9 is a flowchart showing a process executed by a controller.

A process executed by the controller 300 will now be described with reference to a flowchart of FIG. 9. A control depicted by the flowchart of FIG. 9 is repeatedly performed in predetermined control cycles.

Firstly, the controller 300 determines whether an activation request (ACTV REQS) is received in S101. A command signal of the activation request may be sent from, for example, a higher stage control device, such as an ECU. When the activation request is not received (S101: NO), the controller 300 stands by in S101 without proceeding to next step.

When the activation request is received (S101: YES), the controller 300 acquires the output-side voltage VH in S102 and determines whether the acquired output-side voltage VH is equal to or lower than the first predetermined value V1 in S103. When the output-side voltage VH is equal to or lower than the first predetermined value V1 (S103: YES), the controller 300 performs the first mode control in S104. When the output-side voltage VH is higher than the first predetermined value V1 (S103: NO), the controller 300 proceeds to S105 and determines whether the output-side voltage VH is equal to or lower than the second predetermined value V2. When the output-side voltage VH is equal to or lower than the second predetermined value V2 (S105: YES), the controller 300 performs the second mode control in S106. On the other hand, when the output-side voltage VH is higher than the second predetermined value V2 (S105: NO), the controller 300 proceeds to S107 and performs the third mode control.

After any one of the first mode control, the second mode control, and the third mode control is performed for a predetermined time, the controller 300 determines whether to terminate the control in S108. In S108, for example, the controller 300 may acquire the output-side voltage VH again to determine whether the output-side voltage VH rises to a value equal to or higher than a predetermined upper-limit value. Alternatively, when the controller 300 determines that the output-side voltage VH is higher than the second predetermined value V2 (S105: NO), the controller 300 may further determine whether the output-side voltage VH rises to the value equal to or higher than the predetermined upper-Limit value. When the controller 300 determines to terminate the control (S108: YES), the process returns to S101 and a stand-by state is continued until a next activation request is received. When the controller 300 determines not to terminate the control (S108: NO), the controller 300 further determines whether a termination request (TEMN REQS) is received in S109. A command signal of the termination request may be sent from a higher stage control device, such as an ECU. When the termination request is received (S109: YES), the controller 300 terminates the process and returns to S101, and a stand-by state is continued until a next activation request is received. When the termination request is not received (S109: NO), the controller 300 returns to S102 and repeatedly execute subsequent steps as described above.

The flowchart of FIG. 9 shows the control relating to only a charge control on the capacitor 201. The power conversion apparatus also performs power conversion relating to controls other than the charge control of the capacitor 201. One example is a control to charge the secondary cell 100 by stepping-down a supplied voltage between the positive-electrode output terminal 200a and the negative-electrode output terminal 200b. The example control is a known control and a detailed description is omitted herein.

The power conversion apparatus having the above-described configuration in the present embodiment provides the following advantages.

When the output-side voltage VH is small at the beginning of a charge (pre-charge) to the capacitor 201, the first mode control is carried out. That is, the control A and the control B are alternately performed. In the control A, one of the first switching element Q11 and the second switching element Q12 is set to ON, and the other one is set to OFF. In the control B, both of the first switching element Q11 and the second switching element Q12 are set to OFF. Consequently, a current flowing through the choke coil L13, which is increased in the control A, can be decreased in the control B. Hence, a continuous increase of the current, which flows through the choke coil L13, can be prevented. It is necessary to consume the reactor current IL remaining in the choke coil L13 within the circuit in the control B. In consideration of this point, power is supplied to the output side via the auxiliary coil L14 magnetically coupled to the choke coil L13. Thus, performance deterioration and breaking of the circuit on the input side can be prevented.

When the output-side voltage VH becomes higher than the first predetermined value V1, the first mode control shifts to the second mode control, and in the second mode control, the control C, the control A, and the control B are performed in sequence, and are repeated in the described sequence. In the control C, both of the first switching element Q11 and the second switching element Q12 are set to ON. In the control A, the first switching element Q11 is set to ON and the second switching element Q12 is set to OFF. In the control B, both of the first switching element Q11 and the second switching element Q12 are set to OFF. Hence, a current flowing through the choke coil L13 can be increased in the control C and a supply rate of power to the output side can be enhanced. In addition, a current flowing through the choke coil L13 can be reduced in the control B. Consequently, a continuous increase of the current flowing through the choke coil L13 can be prevented. Similar to the first mode control described above, it is necessary to consume the reactor current IL remaining in the choke coil L13 within the circuit in the control B. Regarding this point, power is supplied to the output side via the auxiliary coil L14 magnetically coupled to the choke coil L13. Thus, performance deterioration and breaking of the circuit on the input side can be prevented.

By providing the auxiliary coil L14, power can be supplied to the output side via the auxiliary coil L14 during the control B in the first mode control and in the second mode control. In a comparison example where the auxiliary coil L14 is absent, power has to be consumed within the circuit on the input side. Hence, power supplying efficiency can be enhanced by providing the auxiliary coil L14.

When the output-side voltage VH becomes higher than the second predetermined value V2 as the pre-charging of the capacitor 201 proceeds, the second mode control shifts to the third mode control. In the third mode control, the control C and the control A are performed alternately. In the control C, the first switching element Q11 and the third switching element Q13 are set to ON, and the second switching element Q12 and the fourth switching element Q14 are set to OFF. In the control A, the first switching element Q11, the third switching element Q13, and the fourth switching element Q14 are set to OFF, and the second switching element Q12 is set to ON. Hence, a current flowing through the choke coil L13 can be increased in the control C and the current flowing through the choke coil L13 can be decreased in the subsequent control A. This configuration can speed up the charging of the capacitor 201.

Second Embodiment

Figure 10:
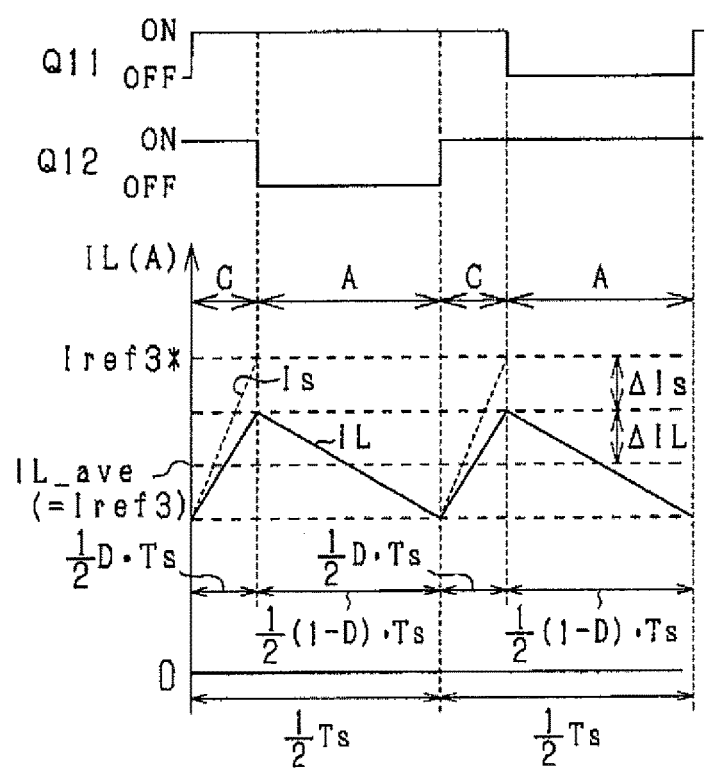
FIG. 10 is a time chart showing a third mode control according to a second embodiment of the present disclosure.

In the present embodiment, a part of third mode control is different from the third mode control described in the first embodiment. FIG. 10 shows ON and OFF states of a first switching element Q11 and a second switching element Q12 along with a reactor current IL in the third mode control of the present embodiment.

In the third mode control, an excessive increase of the reactor current IL can be restricted when an increase amount of the reactor current IL in a control C and a decrease amount of the reactor current IL in a control A are equal. In the present embodiment, a ratio of a period during which the control C is performed to a period during which the control A is performed is set to D:(1-D), where D is a value less than 1. Herein, D is determined based on an input-side voltage VB and an output-side voltage VH.

In addition, in the third mode control, in order to restrict low-frequency oscillation, timing when the control C is switched to the control A is controlled in such a manner that a value found by adding a slope current Is to the reactor current IL becomes equal to a corrected command value Iref3*. The slope current Is will be described with reference to FIG. 10. The slope current Is is a virtual value which linearly increases. Define $\Delta IL$ as an increase amount of the reactor current IL and define $\Delta Is$ as an increase amount of the slope current Is in the control C, then the corrected command value Iref3* is calculated by adding $\Delta IL$ and $\Delta Is$ to a third command value Iref3. A control to switch the control C to the control A is performed so as to obtain the corrected command value Iref3*.

Figure 11:
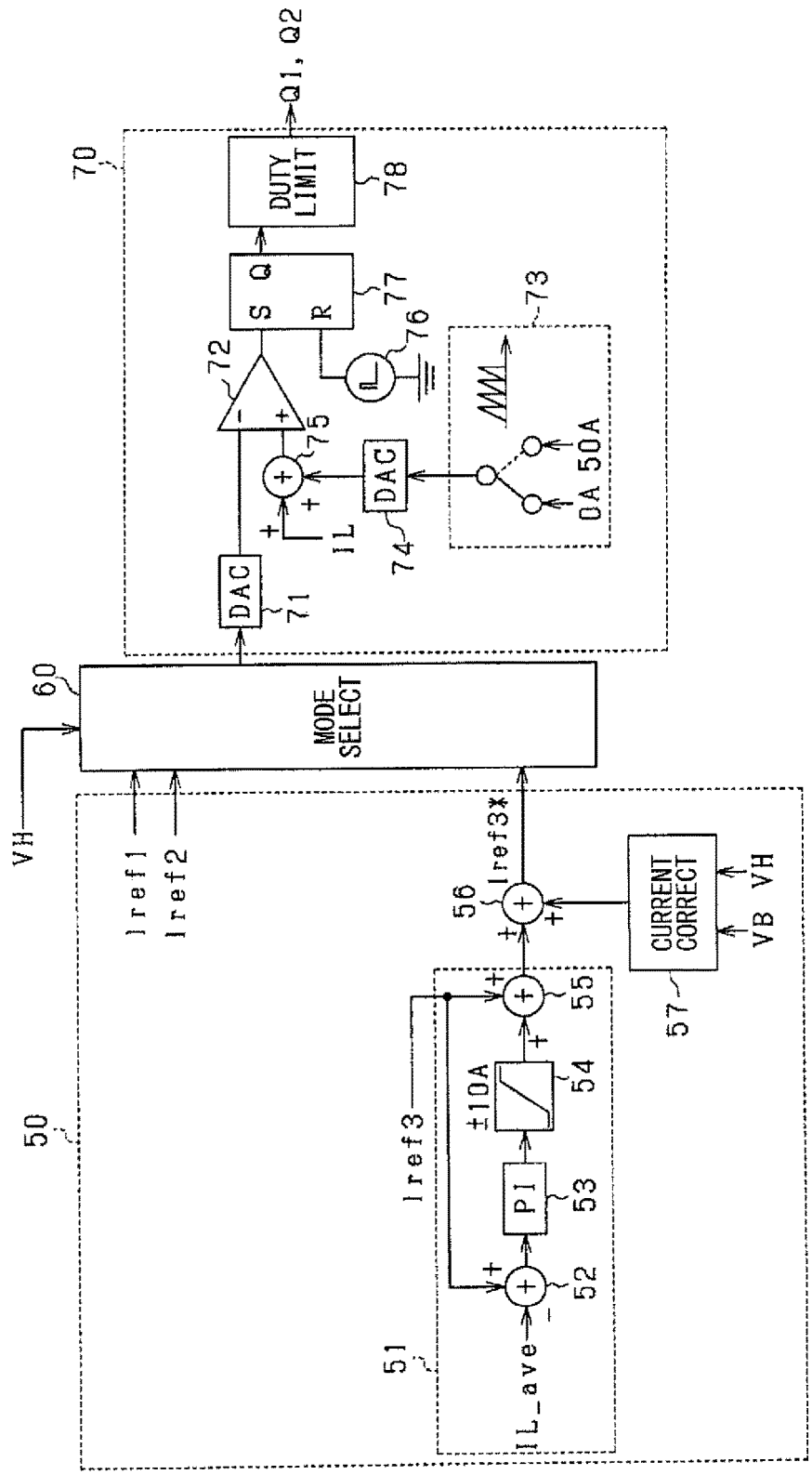
FIG. 11 is a block diagram showing a configuration of a controller to perform a control process in the second embodiment.

Process performed by a controller 300 will now be described with reference to FIG. 11. A constant current control portion 50 reads out, from a memory, a first command value Iref1 which is a command value of the reactor current IL in the first mode control, a second command value Iref2 which is a command value of the reactor current IL in the second mode control, and the third command value Iref3 which is a command value of the reactor current IL in the third mode control, and uses the command values that are read out in the control process.

The first command value Iref1 and the second command value Iref2 are directly outputted from the constant current control portion 50. The first command value Iref1 may be equal to or different from the second command value Iref2.

The third command value Iref3 is inputted into a feedback control portion 51. The feedback control portion 51 additionally acquires an average value IL_ave which is an actual current of the reactor current IL. The average value IL_ave is found by adding up the reactor current IL detected by a current detection portion 103 for a predetermined period and averaging the sum. The third command value Iref3 and the average value IL_ave are inputted into an adding portion 52. The adding portion 52 finds a difference between the third command value Iref3 and the average value IL_ave. The difference is inputted into a Proportional-Integral controller (PI controller) 53 and further inputted to a limiter 54. When an output value of the PI controller 53 is larger than an upper-limit value, the limiter 54 limits the output value to the upper-limit value. An output value from the limiter 54 is added to the third command value Iref3 by an adder 55 and a sum found by adding the output value from the limiter 54 to the third command value Iref3 is outputted from the feedback control portion 51.

Meanwhile, a current correction portion (CURRENT CORRECT) 57 receives the input-side voltage VB and the output-side voltage VH, calculates a correction amount of the third command value Iref3, and outputs the correction amount of the third command value Iref3. An adder 56 adds the correction amount outputted from the current correction portion 57 to the value outputted from the feedback control portion 51, and outputs the sum as the corrected command value Iref3*.

The constant current control portion 50 outputs the first command value Iref1, the second command value Iref2, and the corrected command value Iref3* to a mode selection portion (MODE SELECT) 60. The mode selection portion 60 further receives the output-side voltage VH, and compares the output-side voltage VH with a first predetermined value V1 and a second predetermined value V2. The mode selection portion 60 determines which one of the first command value Iref1, the second command value Iref2, and the corrected command value Iref3* is to be outputted based on the comparison result of the output-side voltage VH with the first predetermined value V1 and the second predetermined value V2, and outputs the selected command value.

One of the first command value Iref1, the second command value Iref2, and the corrected command value Iref3* outputted from the mode selection portion 60 is inputted into a peak current control portion 70, and is converted to an analog value in a digital-to-analog converter (DAC) 71. The converted analog value is inputted into a minus terminal of a comparator 72.

Meanwhile, a slope compensation portion 73 included in the peak current control portion 70 generates a signal from a value of the slope current Is, which is obtained from a register value, and inputs the generated signal into a digital-to-analog converter (DAC) 74. As described above, the slope current Is is a sawtooth signal monotonically increasing in a linear fashion from 0 ampere in each control cycle. The slope current Is is converted to an analog signal in the digital-to-analog converter 74 and the reactor current IL are added in an adding portion 75 and a sum is inputted into a plus terminal of the comparator 72. The slope compensation portion 73 may directly generate an analog signal which is to be inputted into the comparator 72 without using the digital-to-analog converter 74.

In the first mode control and the second mode control, the slope compensation portion 73 sets a value of the slope current Is to zero. In the third mode control, the slope compensation portion 73 outputs the sawtooth slope current Is described above. The following will describe the reason. The first mode control has a period during which both of the first switching element Q11 and the second switching element Q12 are in OFF states. During such a period, the reactor current IL is equal to zero and hence low-frequency oscillation is not generated.

The comparator 72 compares any one of the first command value Iref1, the second command value Iref2, and the corrected command value Iref3* inputted into the minus terminal with a sum of the reactor current IL and the slope current Is. The sum of the reactor current IL and the slope current Is is inputted into the plus terminal of the comparator 72. In a period during which the input value at the plus terminal is smaller than the input value at the minus terminal, a high level signal is outputted from the comparator 72 and the high level signal is inputted into an S terminal of an RS flip-flop 77. Conversely, in a period during which the input value at the plus terminal is larger than the input value of the minus terminal, a low level signal is outputted from the comparator 72 and the low level signal is inputted into the S terminal of the RS flip-flop 77. A clock signal from a clock 76 is inputted into an R terminal of the RS flip-flop 77.

In the first mode control, when an input signal is a low level signal, it means that the reactor current IL exceeds the first command value Iref1. Hence, the RS flip-flop 77 switches the control A to the control B by sending a signal which sets both of the first switching element Q11 and the second switching element Q12 to OFF states. After an elapse of one control cycle, the flip-flop 77 switches the control B to the control A by sending a signal which sets one of the first switching element Q11 and the second switching element Q12 to ON state and the other one to OFF state.

In the second mode control, when an input signal is a low level signal, it means that the reactor current IL exceeds the second command value Iref2. Hence, the RS flip-flop 77 switches the control C to the control A by sending a signal which sets one of the first switching element Q11 and the second switching element Q12 to ON state and the other one to OFF state. After a predetermined time (for example, half cycle) shorter than one control cycle has elapsed from the start time of the control C, the RS flip-flop 77 switches the control A to the control B by sending a signal which sets both of the first switching element Q11 and the second switching element Q12 to OFF states. Subsequently, after an elapse of one control cycle, the RS flip-flop 77 switches the control B to the control C by sending a signal which sets both of the first switching element Q11 and the second switching element Q12 to ON states.

In the third mode control, when an input signal is a low level signal, it means that a sum of the reactor current IL and the slope current Is exceeds the corrected command value Iref3*. Hence, the RS flip-flop 77 switches the control C to the control A by sending a signal which sets one of the first switching element Q11 and the second switching element Q12 to ON state and the other one to OFF state. After an elapse of one control cycle, the RS flip-flop 77 switches the control A to the control C by sending a signal which sets both of the first switching element Q11 and the second switching element Q12 to ON states.

An output of the RS flip-flop 77 is inputted into a duty limit portion (DUTY LIMIT) 78. When a length of a period of each control exceeds an upper-limit value, the duty limit portion 78 sets the length to the upper-limit value. When a length of a period of each control is below a lower-limit value, the duty limit portion 78 sets the length to the lower-limit value. Subsequently, a control signal is sent to the first switching element Q11 and the second switching element Q12.

With the above-described configuration, the power conversion apparatus of the present embodiment achieves effects as follows in addition to the effects achieved by the power conversion apparatus of the first embodiment.

The peak current control portion 70 performs the constant current control using the respective command values inputted from the constant current control portion 50. Consequently, when the input-side voltage VB varies, robustness against an overcurrent can be enhanced.

In order to perform the peak current control on the reactor current IL in the third mode control, the slope current Is is added to the reactor current IL. Consequently, low-frequency oscillation of the reactor current IL can be restricted.

Third Embodiment

In the present embodiment, a circuit configuration of a power conversion apparatus is different from the circuit configuration in the first embodiment. Because the circuit configuration is different, a part of the process performed by a controller 300 is also different.

Figure 12:
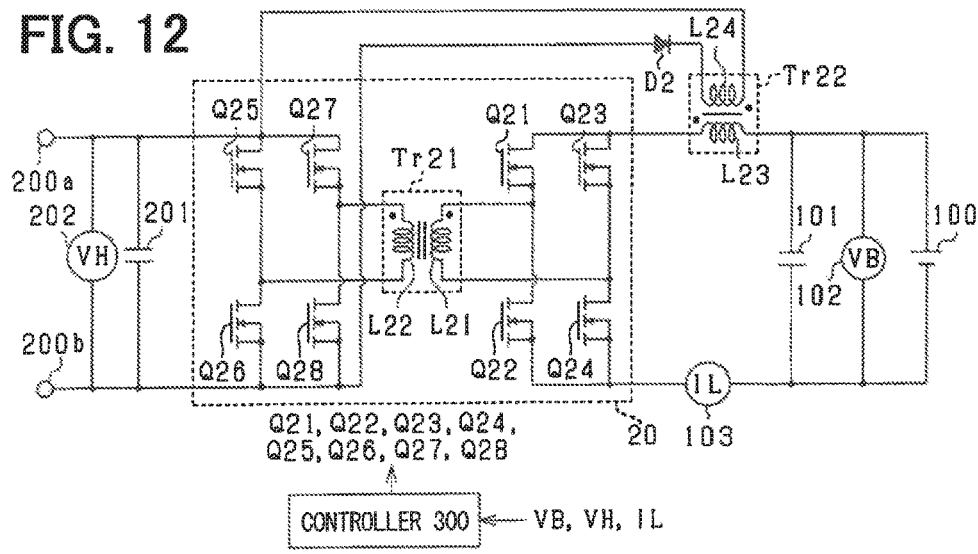
FIG. 12 is a circuit diagram showing a configuration of a power conversion apparatus according to a third embodiment of the present disclosure.

FIG. 12 is a circuit diagram of the power conversion apparatus of the present embodiment. A power conversion circuit 20 in the power conversion apparatus includes a transformer Tr21 made up of a first coil L21 and a second coil L22, and first through eighth switching elements Q21 through Q28 which are provided by MOSFETs. A turn ratio of the first coil L21 to the second coil L22 is 1:N.

A source of the first switching element Q21 and a drain of the second switching element Q22 are connected to each other at a connection point, and the connection point is connected to one end of the first coil L21. A source of the third switching element Q23 and a drain of the fourth switching element Q24 are connected to each other at a connection point, and the connection point is connected to the other end of the first coil L21. A drain of the first switching element Q21 and a drain of the third switching element Q23 are connected to one end of a choke coil L23, and the other end of the choke coil L23 is connected to a positive electrode of a secondary cell 100. A source of the second switching element Q22 and a source of the fourth switching element Q24 are connected to a negative electrode of the secondary cell 100.

The fifth through eighth switching elements Q25 through Q28 provided on a side of the second coil L22 are connected in the same manner as the third through sixth switching elements Q13 through Q16 of the first embodiment and a description is omitted herein.

An auxiliary coil L24 is provided to magnetically couple to the choke coil L23. The choke coil L23 and the auxiliary coil L24 together form a second transformer Tr22. The choke coil L23 and the auxiliary coil L24 are wound in the same manner as in the first embodiment and a diode D2 is provided in the same manner as in the first embodiment. Hence, a detailed description is omitted herein.

Figure 13:
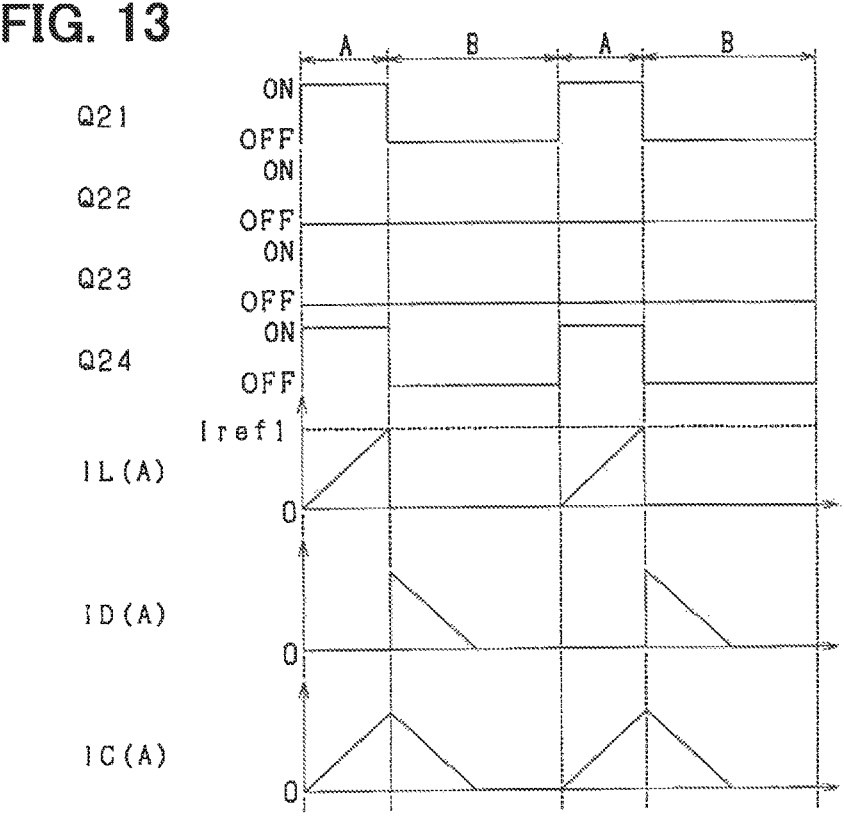
FIG. 13 is a time chart showing a first mode control in the third embodiment.

FIG. 13 is a time chart showing process of a first mode control. In the first mode control, a control A and a control B are performed alternately. In control A, the first switching element Q21 and the fourth switching element Q24 are set to ON states, and the second switching element Q22 and the third switching element Q23 are set to OFF states. In the control B, all of the first through fourth switching elements Q21 through Q24 are set to OFF states.

In the control A, as in the control A of the first embodiment, a reactor current IL monotonically increases. Accordingly, an output-side current IC also monotonically increases. In the control B, as in the control B of the first embodiment, the reactor current IL is equal to zero and therefore a flyback current ID monotonically decreases. Accordingly, the output-side current IC also monotonically decreases.

Figure 14:
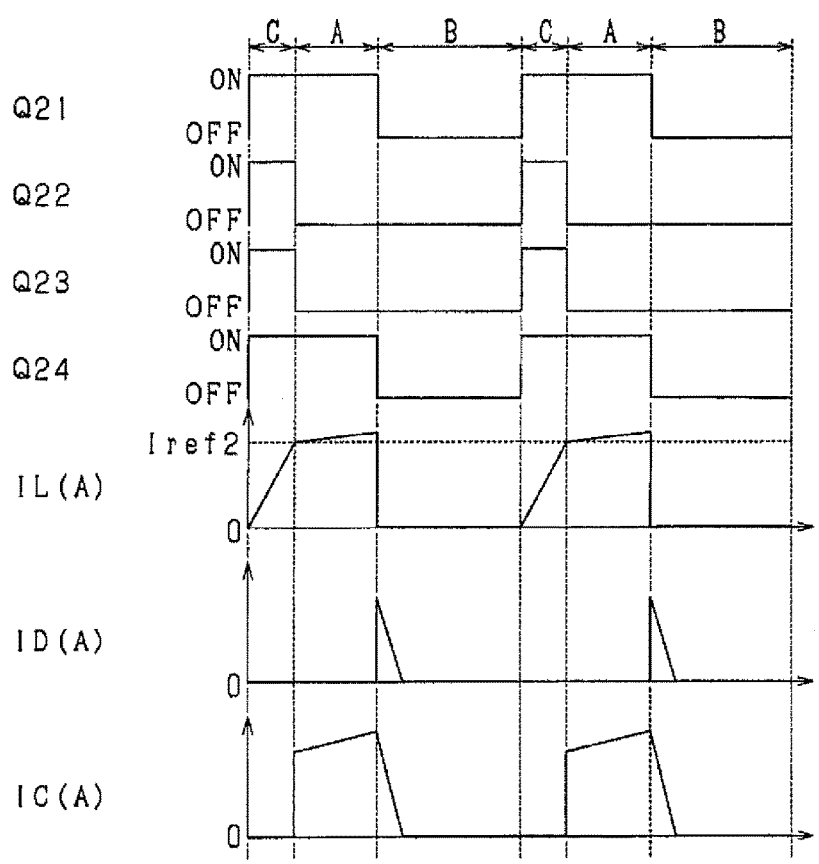
FIG. 14 is a time chart showing a second mode control in the third embodiment.

FIG. 14 is a time chart showing process of a second mode control. In the second mode control, a control C, a control A, and a control B are repeatedly performed in described sequence. In the control C, all of the first through fourth switching elements Q21 through Q24 are set to ON states. In the control A, the first switching element Q21 and the fourth switching element Q24 are set to ON states and the second switching element Q22 and the third switching element Q23 are set to OFF states. In the control B, all of the first through fourth switching elements Q21 through Q24 are set to OFF states.

In the control C, as in the control C of the first embodiment, the reactor current IL monotonically increases. On the contrary, the output-side current IC is equal to zero because power is not supplied from the first coil L21 to the second coil L22. In the control A, as in the control A in the first embodiment, a variation in the reactor current IL is determined by a relation between an input-side voltage VB and an output-side voltage VH. Herein, power is supplied from the first coil L21 to the second coil L22 and the output-side current IC takes a value similar to a value of the reactor current IL. In the subsequent control B, as in the control B in the first embodiment, the reactor current IL is equal to zero and therefore the flyback current ID monotonically decreases. Accordingly, the output-side current IC also monotonically decreases.

Figure 15:
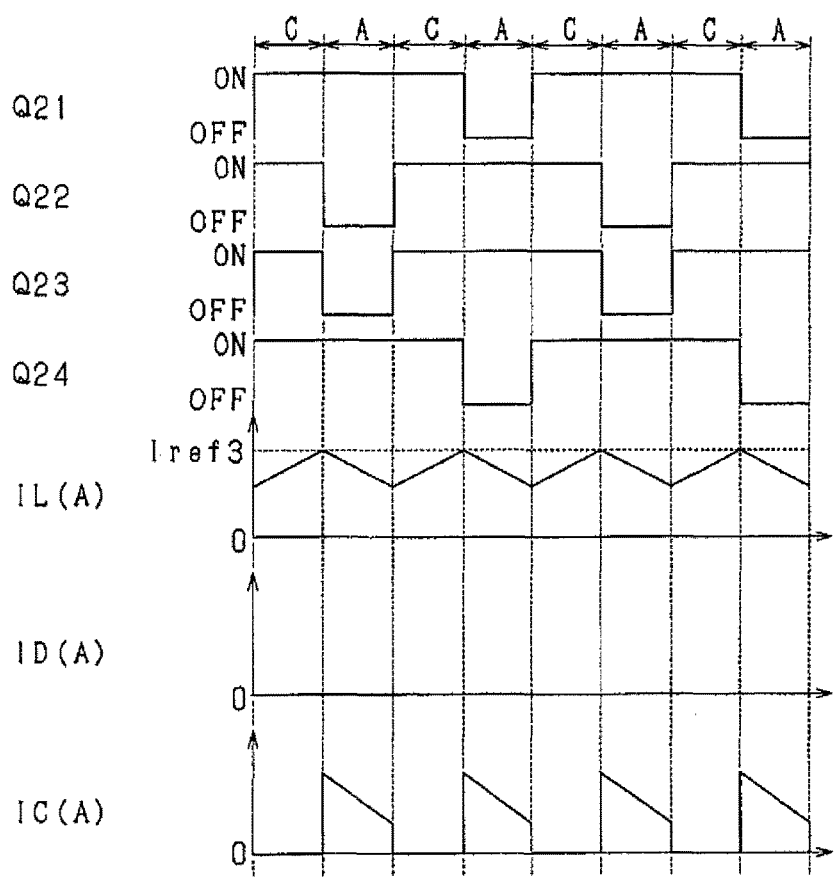
FIG. 15 is a time chart showing a third mode control in the third embodiment.

FIG. 15 is a time chart showing process of a third mode control. In the third mode control, a control C and a control A are performed alternately. In control C, all of the first through fourth switching elements Q21 through Q24 are set to ON. In the control A, a pattern in which the first switching element Q21 and the fourth switching element Q24 are set to ON states and the second switching element Q22 and the third switching element Q23 are set to OFF states is switched with another pattern in which the first switching element Q21 and the fourth switching element Q24 are set to OFF states and the second switching element Q22 and the third switching element Q23 are set to ON states.

In the control C, as in the control C of the first embodiment, the reactor current IL monotonically increases. On the contrary, the output-side current IC is equal to zero because power is not supplied from the first coil L21 to the second coil L22. In the control A, as in the control A in the first embodiment, the reactor current IL monotonically decreases. Herein, power is supplied from the first coil L21 to the second coil L22 and the output-side current IC takes a value similar to a value of the reactor current IL.

With the above-described configuration, the power conversion apparatus of the present embodiment achieves effects similar to the effects achieved in the first embodiment.

Fourth Embodiment

In the present embodiment, a circuit configuration of a power conversion apparatus is different from the circuit configuration in the first embodiment Because the circuit configuration is different, a part of the process performed by a controller 300 is also different.

Figure 16:
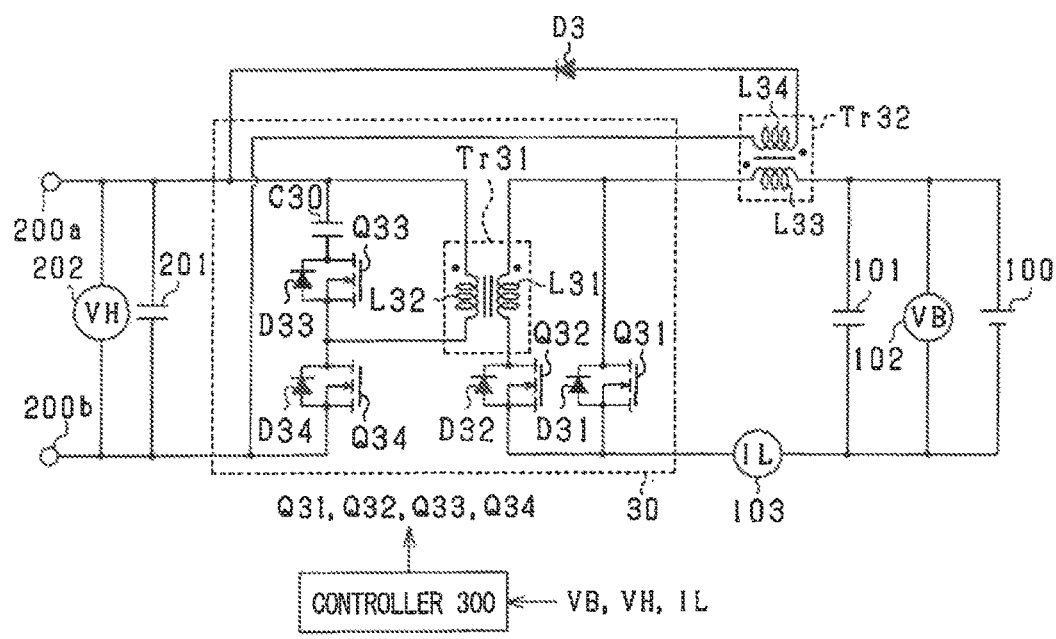
FIG. 16 is a circuit diagram showing a configuration of a power conversion apparatus according to a fourth embodiment of the present disclosure.

FIG. 16 is a circuit diagram of the power conversion apparatus of the present embodiment. A power conversion circuit 30 in the power conversion apparatus includes a transformer Tr31, first through fourth switching elements Q31 through Q34, first through fourth diodes D31 through D34, and a capacitor C30. A MOSFET provided as the second switching element Q32 is connected in series to a first coil L31 disposed on an input side of the transformer Tr31 to form a series-connected body. Another MOSFET provided as the first switching element Q31 is connected to the series-connected body in parallel. More specifically, a drain of the first switching element Q31 is connected to one end of the first coil L31, and a drain of the second switching element Q32 is connected to the other end of the first coil L31. A source of the first switching element Q31 and a source of the second switching element Q32 are connected to each other.

A connection point of the drain of the first switching element Q31 and one end of the first coil L31 is connected to a positive electrode of a secondary cell 100 via a choke coil L33. On the other hand, a connection point of the source of the first switching element Q31 and the source of the second switching element Q32 is connected to a negative electrode of the secondary cell 100.

A second coil L32, which is magnetically coupled to the first coil L31, is provided on an output side of the transformer Tr31. A turn ratio of the first coil L31 to the second coil L32 is 1:N. On the output side, another MOSFET provided as the third switching element Q33 and the capacitor C30 are connected in series to form a series-connected body. The series-connected body and the second coil L32 are connected in parallel to form a parallel-connected body. Another MOSFET provided as the fourth switching element Q34 is connected to the parallel-connected body in series. More specifically, one end of the second coil L32 and one end of the capacitor C30 are connected to each other, and the other end of the capacitor C30 and a drain of the third switching element Q33 are connected to each other. Also, the other end of the second coil L32 and a source of the third switching element Q33 are connected to each other. A drain of the fourth switching element Q34 is connected to a connection point at which the second coil L32 is connected with the source of the third switching element Q33.

A connection point of the second coil L32 and the capacitor C30 is connected to a positive-electrode output terminal 200*a*, and a source of the fourth switching element Q34 is connected to a negative-electrode output terminal 200*b*. A capacitor 201 is connected between the positive-electrode output terminal 200*a* and the negative-electrode output terminal 200*b*.

An auxiliary coil L34 is provided to magnetically couple to the choke coil L33. The choke coil L33 and the auxiliary coil L34 together form a second transformer Tr32. The choke coil L33 and the auxiliary coil L34 are wound in the same manner as in the first embodiment and a diode D3 is provided in the same manner as in the first embodiment. Hence, a detailed description is omitted herein.

Figure 17:
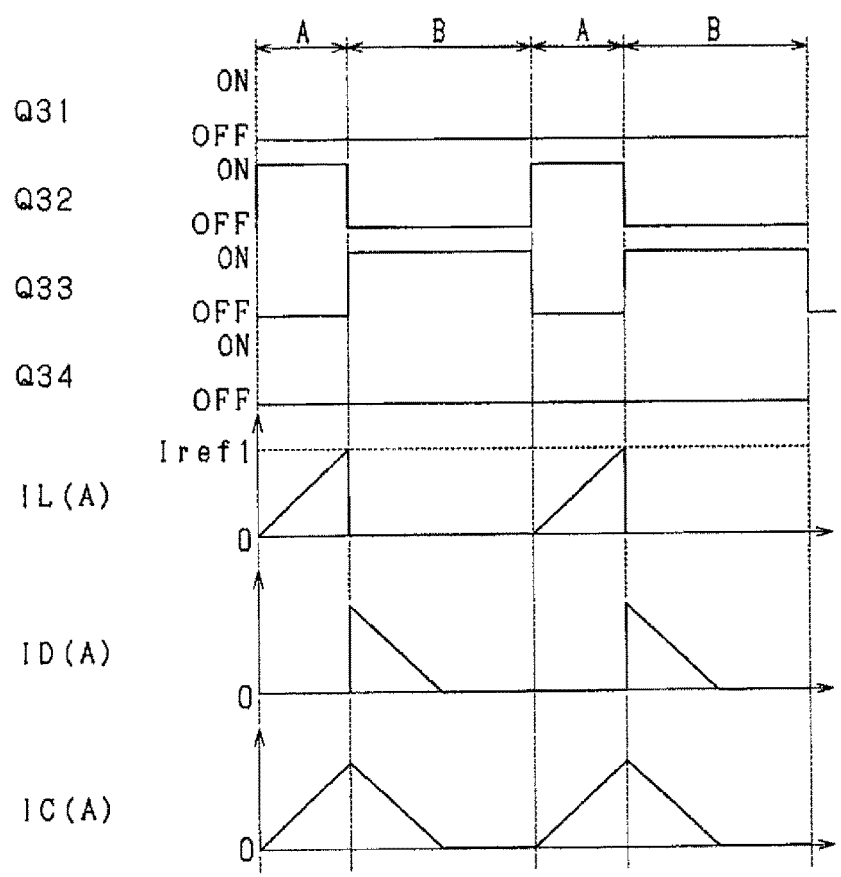
FIG. 17 is a time chart showing a first mode control in the fourth embodiment.

FIG. 17 is a time chart showing process of a first mode control. In the first mode control, a control A and a control B are performed alternately. In the control A, the first switching element Q31, the third switching element Q33, and the fourth switching element Q34 are set to OFF states and the second switching element Q32 is set to ON state. In the control B, the first switching element Q31, the second switching element Q32, and the fourth switching element Q34 are set to OFF states and the third switching element Q33 is set to ON state. In other words, a control in which the first switching element Q31 and the fourth switching element Q34 are normally set to OFF states while alternately switching the second switching element Q32 and the third switching element Q33 between ON an OFF states is performed.

In the control A, as in the control A of the first embodiment, a reactor current IL monotonically increases. Accordingly, an output-side current IC also monotonically increases. In the control B, as in the control B of the first embodiment, the reactor current IL is equal to zero and therefore a flyback current ID monotonically decreases. Accordingly, the output-side current IC also monotonically decreases.

Figure 18:
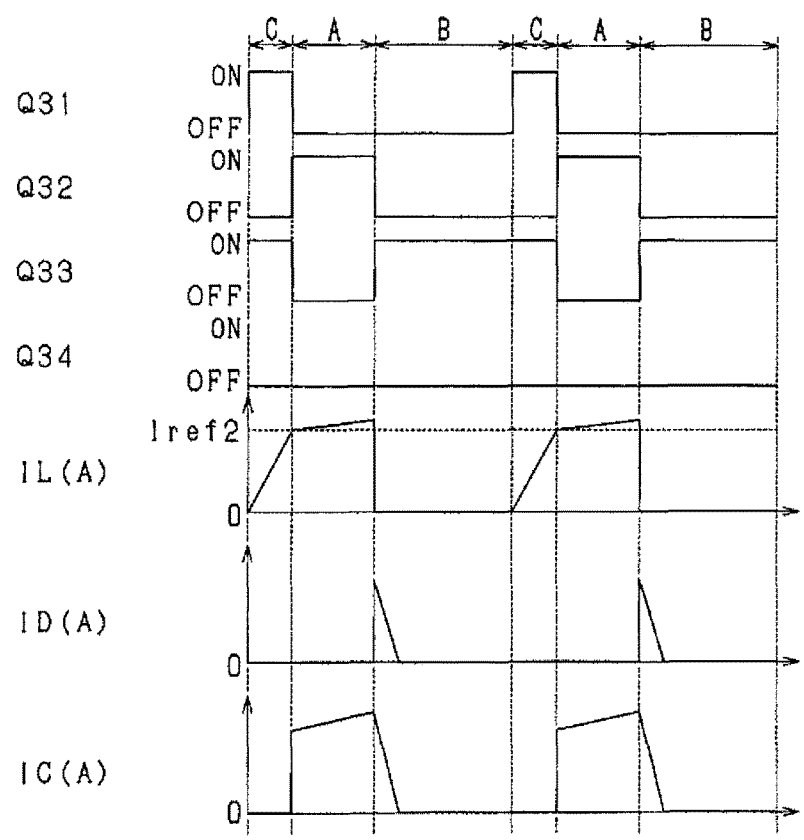
FIG. 18 is a time chart showing a second mode control in the fourth embodiment.

FIG. 18 is a time chart showing process of a second mode control. In the second mode control, a control C, a control A, and a control B are repeatedly performed in described sequence. In the control A, the first switching element Q31 and the third switching element Q33 are set to ON states and the second switching element Q32 and the fourth switching element Q34 are set to OFF states. In the control A, the first switching element Q31, the third switching element Q33, and the fourth switching element Q34 are set to OFF states and the second switching element Q32 is set to ON state. In the control B, the first switching element Q31, the second switching element Q32, and the fourth switching element Q34 are set to OFF states and the third switching element Q33 is set to ON state.

In the control C, as in the control C in the first embodiment, the reactor current IL monotonically increases. On the contrary, the output-side current IC is equal to zero because power is not supplied from the first coil L31 to the second coil L32. In the control A, as in the control A in the first embodiment, a variation in the reactor current IL is determined by a relation between an input-side voltage VB and an output-side voltage VH. Herein, power is supplied from the first coil L31 to the second coil L32 and the output-side current IC takes a value similar to a value of the reactor current IL. In the subsequent control B, as in the first control B in the first embodiment, the reactor current IL is equal to zero and therefore the flyback current ID monotonically decreases. Accordingly, the output-side current IC also monotonically decreases.

Figure 19:
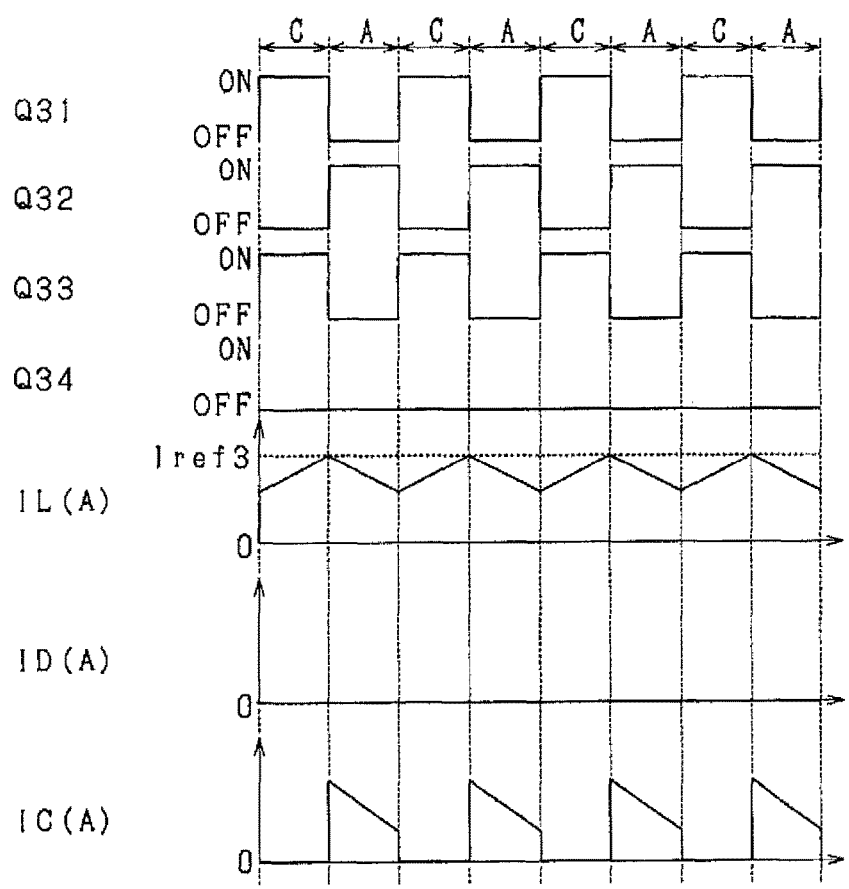
FIG. 19 is a time chart showing a third mode control in the fourth embodiment.

FIG. 19 is a time chart showing process of a third mode control. In the third mode control, a control C and a control A are performed alternately. In the control C, the first switching element Q31 and the third switching element Q33 are set to ON states, and the second switching element Q32 and the fourth switching element Q34 are set to OFF states. In the control A, the first switching element Q31, the third switching element Q33, and the fourth switching element Q34 are set to OFF states, and the second switching element Q32 is set to ON state.

In the control C, as in the control C of the first embodiment, the reactor current IL monotonically increases. On the contrary, the output-side current IC is equal to zero because power is not supplied from the first coil L31 to the second coil L32. In the control A, as in the control A of the first embodiment, the reactor current IL monotonically decreases. Herein, power is supplied from the first coil L31 to the second coil L32 and the output-side current IC takes a value similar to a value of the reactor current IL.

With the above-described configuration, the power conversion apparatus of the present embodiment achieves effects similar to the effects achieved in the first embodiment.

Fifth Embodiment

In the present embodiment, first through third mode controls are different from the first embodiment. More specifically, in the present embodiment, a current detection portion 103 is not provided and therefore a reactor current IL is not detected. Alternatively, even though the current detection portion 103 is provided, a value of the reactor current IL detected by the current detection portion 103 is not used in the first through third mode controls.

As described in the first embodiment with reference to FIG. 4A, the first mode control is performed to the reactor current IL so that the reactor current IL increases to a first command value Iref1 at an end of each control cycle. In the present embodiment, because the reactor current IL is not detected, the reactor current IL may possibly increase to an excessive value. Further, when a control is performed for decreasing a flyback current ID to zero at an end of a control in each control cycle, the reactor current IL may not reach the first command value Iref1 when control A is switched to control B. Thus, a supply rate of power may be reduced. Regarding these difficulties, in a first mode control of the present embodiment, a length of an execution period of the control A is set in such a manner that a value found by multiplying the flyback current ID acquired at the end of a control after predetermined control cycles by a turn ratio N (hereinafter, referred to as the product of the flyback current ID and the turn ratio N) becomes equal to the first command value Iref1. In addition, a break period Tb during which an OFF state of a first switching element Q11 and an OFF state of a second switching element Q12 are continued over predetermined control cycles is provided in order to decrease the flyback current ID to zero after the firstly-mentioned predetermined control cycles are terminated.

Figure 20:
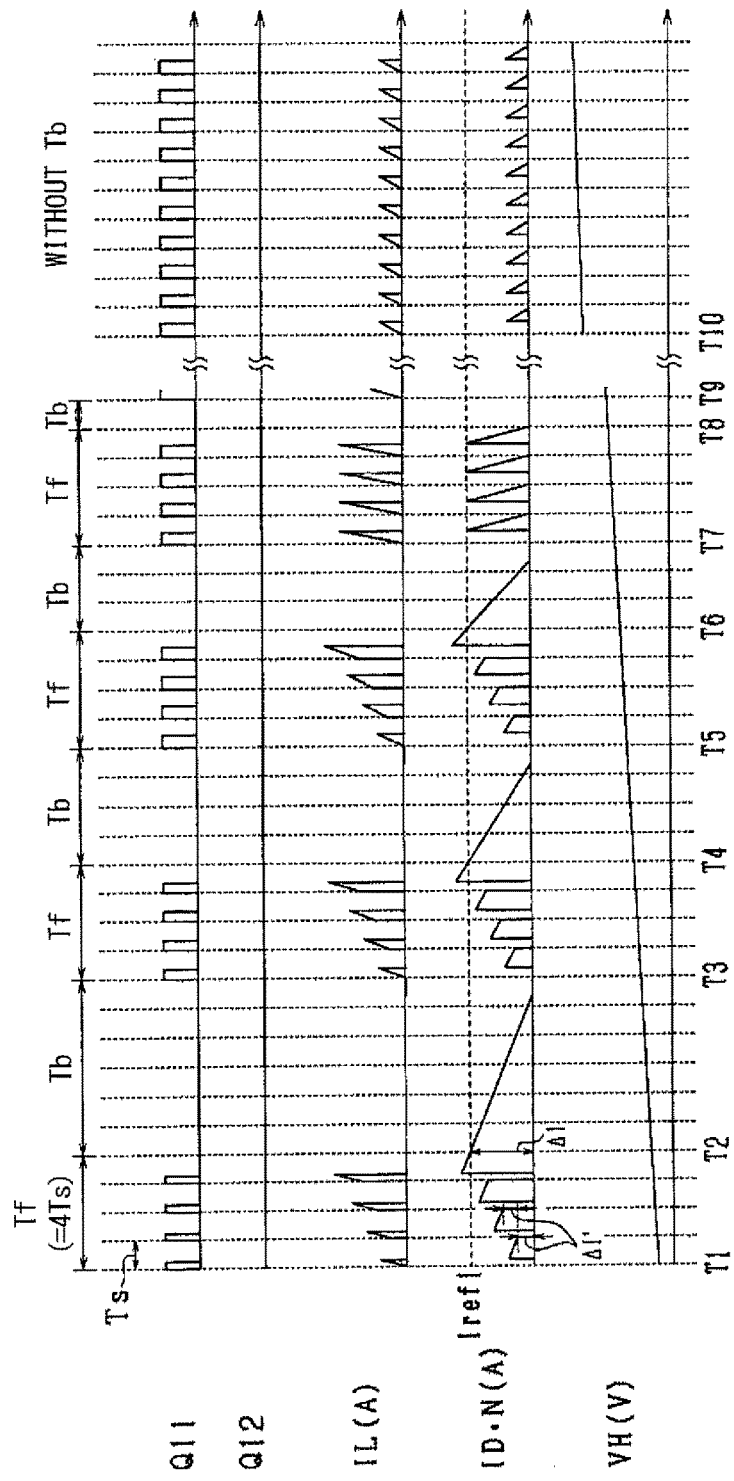
FIG. 20 is a time chart showing a first mode control according to a fifth embodiment of the present disclosure.

FIG. 20 shows opening and closing states of the first switching element Q11 and the second switching element Q12 along with a reactor current IL, the product of the flyback current ID and the turn ratio N, and an output-side voltage VH in the first mode control. In FIG. 20, the control A and the control B are repeated alternately from a time point T1 to a time point T2 to gradually increase a value of the reactor current IL. A period from the time point T2 to a time point T3 is used as the break period Tb. Likewise, the reactor current IL is gradually increased in a period from the time point T3 to a time point T4 and a period from a time point T5 to a time point T6. A period from the time point T4 to the time point T5 and a period from the time point T6 to a time point T7 are used as the break period Tb.

As described above, the control A and the control B are repeated alternately for a fixed control cycle Tf (equal to four control cycles). In a period during which the control A and the control B are repeated alternately, a duty value D, which is a ratio of a length of a period during which the control A is performed to each control cycle, is set in such a manner that the product of the flyback current ID and the turn ratio N acquired at the end of the four control cycles becomes equal to the first command value Iref1. That is to say, the duty value D is set to make an increase amount of a magnetic flux accumulated in a choke coil L13 in the control A larger than a decrease amount of the magnetic flux in the control B. Define ΔI' as an increase amount of the reactor current IL per control cycle, which is also an increase amount of the product of the flyback current ID and the turn ratio N per control cycle, then ΔI' is expressed by Formula (1) as follows.

$$\Delta I' = \left(VB - \frac{VH}{N}\right) \cdot \frac{1}{L} \cdot D \cdot Ts - \frac{VH}{N} \cdot \frac{1}{L} \cdot (1-D) \cdot Ts \quad (1)$$
$$= \frac{VB}{L} \cdot D \cdot Ts - \frac{VH}{N \cdot L} \cdot Ts$$

Suppose that the control in which the control A and the control B are alternately repeated is executed at the fixed control cycle Tf, then, because it is sufficient that ΔI which is the product of the flyback current ID and the turn ratio N after repeat of control A and control B for the fixed control cycle Tf becomes equal to the first command value Iref1, the duty value D can be found by Formula (2) below. That is to say, by acquiring an input-side voltage VB and the output-side voltage VH, the product of the flyback current ID and the turn ratio N after the fixed control cycle Tf can be set to the first command value Iref1 without detecting a value of the reactor current IL. In Formula (2) below, F is a value found by multiplying a length Ts of one control cycle by a natural number.

$$D = -\frac{Iref1 \cdot L/F + VH/N}{VB} \quad (2)$$

On the other hand, a time variation in the product of the flyback current ID and the turn ratio N in the break period Tb is expressed by a value found by dividing the output-side voltage VH by self-inductance L and the turn ratio N and it is sufficient that the flyback current ID decreases to 0 within the break period Tb. Hence, define T as a length of the break period Tb, then T can be found by Formula (3) as follows.

$$T = \frac{Iref1 \cdot L \cdot N}{VH} \quad (3)$$

Herein, the length T of the break period Tb is an integral multiple of the length Ts of one control cycle. That is to say, the length T of the break period Tb found by Formula (3) above is divided by the length Ts of one control cycle and a quotient is rounded up to a nearest integer. In the manner as described above, the flyback current ID is decreased to 0 by the end of the break period Tb without having to change the length Ts of one control cycle.

With the above-described control, in the first mode control, the output-side voltage VH gradually increases and a time variation in the reactor current IL in the control A becomes smaller whereas an absolute value of a time variation in the flyback current ID in the control B becomes larger. Hence, as in a period from the time point T7 to a time point T8 in FIG. 20, the flyback current ID can become zero at the end of one control cycle even when the duty value D is set to an upper-limit value. That is to say, the reactor current IL and the flyback current ID vary in the same manner as shown in FIG. 4B and FIG. 4C of the first embodiment. In such a case, the duty value D is found by Formula (4) below so that an increase amount of the reactor current IL in one control cycle becomes equal to the first command value Ieft.

$$D = \frac{Iref1 \cdot L}{\left(VB - \frac{VH}{N}\right) \cdot Ts} \quad (4)$$

Herein, an upper-limit value (for example, 45%) is set for the duty value D. Hence, even when the duty value D is set to the upper-limit value as the output-side voltage VH increases, a value of the reactor current IL no longer reaches the first command value Iref1. In short, the reactor current IL is in a state at and after a time point T10 of FIG. 20. In such a case, the flyback current ID decreases to zero without having to provide the break period Tb. Hence, the break period Tb may not be provided at all.

A second mode control will now be described. The second mode control is performed in such a manner that a reactor current IL becomes equal to a second command value Iref2 in a control C. In the control C, both of the first switching element Q11 and the second switching element Q12 are set to ON states. In the second mode control, a total of a period during which the control C is performed and a period during which the control A is performed is fixed to a half of one control cycle. Given that a duty value D is a proportion of a length of the period during which the control C is performed in relation to one control cycle, then a time variation in the reactor current IL in the control C is found by dividing the input-side voltage VB by self-inductance L. Hence, the duty value D is expressed by Formula (5) below. In order to find the duty value D, an upper-limit value (for example, 45%) is determined to make the duty value D smaller than half a value of one control cycle.

$$D = \frac{Iref2 \cdot L}{VB \cdot Ts} \quad (5)$$

The third mode control is performed in such a manner that an increase amount of the reactor current IL in the period during which the control C is performed becomes equal to a decrease amount of the reactor current IL in the period during which the control A is performed. Herein, the duty value D is found by Formula (6) below. In the third mode control, in order to provide a period during which both of the first switching element Q11 and the second switching element Q12 are in ON states, an upper-limit value (for example, 55%) is set to the duty value D.

$$D = \left(1 - \frac{N \cdot VB}{2 \cdot VH}\right) \quad (6)$$

Figure 21:
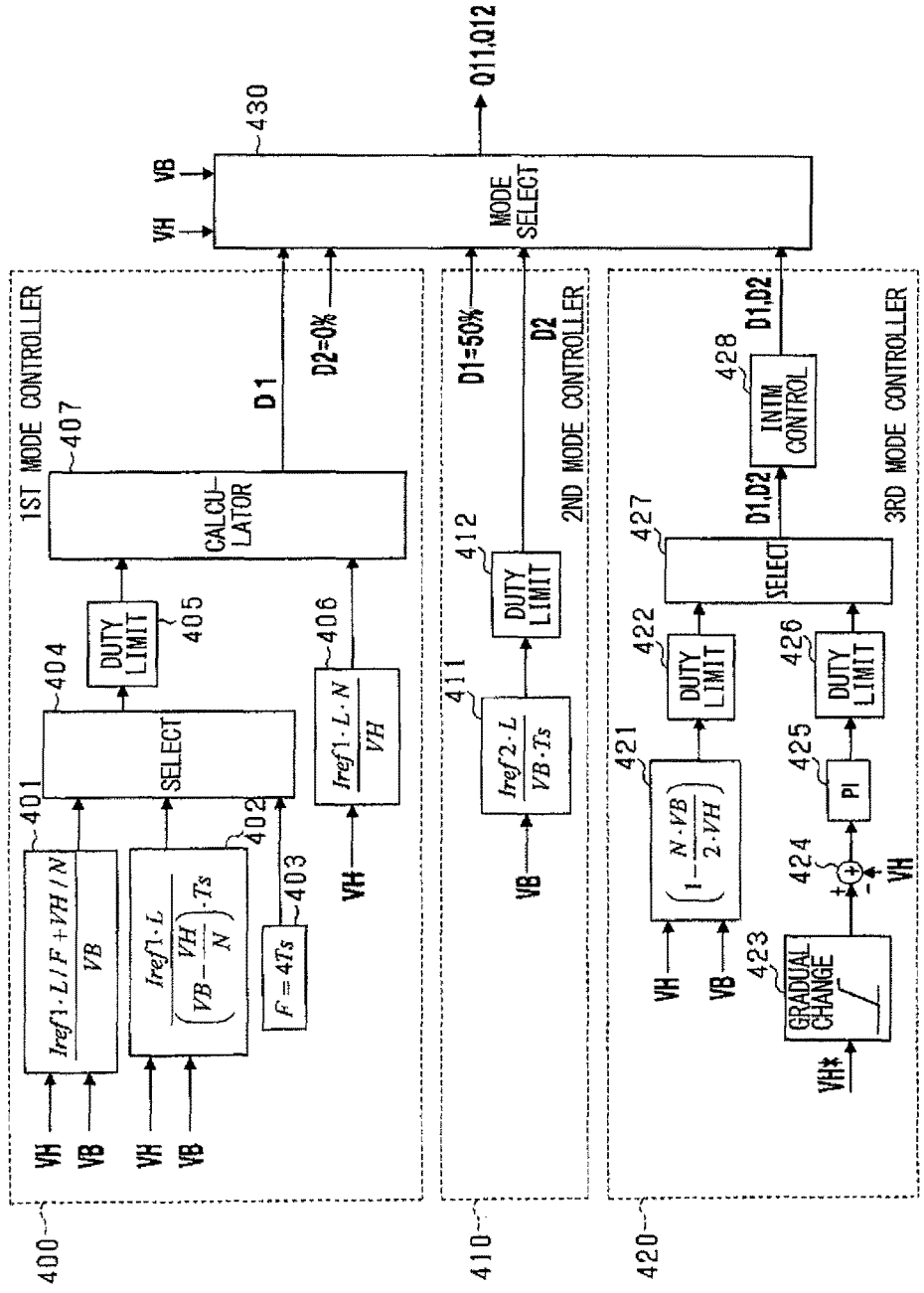
FIG. 21 is a block diagram showing a configuration of a controller to perform a control process in the fifth embodiment.

A control performed by a controller 300 will now be described with reference to a control block diagram of FIG. 21. In a first mode controller (1ST MODE CONTROLLER) 400, the output-side voltage VH and the input-side voltage VB are inputted into each of a first calculation portion 401 and a second calculation portion 402. The first calculation portion 401 calculates Formula (2) described above to find a duty value D. The second calculation portion 402 calculates Formula (4) described above to find another duty value D. The duty values D that are calculated are inputted into a selection portion (SELECT) 404, and the selection portion 404 selects one of the input duty values D which is smaller than one another. Herein, a value F of a length of the fixed cycle Tf acquired by a fixed cycle acquisition portion 403 is also inputted into the selection portion 404. The value F of the length of the fixed cycle Tf is a preliminarily determined value and, for example, is set to four control cycles. The selected duty value D is inputted into a duty limit portion (DUTY LIMIT) 405.

While the duty value D is calculated as described above, the length T of the break period Tb is calculated by inputting the output-side voltage VH into a break period calculation portion 406. Herein, as described above, the length T of the break period Tb is an integral multiple of the length Ts of one control cycle.

After the duty value D and the length T of the break period Tb are found in the manner described above, both values are inputted into a calculation portion (CALCULATOR) 407. The calculation portion 407 outputs a value calculated as the duty value D as D1 which is the duty value D indicating a proportion of a length of an ON period of the first switching element Q11 until the fixed cycle Tf elapses. Also, as for D2 which is the duty value D indicating a length of an ON period of the switching element Q12, a signal indicating 0%, that is, a signal indicating the switching element Q12 is normally set to OFF state is outputted. When the fixed cycle Tf has elapsed, 0% is outputted as both of D1 and D2 in order to control the break period Tb. This control is continued until the break period Tb elapses.

In a second mode controller (2ND MODE CONTROLLER) 410, the input-side voltage VB is inputted into a calculation portion 411. In the calculation portion 411, a duty value D is calculated using Formula (5) described above and the calculated duty value D is inputted into a duty limit portion (DUTY LIMIT) 412. When the input duty value D is equal to or less than the upper-limit value, the duty limit portion 412 directly outputs the input duty value D. When the input duty value D is larger than the upper-limit value, the duty limit portion 412 sets the duty value D to the upper-limit value and outputs the duty value D at the upper-limit value. Herein, the duty value D is outputted as D2 which is the duty value D indicating a proportion of a length of an ON period of the second switching element Q12. In the second mode controller, D1, which is the duty value D indicating a proportion of the length of an ON period of the first switching element Q11, is fixed to 50% and is outputted together with the duty value D2.

In a third mode controller (3RD MODE CONTROLLER) 420, the output-side voltage VH and the input-side voltage VB are inputted into a calculation portion 421. The calculation portion 421 calculates a duty value D using Formula (6) described above, and a duty limit portion (DUTY LIMIT) 422 sets the calculated duty value D to a value equal to or larger than a lower-limit value. Meanwhile, a constant voltage control using a command value VH* of the output-side voltage VH is also performed. It is set in such a manner that the command value VH* is inputted into a gradual changing portion (GRADUAL CHANGE) 423 and the command value VH* gradually increases with an increase of a charging amount in the capacitor 201. The command value VH* processed by the gradual charging portion 423 is inputted into an adder 424 to find a difference from the detected output-side voltage VH. The difference is inputted into a PI controller 425 to calculate a duty value D. The calculated duty value D is set to a value equal to or greater than the lower-limit value in a duty limit portion (DUTY LIMIT) 426. The duty values D found in the manner as described above are inputted into a selection portion (SELECT) 427 and one of the input duty values D which is the smaller than one another is outputted by the selection portion 427.

In an intermittent control portion (INTM CONTROL) 428, both duty values D1 and D2 are set to zero and switching operation is stopped at least in one of a case where the output-side voltage VH is higher than a predetermined value and a case where the input duty value D is smaller than a predetermined value. The predetermined value compared with the output-side voltage VH is set to a value indicating that a charge to the capacitor 201 is completed. The predetermined value compared with the duty value D is set to be larger than at least one of the lower-limit value in the duty limit portion 422 or the lower-limit value in the duty limit portion 426.

A case where the duty value D which is obtained as a result of the constant voltage control and selected in the selection portion 427 is smaller than the predetermined value means a case where a difference between the command value VH* and the output-side voltage VH becomes smaller. A case where the duty value D which is calculated in the calculation portion 421 and selected in the selection portion 472 is smaller than the predetermined value means a case where a value of the output-side voltage VH becomes closer to a value found by multiplying a value of the input-side voltage VB by the turn ratio N. Hence, a case where the input duty value D is smaller than the predetermined value means a case where the charging amount of the capacitor 201 is increased and the output-side voltage VH takes a value indicating that a charge to the capacitor 201 is completed.

That is to say, when a charge to the capacitor 201 is completed, a further or continuous charge is stopped by a determination of the intermittent control portion 428. As the capacitor 201 discharges in a later time, a charge to the capacitor 201 is started again by a determination of the intermittent control portion 428. Hence, the control is performed in such a manner that the output-side voltage VH gradually increases and gradually decreases alternately and repetitively in the neighborhood of the command value VH* after a charge to the capacitor 201 is completed.

The duty value D processed by the intermittent control portion 428 is outputted as D1 which is the duty value D of the first switching element Q11 and D2 which is the duty value D of the second switching element Q12.

Herein, D1 and D2 found as described above are inputted into a mode selection portion (MODE SELECT) 430. Similar to the first embodiment, in the mode selection portion 430, which mode control is to be performed is selected based on the output-side voltage VH, and a control signal is sent to the first switching element Q11 and the second switching element Q12. The determination may be made based on the input-side voltage VB instead of the output-side voltage VH.

In the present embodiment, the detected output-side voltage VH is used. When the output-side voltage VH is small, by adding a voltage drop amount VF caused by a diode D1, a control at a higher degree of accuracy can be performed. In such a case, the voltage drop amount VF is added to the output-side voltage VH in the respective formulas described above.

With the above-described configuration, the power conversion apparatus of the present embodiment achieves effects as follows.

The first mode control is performed in such a manner that the product of the flyback current ID and the turn ratio N becomes equal to the first command value Iref1 when the control in which the control A and the control B are repeated alternately is performed for the predetermined control cycles. Consequently, even when the output-side voltage VH is small and an increase amount of the reactor current IL in one control cycle is small, the above-configuration can speed up a supply rate of power.

The break period Tb during which the control B is continued is provided after the control in which the control A and the control B are repeated alternately is performed for the predetermined control cycles. Consequently, the increased reactor current IL can be decreased to zero and hence an excessive increase of the reactor current IL can be restricted.

Sixth Embodiment

Figure 22:
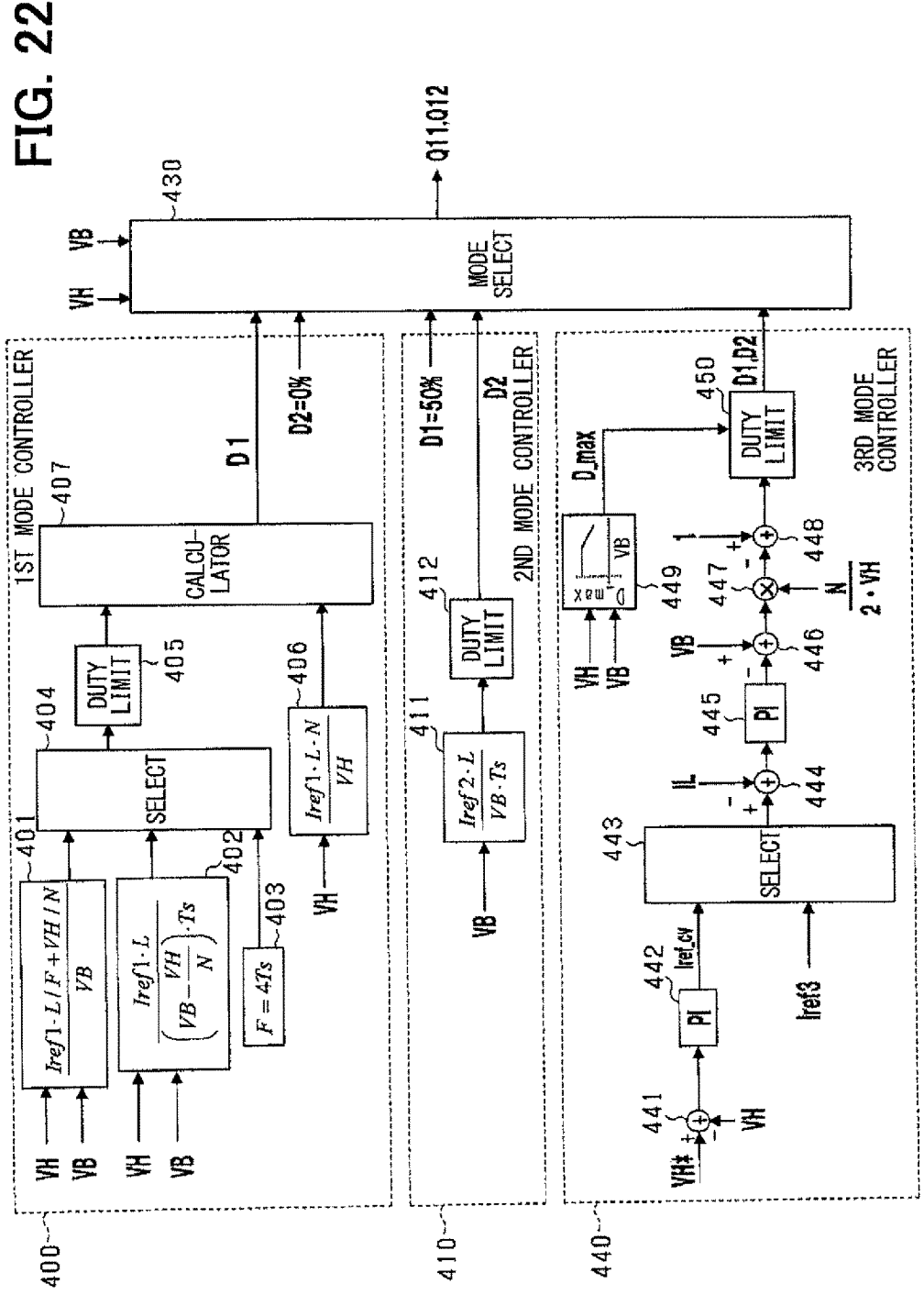
FIG. 22 is a block diagram showing a configuration of a controller to perform a control process in a sixth embodiment of the present disclosure.

In the present embodiment, a part of process performed by a controller 300 is different from the process in the fifth embodiment. More specifically, a value of a reactor current IL detected by a current detector portion 103 is used in a third mode control. FIG. 22 is a control block diagram showing process performed by the controller 300 of the present embodiment. Process executed by a first mode controller 400 and process executed by a second mode controller 410 are same as the corresponding processes described in the fifth embodiment and a description is omitted herein.

In a third mode controller 440, a difference between an output-side voltage VH and a command value VH* is found by an adder 441. The difference is set as a constant voltage command value Iref_cv in a PI controller 442. The constant voltage command value Iref_cv is inputted into a selection portion (SELECT) 443. Meanwhile, a third command value Iref3 which is a command value of a constant current control is also inputted into the selection portion 443. The selection portion 443 selects and outputs one of the inputted command values which is smaller than one another. The constant voltage command value Iref_cv or the third command value Iref3 outputted from the selection portion 443 is inputted into an adder 444, and the adder finds a difference between the inputted voltage value and the reactor current IL. The difference is inputted into the PI controller 445. An output of the PI controller 445 is inputted into an adder 446 to find a difference from the input-side voltage VB. The difference is multiplied by a value found by dividing a turn ratio N by the output-side voltage VH in a multiplier 447. In an adder 448, 1 is subtracted from the multiplication result and a value found by the above-described calculation is set as a duty value D.

The duty value D calculated as described above is inputted into a duty limit portion (DUTY LIMIT) 450. An upper-limit value D_max found in an upper-limit value setting portion 449 is also inputted into the duty limit portion 450. The upper-limit value D_max is determined by a value of the input-side voltage VB and a value of the output-side voltage VH. When the calculated duty value D is larger than the upper-limit value D_max, the duty limit portion 450 outputs the duty value D as the upper-limit value D_max.

Herein, D1 and 02 found in the manner as described above are inputted into a mode selection portion 430. In the mode selection portion 430, as in the first embodiment, mode control that is to be performed is selected based on the output-side voltage VH, and a control signal is sent to a first switching element Q11 and a second switching element Q12.

With the above-described configuration, the power conversion apparatus of the present embodiment provides advantages similar to the advantages provided by the power conversion apparatus of the fifth embodiment.

Seventh Embodiment

In the present embodiment, a first mode control is different from the first mode control in the first embodiment. FIG.

23 shows opening and closing states of each of a first switching element Q11 and a second switching element Q12 along with a reactor current value IL, and a value found by multiplying a flyback current ID by a turn ratio N (the product of the flyback current ID and the turn ratio N) in the first mode control.

When the first mode control is performed in such a manner that the reactor current IL becomes equal to a first command value Iref1 in a control A, the flyback current ID may not decrease to zero at an end of a period of a control B. In such a case, the reactor current IL may possibly increase endlessly. Also, the flyback current ID may possibly decrease to zero before the period of the control B ends. In this case, although an unwanted endless increase of the reactor current IL can be restricted, a supply rate of power may be reduced.

On the other hand, when the first mode control is performed in such a manner that an increase amount of the reactor current IL in the control A becomes equal to a decrease amount of the product of the flyback current ID and the turn ratio N in the control B, the reactor current IL may fail to reach the first command value Iref1 in the control A. Even in such a case, although an unwanted endless increase of the reactor current IL can be restricted, a supply rate of power may be reduced, too.

Figure 23:
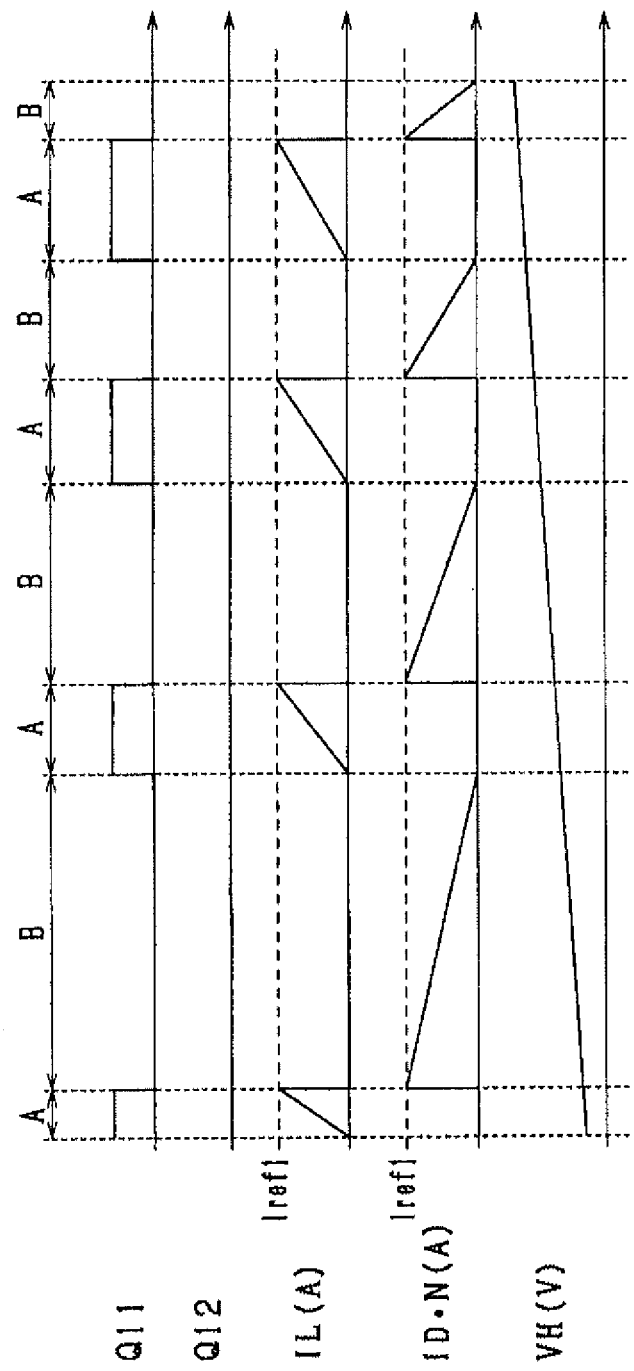
FIG. 23 is a time chart showing a first mode control according to a seventh embodiment of the present disclosure.

In the present embodiment, as is shown in FIG. 23, a length Ts of one control cycle is made variable in such a manner that the reactor current IL becomes equal to the first command value Iref1 in the control A and the flyback current ID decreases to 0 at the end of the control B.

By making the reactor current IL to be equal to the first command value Iref1 in the control A, Formula (7) below is established. By making a decrease amount of the product of the flyback current ID and the turn ratio N to be equal to the first command value Iref1 in the control B, Formula (8) below is established.

$$\left(VB - \frac{VH}{N}\right) \cdot \frac{1}{L} \cdot D \cdot Ts = Iref1 \quad (7)$$

$$-\frac{VH}{N} \cdot \frac{1}{L} \cdot (1-D) \cdot Ts = -Iref1 \quad (8)$$

By calculating Formula (7) and Formula (8) above, a length Ts of one control cycle can be found by Formula (9) below and a duty value D is found by Formula (10) below.

$$Ts = Iref1 \cdot \frac{N \cdot VB}{N \cdot VB - VH} \cdot \frac{N \cdot L}{VH} \quad (9)$$

$$D = \frac{VH}{VB \cdot N} \quad (10)$$

Because the control is performed as described above, a length Ts of one control cycle becomes shorter when the output-side voltage VH and charging amount of the capacitor 201 are increased.

With the above-described configuration, the power conversion apparatus of the present embodiment can speed up a supply rate of power while restricting an excess increase of the reactor current IL.

Eighth Embodiment

A power conversion apparatus of the present embodiment is different from the first embodiment in a part of a circuit configuration and control operation performed by a controller.

Figure 24:
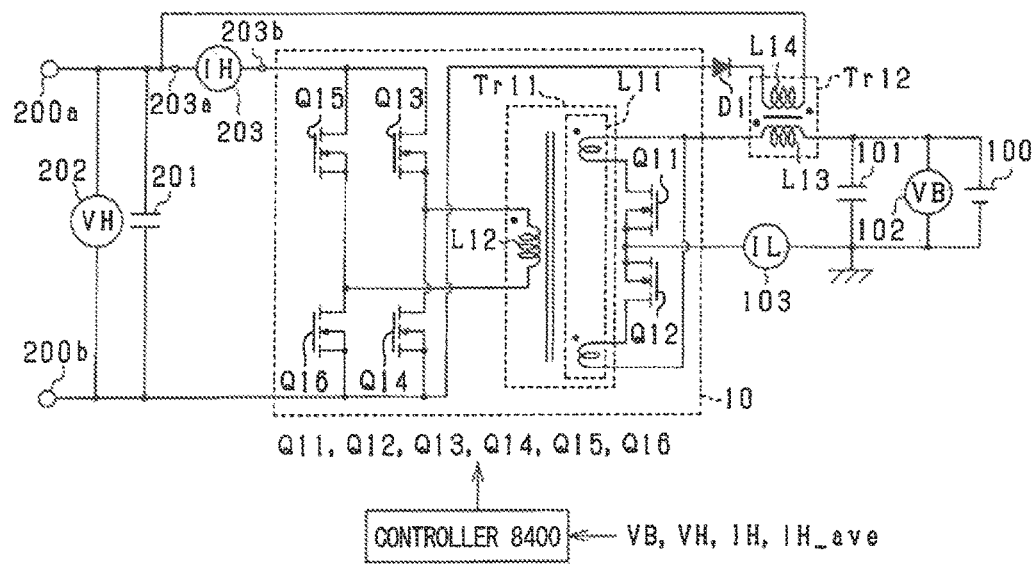
FIG. 24 is a circuit diagram showing a configuration of a power conversion apparatus according to an eighth embodiment of the present disclosure.

FIG. 24 is a circuit diagram of the power conversion apparatus of the present embodiment. In the present embodiment, the power conversion apparatus includes a current detection portion 203 detecting an output-side current IH which is a current value of a circuit on an output side during a pre-charge and an average value IH_ave of the output-side current IH. The current detection portion 203 is provided to the circuit on the output side. One end of the current detection portion 203 is connected to a connection point at which positive-electrode wire is connected with an auxiliary coil L14, and the other end of the current detection portion 203 is connected to a power conversion circuit 10.

Figure 25:
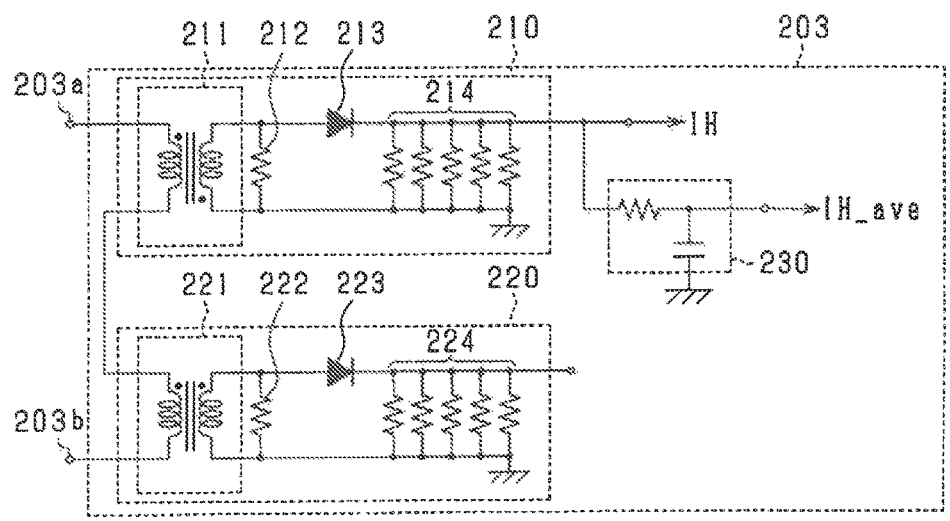
FIG. 25 is a circuit diagram showing a configuration of a current detection portion in the eighth embodiment.

A specific circuit configuration of the current detection portion 203 will be described in detail with reference to FIG. 25. The current detection portion 203 includes a first current transformer 210 and a second current transformer 220.

The first current transformer 210 includes a first transformer 211 including a pair of magnetically-coupled coils, a reset resistor 212 connected across the first transformer 211, a diode 213 with an anode connected to a connection point of the first transformer 211 and the reset resistor 212 on a positive electrode side, and a termination resistor 214 with a first side connected to a cathode of the diode 213 and a second side connected to the ground. A polarity of the first transformer 211 is determined so that a current flows into the anode of the diode 213 when a current flows from a second terminal 203b to a first terminal 203a. Hence, when power is supplied from a side of a secondary cell 100, a current flows through the first transformer 211.

The second current transformer 220 includes a second transformer 221 including a pair of magnetically-coupled coils, a reset resistor 222 connected across the second transformer 221, a diode 223 with an anode connected to a connection point of the second transformer 221 and the reset resistor 222 on the positive electrode side, and a termination resistor 224 with a first side connected to a cathode of the diode 223 and a second side connected to the ground. A polarity of the second transformer 221 is determined so that a current flows into the anode of the diode 223 when a current flows from the first terminal 203a to the second terminal 203b. Hence, when power is supplied to the side of the secondary cell 100, a current flows through the second transformer 221.

The first current transformer 210 outputs the output-side current IH. Further, an RC circuit 230 receives the output-side current IH and outputs the average value IH_ave of the output-side current IH. A current outputted from the second current transformer 220 is used when power is supplied to the secondary cell 100.

Figure 26:
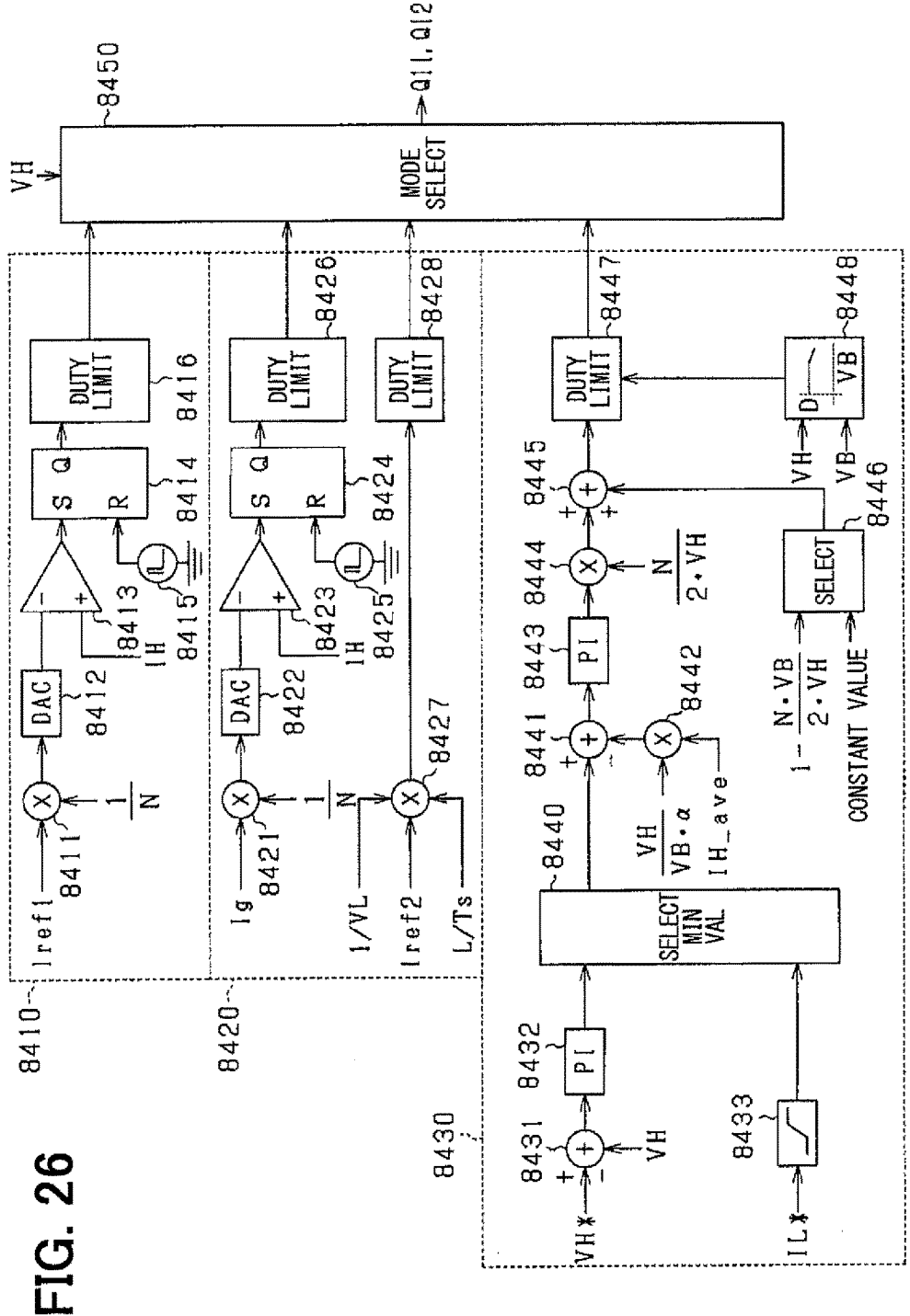
FIG. 26 is a block diagram showing a configuration of a controller to perform a control process according to the eighth embodiment.

A controller 8400 acquires the output-side current IH and the average value IH_ave of the output-side current IH, which are detected in the above-described manner, and performs control process similar to the first through third mode controls described in the first embodiment. The following will describe control process performed by the controller 8400 with reference to FIG. 26.

Firstly, a first mode setting portion 8410 will be described. A first command value Iref1 which is a command value of a reactor current IL is first inputted into a multiplier 8411 and multiplied by a reciprocal of a turn ratio N. In short, a command value of the reactor current IL is converted to a command value of the output-side current IH. The value obtained from the multiplier 8411 is inputted into a minus terminal of a comparator 8413 via a digital to analog converter (DAC) 8412. Meanwhile, the output-side current IH is inputted into a plus terminal of the comparator 8413.

The comparator 8413 compares a command value of the output-side current IH, which converted from the first command value Iref1 and inputted into the minus terminal, with the output-side current IH inputted into the plus terminal. The comparator 8413 outputs a low level signal to an S terminal of an RS flip-flop 8414 while an input value at the plus terminal is larger than an input value at the minus terminal. A clock signal is inputted into an R terminal of the RS flip-flop 8414 from a clock 8415.

In a first mode control, when an input signal to the RS flip-flop 8414 is a low level signal, it means that the output-side current IH exceeds a value found by dividing the first command value Iref1 by the turn ratio N. Hence, the RS flip-flop 8414 switches a control A to a control B by sending a signal which sets both a first switching element Q11 and a second switching element Q12 to OFF states. After an elapse of one control cycle, the RS flip-flop 8414 switches the control B to the control A by sending a signal which sets one of the first switching element Q11 and the second switching element Q12 to ON state and the other one to OFF state.

An output signal of the RS flip-flop 8414 is inputted into a duty limit portion (DUTY LIMIT) 8416. When duty values of the first switching element Q11 and the second switching element Q12 are larger than an upper-limit value, the duty limit portion 8416 sets the duty value to be equal to the upper-limit value. The upper-limit value is set to a value less than 50%, for example, 45%. A control signal of the first switching element Q11 and the second switching element Q12 found in the manner as described above is inputted into a mode selection portion (MODE SELECT) 8450.

A second mode setting portion 8420 will now be described. In the second mode setting portion 8420, a calculation to set the first switching element Q11 to ON state or OFF state is performed separately from the calculation to set the second switching element Q12 to ON state or OFF state.

In a control on the first switching element Q11, an upper-limit value Ig of an input-side current is inputted first into a multiplier 8421 and multiplied by a reciprocal of the turn ratio N. The upper-limit value Ig indicates an upper limit of a reactor current IL at an end of a control A in a second mode control. In short, the upper limit of the reactor current IL is converted to an upper limit of the output-side current IH. The value obtained in the multiplier 8421 is inputted into a minus terminal of a comparator 8423 via a digital to analog converter 8422. Meanwhile, the output-side current IH is inputted into a plus terminal of the comparator 8423.

The comparator 8423 compares a value of the upper limit of the output-side current IH, which is converted from the upper-limit value Ig and inputted into the minus terminal, with the output-side current IH, which is inputted into the plus terminal. A low level signal is inputted into an S terminal of an RS flip-flop 8424 while an input value at the plus terminal is larger than an input value at the minus terminal. A clock signal is inputted into an R terminal of the RS flip-flop 8424 from a clock 8425.

When an input signal is a low level signal, it means that the output-side current IH exceeds a value found by dividing the upper-limit value Ig by the turn ratio N. Hence, the RS flip-flop 8424 outputs a signal to set the first switching element Q11 to OFF state. An output signal of the RS flip-flop 8424 is inputted into a duty limit portion (DUTY LIMIT) 8426. When a duty value of the first switching element Q11 is larger than an upper-limit value, the duty limit portion 8426 sets the duty value of the first switching element Q11 to be equal to the upper-limit value. The upper-limit value is set to, for example, 50%. A control signal of the first switching element Q11 set in the manner as described above is inputted into the mode selection portion 8450.

In a control on the second switching element Q12, a second command value Iref2 of the reactor current IL is inputted into a multiplier 8427. A reciprocal of a reactor voltage VL and a value found by dividing self-inductance L of a choke coil L13 by a length Ts of one control cycle are also inputted into the multiplier 8427. An output value of the multiplier 8427 is inputted into a duty limit portion (DUTY LIMIT) 8428. When a duty value of the second switching element Q12 is larger than an upper-limit value, the duty limit portion 8428 sets the duty value to be equal to an upper-limit value which is set to be less than 50%. The upper-limit value is set to, for example, 45%. A control signal of the second switching element Q12 set in the manner as described above is inputted into the mode selection portion 8450.

A third mode setting portion 8430 will now be described. In the third mode setting portion 8430, a command value of an average value of the reactor current IL is found first. More specifically, a command value to perform a constant voltage control and a command value to perform a constant current control are found and a third mode control is performed using a minimum command value among the found command values.

In order to find a command value of the constant voltage control, a target value VH* of the output-side voltage VH and the detected output-side voltage VH are inputted into an adder 8431 and a difference of the two is inputted into a PI controller 8432. An output value of the PI controller 8432 is a command value of the reactor current IL when the constant voltage control is performed and is inputted into a minimum selection portion (SELECT MIN VAL) 8440.

The controller 8400 also acquires a command value IL* of the reactor current IL from a higher stage ECU via controller area network (CAN) communications or the like. CAN is registered trademark. The command value IL* is inputted into a gradual changing portion 8433. The gradual changing portion 8433 outputs a gradually increasing value of the input command value IL*. The output value of the gradual changing portion 8433 is inputted into the minimum selection portion 8440.

When the respective command values are inputted into the minimum selection portion 8440 in the manner as described above, the minimum selection portion 8440 outputs a minimum value among the respective input command values as a command value. The command value outputted from the minimum selection portion 8440 is inputted into an adder 8441. A value of the reactor current IL converted from an average value IH_ave of the output-side current IH, is also inputted into the adder 8441. More specifically, an average value IH_ave of the output-side current IH and a value found by dividing the output-side voltage VH by the input-side voltage VB are inputted into a multiplier 8442. In order to perform a multiplication in the multiplier 8442, a conversion efficiency α of a power conversion circuit 10 may be taken into consideration, An output value of the multiplier 8442 is inputted into the adder 8441. In the adder 8441, a difference between the two input values is found and the difference is inputted into a PI controller 8443.

An output value of the PI controller 8443 is inputted into a multiplier 8444 and multiplied by a value found by dividing the turn ratio N by a value two times larger than a value of the output-side voltage VH. An output value of the multiplier 8444 is inputted into an adder 8445. One of a feed-forward control duty value and a constant value, which is selected in a selection portion (SELECT) 8446, is inputted into the adder 8445. Herein, the selection portion 8446 selects the feed-forward control duty value until a completion of the charging in the capacitor 201 in the third mode control and selects the constant value after the charging to the capacitor 201 is completed.

An output value of the adder 8445 is inputted into a duty limit portion (DUTY LIMIT) 8447. An upper-limit value of the duty value found in an upper-limit setting portion 8448 is also inputted into the duty limit portion 8447. The upper-limit value of the duty value is determined by the input-side voltage VB and the output-side voltage VH. When the calculated duty value is larger than the upper-limit value, the duty limit portion 8447 outputs the upper-limit value. An output value of the duty limit portion 8447 is inputted into the mode selection portion 8450.

The output-side voltage VH is also inputted into the mode selection portion 8450 and any control mode selected among the first through third mode controls is performed as shown in the flowchart of FIG. 9 of the first embodiment. The first switching element Q11 and the second switching element Q12 are controlled by the selected mode control.

Figure 27:
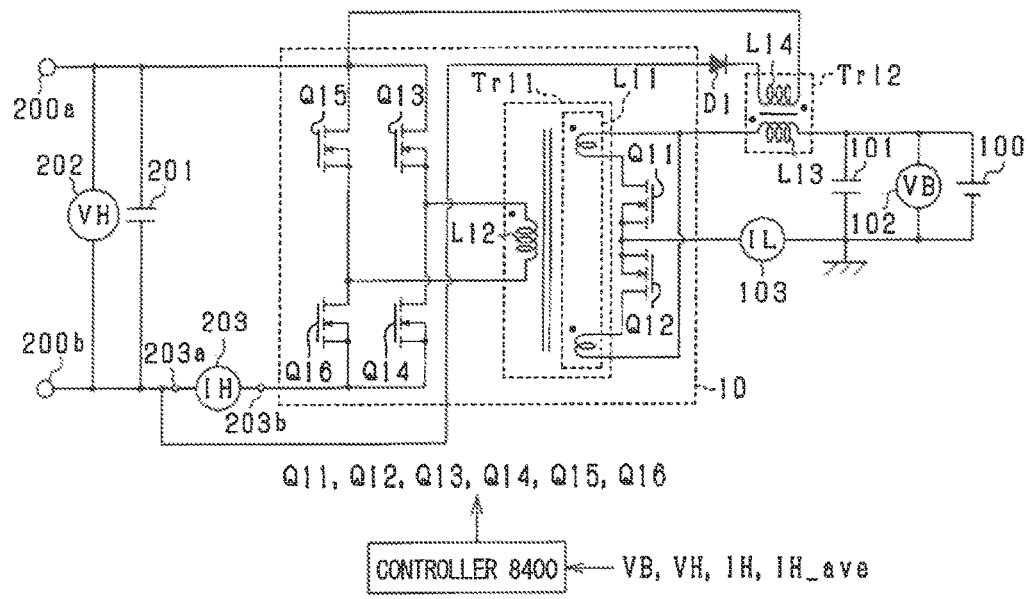
FIG. 27 is a circuit diagram showing an exemplary configuration of the power conversion apparatus in the eighth embodiment.

In the power conversion apparatus of the present embodiment, a position where the current detection portion 203 is provided may be changed as shown in FIG. 27. More specifically, the current detection portion 203 may be provided in the circuit on the output side between a connection point at which a negative-electrode wire is connected with the auxiliary coil L14 and the power conversion circuit 10.

Figure 28:
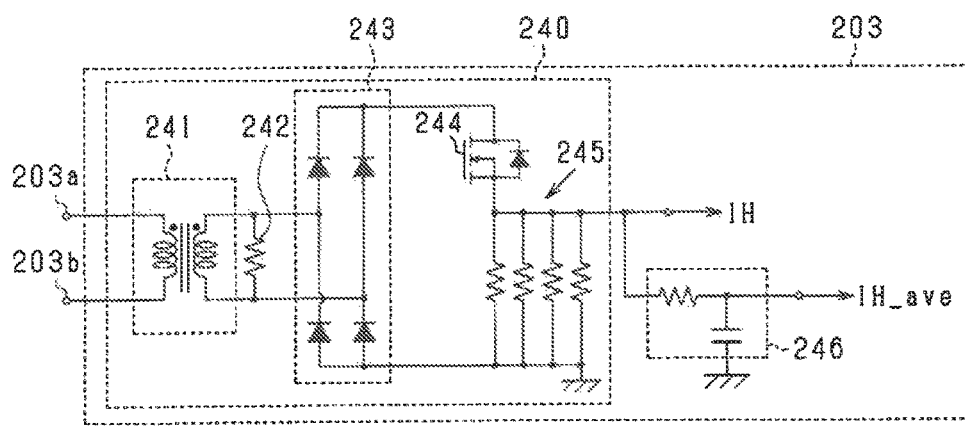
FIG. 28 is a circuit diagram showing an exemplary configuration of the current detection portion in the eighth embodiment.

The circuit configuration of the current detection portion 203 of the present embodiment may be changed as shown in FIG. 28. More specifically, the current detection portion 203 may include a current transformer 240. In this configuration, the current transformer 240 includes a transformer 241 made up of a pair of magnetically-coupled coils, a reset resistor 242 connected across the transformer 241, a diode bridge circuit 243 connected across the transformer 241, a switch 244 connected to the diode bridge circuit 243 in series on an output side of a positive electrode, and a termination resistor 245 with a first side connected to the switch 244 in series and a second side connected to the ground.

The diode bridge circuit 243 has two series-connected bodies each including two series-connected diodes. In each series-connected body, a cathode of a second diode is connected to an anode of a first diode. A first end of the coil included in the transformer 241 is connected to a connection point at which the first diode is connected with the second diode in one series-connected body. A second end of the coil included in the transformer 241 is connected to a connection point at which the first diode is connected with the second diode in the other one series-connected body.

The switch 244 turns ON when the current transformer 240 detects a current value. Because a current outputted from the transformer 241 is outputted via the diode bridge circuit 243, a current value can be detected either in a case where a current flows from a first terminal 203*a* to a second terminal 203*b* or in a case where a current flows from the second terminal 203*b* to the first terminal 203*a*. That is to say, a current value can be detected either when power is supplied from the secondary cell 100 or when power is supplied to the secondary cell 100.

An output-side current IH which is a current when power is supplied from the secondary cell 100 and an average value IH_ave of the output-side current IH, which is a value of the output-side current IH outputted via an RC circuit 246, are obtained from the current transformer 240. A control using the output-side current IH and the average value IH_ave of the output-side current IH is performed in a similar manner with above description which is described with reference to FIG. 26.

With the above-described configuration, the power conversion apparatus of the present embodiment achieves the following effects.

In general, the reactor current IL is relatively high in a configuration where a current detector 103 is provided on the side of the secondary cell 100 to detect the reactor current IL. Hence, a shunt resistor for high current needs to be used. In order to reduce a power loss in the shunt resistor, a resistance value of the shunt resistor is reduced. In such a case, an output value of the current detector 103 becomes small and an amplifier is required to detect the reactor current IL by amplification. In a case where a current is measured using the amplifier, a delay may possibly occur in the control because a response of the amplifier is generally slow. In contrast to the configuration in which the amplifier is provided, the current detection portion 203 is provided to the circuit on the output side to detect the output-side current IH in the present embodiment. Hence, the control can be performed at a higher speed and a control accuracy can be improved.

The current transformer 210 is used as the current detection portion 203. When a current continues to flow through the current transformer 210, the transformer 211 in the current detection portion 203 may possibly become saturated. A case where a current continues to flow through the current transformer 210 means a case as shown in FIG. 4A in the first embodiment described above where the output-side voltage VH has a small voltage value. That is to say, the transformer 211 in the current transformer 210 saturates in a case where the output-side voltage VH is low and a ripple current superimposes on the DC current. In the present embodiment, the current detection portion 203 is provided to the circuit on the output side between a connection point where the positive-electrode wire is connected with the auxiliary coil L14 and the power conversion circuit 10. With this configuration, the current detection portion 203 detects a current when power is supplied via the power conversion circuit 10 but does not detect a current supplied via the choke coil L13 and the auxiliary coil L14. In short, the current detection portion 203 detects a current in the control A in each of the first through third mode controls and does not detect a current in the control B in each of the first and second mode controls. Consequently, even in a case where the output-side current IH is low as shown in FIG. 4A of the first embodiment, a current no longer continues to flow through the current transformer 210 and saturation of the transformer 211 can be restricted. In addition, although the current is not detected in the control B, a current in the control A can be detected. Hence, an accuracy of the control can be improved by using the current in the control A.

Ninth Embodiment

A power conversion apparatus of the present embodiment is different from the first embodiment in a part of a circuit configuration and control operation performed by a controller.

Figure 29:
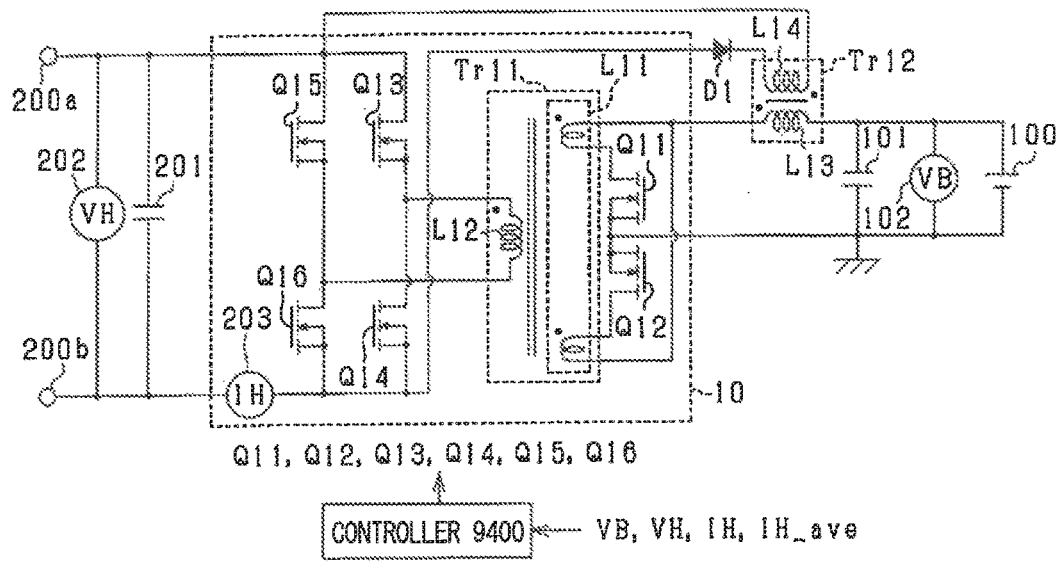
FIG. 29 is a circuit diagram showing a configuration of a power conversion apparatus according to a ninth embodiment of the present disclosure.

FIG. 29 is a circuit diagram showing a configuration of a power conversion apparatus according to the present embodiment. In the present embodiment, the power conversion apparatus includes the current detection portion 203 which detects an output-side current flowing through the output-side circuit and an average value IH_ave of the output-side current IH. Specifically, in the example shown in FIG. 29, the current detection portion 203 is connected to a negative terminal of the output side circuit. Alternatively, the current detection portion 203 may be connected to a positive terminal of the output side circuit.

The controller 9400 performs a calculation based on the input-side voltage VB, the output-side voltage VH, the output-side current IH, and the average value IH_ave of the output-side current IH. Based on the calculation result, the controller 9400 performs the first mode control to the third mode control as the first embodiment. Specifically, in the first mode control and the second mode control, the controller 9400 performs the peak current control so that the output-side current IH becomes equal to the command value. In the third mode control, the controller 9400 average current control so that the average value IH_ave of the output-side current IH becomes equal to the command value.

In the first mode control, the control performed when the output-side voltage VH is equal to or lower than a predetermined value V0 is different from the control performed when the output-side voltage VH is higher than the predetermined value V0. Hereinafter, the predetermined value V0 is also referred to as a reference value, and is set lower than the first predetermined value V1. Specifically, when the output-side voltage VH is equal to or lower than the predetermined value V0, a predetermined control (hereinafter, referred to as 1a mode control) is carried out as a part of the first mode control. When the output-side voltage VH is higher than the predetermined value V0 and equal to or lower than a first predetermined value V1, another predetermined control (hereinafter, referred to as 1b mode control) is carried out as a part of the first mode control.

Figure 30:
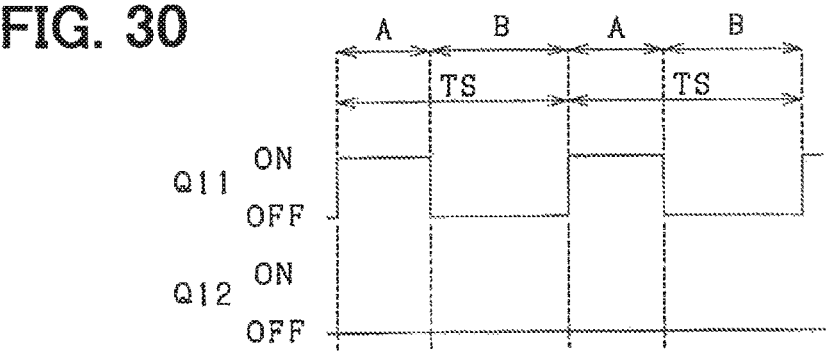
FIG. 30 is a time chart showing 1a mode control according to the ninth embodiment.
Figure 31:
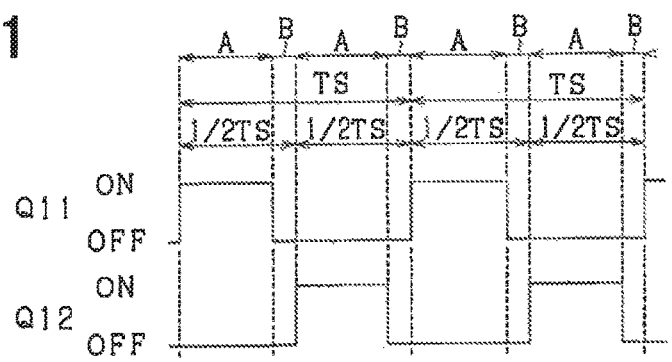
FIG. 31 is a time chart showing 1a mode control according to the ninth embodiment.

The following will describe the first mode control carried out in the present embodiment with reference to FIG. 30 and FIG. 31. Further, the turning on and turning off time points of the first switching element Q11 and the second switching element Q12 in the second mode control and in the third mode control are similar to the first embodiment. Thus, detailed description will be omitted.

In the 1a mode control, ON state and OFF state of the first switching element Q11 is alternately switched and the second switching element Q12 is maintained in the OFF state. In this case, for the first switching element Q11, a ratio of the ON state duration to the one control cycle Ts is set up to a value lower than 50%. That is, an upper limit value of the ratio is set to lower than 50%. Specifically, the upper limit value of the ratio may be set to 45%. In the peak current control, the ON state of the first switching element Q11 is switched to OFF state when (1) the output-side current IH becomes equal to the command value or (ii) the ratio of the ON state duration to the one control cycle Ts becomes equal to 45%. Hereinafter, the ratio of the ON state duration to the one control cycle Ts is also referred to as duty ratio.

The controls to the first switching element Q11 and the second switching element Q12 are carried out as described above. Thus, as shown in FIG. 30, in the 1a mode control, a control A and a control B are alternately carried out. In the control A, the first switching element Q11 is set to ON state and the second switching element Q12 is set to OFF state. In the control B, both of the first switching element Q11 and the second switching element Q12 are set to OFF state. The duration of the control A is shorter than half of one control cycle Ts.

In the 1a mode control, alternatively, the first switching element Q11 may be set to OFF state all the time and the ON state and OFF state of the second switching element Q12 may be alternately switched. Further, for a predetermined number of the control cycles, the switching element which is maintained in the OFF state all the time and the switching element which is alternately set to ON state and OFF state may be switched with one another.

In 1b mode control, each of the first switching element Q11 and the second switching element Q12 is alternately set to ON state and OFF state. In this control, the ON or OFF states of the first switching element Q11 and the second switching element Q12 are controlled so that a duration in which one of the first switching element Q11 or the second switching element Q12 is set to ON state and the other is set to OFF state and a duration in which both of the first switching element Q11 and the second switching element Q12 are set to OFF states are defined alternately with one another. Specifically, the control cycle Ts of the first switching element Q11 and the control cycle Ts of the second switching element Q12 are set the same with one another, and the control cycle Ts of the first switching element Q11 is shifted by a half control cycle Ts from the control cycle Ts of the second switching element Q12. Further, the duty ratio is set to lower than 50%. For example, the duty ratio may be set to 45%.

The ON state and OFF state of the first switching element Q11 and the second switching element Q12 are carried out as described above. Thus, as shown in FIG. 31, in the 1b mode control, the control A in which the first switching element Q11 is in ON state and the second switching element Q12 is in OFF state, the control B in which both of the first and second switching elements Q11 and Q12 are in OFF states, the control A in which the first switching element Q11 is in OFF state and the second switching element Q12 is in ON state, and the control B in which both of the first and second switching elements Q11 and Q12 are in OFF states are carried out in the described order, and are repeated in the described order. Further, the duration of the control A is shorter than the half of the one control cycle Ts.

Figure 32:
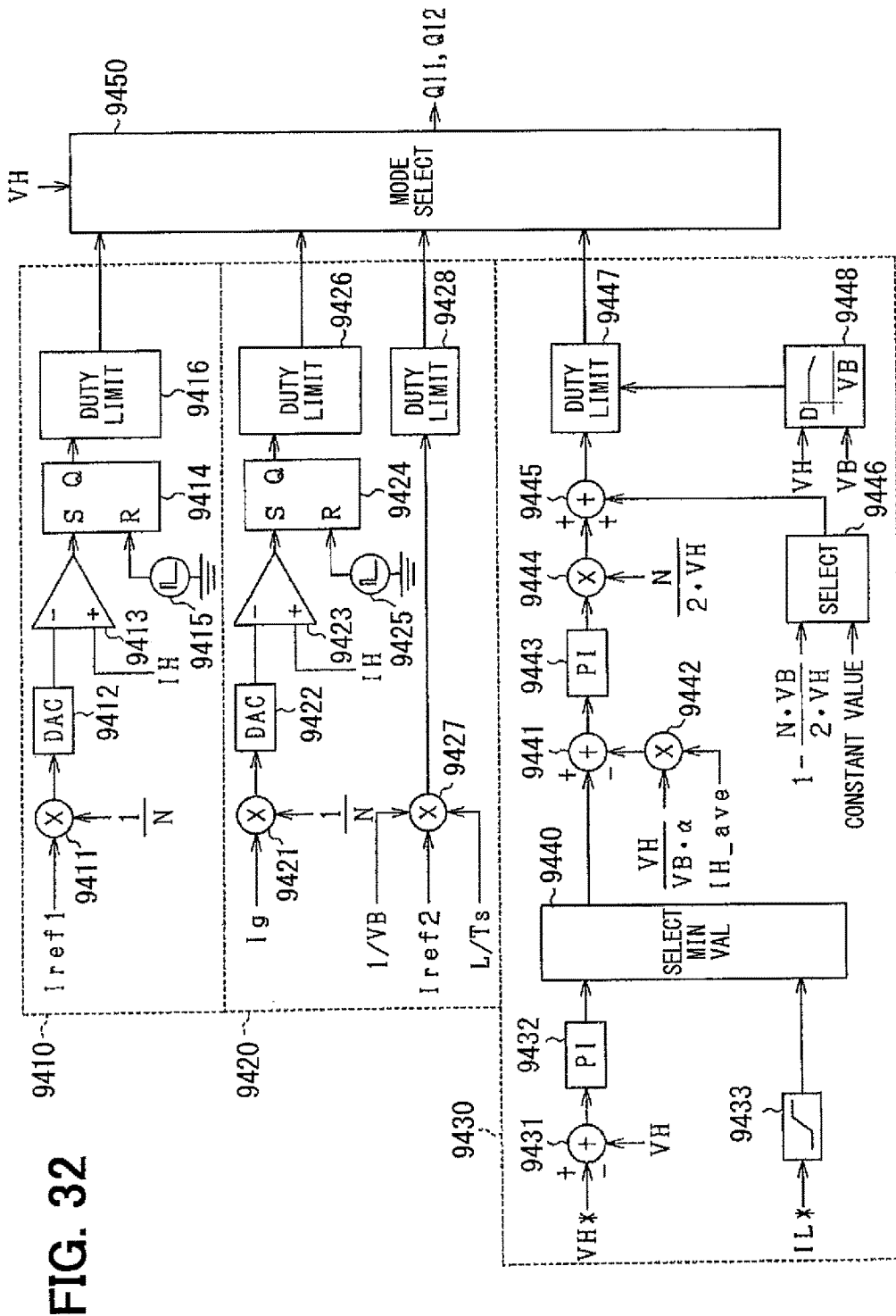
FIG. 32 is a block diagram showing a configuration of a controller to perform a control process according to the ninth embodiment.

The following will describe the process executed by the controller 9400 with reference to FIG. 32. In a first mode control setting portion 9410, a first command value Iref1, which is a command value of the reactor current IL, is inputted to a multiplier 9411, and a reciprocal of the turn ratio N is multiplied to the first command value Iref1. That is, the command value of the reactor current IL is converted to the command value of the output-side current IH. The value found by the multiplier 9411 is inputted to the minus terminal of the comparator 9413 through the digital to analog converter (DAC) 9412. The output-side current IH is inputted to the plus terminal of the comparator 9413.

The comparator 9413 compares the value inputted to the minus terminal with the value inputted to the plus terminal. That is, the comparator 9413 compares the command value of the output-side current IH converted from the first command value Iref1 with the output-side current IH. Then, within a duration while the plus terminal value is larger than the minus terminal value, the comparator 9413 outputs a low level signal to the S terminal of the RS flip-flop 9414. The clock signal from the clock 9415 is inputted to the R terminal of the RS flip-flop 9414.

In the first mode control, the low level of the inputted signal indicates that the output-side current IH exceeds the value found by dividing the first command value Iref1 by the turn ratio N. Thus, the RS flip-flop 9414 transmits a signal which sets both of the first switching element Q11 and the second switching element Q12 to OFF states. In this manner, the control A is switched to the control B. After the elapse of the one control cycle, the RS flip-flop 9414 transmits a signal which sets one of the first switching element Q11 and the second switching element Q12 to ON state and the other to OFF state. In this manner, the control B is switched to control A.

An output signal of the RS flip-flop 9414 is inputted into a duty limit portion (DUTY LIMIT) 9416. When the duty ratios of the first switching element Q11 and the second switching element Q12 are larger than an upper-limit value, the duty limit portion 9416 sets the duty ratios to be equal to the upper-limit value. The upper-limit value is set to a value less than 50%, for example, 45%. A control signal of the first switching element Q11 and the second switching element Q12 found in the manner as described above is inputted into a mode selection portion (MODE SELECT) 9450.

When the control signal of the first switching element Q11 and the second switching element Q12 is inputted to a mode selection portion (MODE SELECT) 9450, if the selected mode is the 1a mode control, a control signal which maintains the OFF state of the second switching element Q12 is outputted.

In the 1a mode control, the first mode setting portion 9410 performs various kinds of calculations to generate the control signal which controls only the first switching element Q11. In the 1b mode control, the first mode setting portion performs various kinds of calculations to generate the control signal which controls both of the first switching element Q11 and the second switching element Q12.

The following will describe the second mode setting portion 9420. The second mode setting portion 9420 performs separate calculations to specify the ON or OFF state of the first switching element Q11 and the ON or OFF state of the second switching element Q12.

In a control on the first switching element Q11, an upper-limit value Ig of an input-side current is inputted first into a multiplier 9421 and multiplied by a reciprocal of the turn ratio N. The upper-limit value Ig indicates an upper limit of a reactor current IL at an end of a control A in the second mode control. In short, the upper limit of the reactor current IL is converted to an upper limit of the output-side current IH. The value obtained in the multiplier 9421 is inputted into a minus terminal of a comparator 9423 via a digital to analog converter (DAC) 9422. Meanwhile, the output-side current IH is inputted into a plus terminal of the comparator 9423.

The comparator 9423 compares a value of the upper limit of the output-side current IH, which is converted from the upper-limit value Ig and inputted into the minus terminal, with the output-side current IH, which is inputted into the plus terminal. A low level signal is inputted into an S terminal of an RS flip-flop 9424 while an input value at the plus terminal is larger than an input value at the minus terminal. A clock signal is inputted into an R terminal of the RS flip-flop 9424 from a clock 9425.

When an input signal is a low level signal, it means that the output-side current IH exceeds a value found by dividing the upper-limit value Ig by the turn ratio N. Hence, the RS flip-flop 9424 outputs a signal to set the first switching element Q11 to OFF state. An output signal of the RS flip-flop 9424 is inputted into a duty limit portion (DUTY LIMIT) 9426. When a duty ratio of the first switching element Q11 is larger than an upper-limit value, the duty limit portion 9426 sets the duty ratio of the first switching element Q11 to be equal to the upper-limit value. The upper-limit value is set to, for example, 50%. A control signal of the first switching element Q11 set in the manner as described above is inputted into the mode selection portion 9450.

In a control on the second switching element Q12, a second command value Iref2 of the reactor current IL is inputted into a multiplier 9427. A reciprocal of a reactor voltage VL and a value found by dividing self-inductance L of a choke coil L13 by a length Ts of one control cycle are also inputted into the multiplier 9427. An output value of the multiplier 9427 is inputted into a duty limit portion (DUTY LIMIT) 9428. When the duty ratio of the second switching element Q12 is larger than an upper-limit value, the duty limit portion 9428 sets the duty ratio to be equal to an upper-limit value which is set to be less than 50%. The upper-limit value is set to, for example, 45%. A control signal of the second switching element Q12 set in the manner as described above is inputted into the mode selection portion 9450.

The following will describe a third mode setting portion 9430. In the third mode setting portion 9430, a command value of an average value of the reactor current IL is found first. More specifically, a command value to perform a constant voltage control and a command value to perform a constant current control are found, and a third mode control is performed using a minimum command value among the found command values.

In order to find a command value of the constant voltage control, a target value VH* of the output-side voltage VH and the detected output-side voltage VH are inputted into an adder 9431 and a difference of the two is inputted into a PI controller 9432. An output value of the PI controller 9432 is a command value of the reactor current IL when the constant voltage control is performed and is inputted into a minimum selection portion (SELECT MIN VAL) 9440.

The controller 9400 also acquires a command value IL* of the reactor current IL from a higher stage ECU via CAN communications or the like. The command value IL* is inputted into a gradual changing portion 9433. The gradual changing portion 9433 outputs a gradually increasing value based on the inputted command value IL*. The output value of the gradual changing portion 9433 is inputted into the minimum selection portion 9440.

When the respective command values are inputted into the minimum selection portion 9440 in the manner as described above, the minimum selection portion 9440 outputs a minimum value among the respective input command values as a command value. The command value outputted from the minimum selection portion 9440 is inputted into an adder 9441. A value of the reactor current IL converted from an average value IH_ave of the output-side current IH, is also inputted into the adder 9441. More specifically, an average value IH_ave of the output-side current IH and a value found by dividing the output-side voltage VH by the input-side voltage VB are inputted into a multiplier 9442. In order to perform a multiplication in the multiplier 9442, a conversion efficiency α of a power conversion circuit 10 may be taken into consideration. An output value of the multiplier 9442 is inputted into the adder 9441. In the adder 9441, a difference between the two input values is found and the difference is inputted into a PI controller 9443.

An output value of the PI controller 9443 is inputted into a multiplier 9444 and multiplied by a value found by dividing the turn ratio N by a value two times larger than a value of the output-side voltage VH. An output value of the multiplier 9444 is inputted into an adder 9445. One of a feed-forward control duty ratio and a constant value, which is selected in a selection portion (SELECT) 9446, is inputted into the adder 9445. Herein, the selection portion 9446 selects the feed-forward control duty ratio until a completion of the charging in the capacitor 201 in the third mode control and selects the constant value after the charging to the capacitor 201 is completed.

An output value of the adder 9445 is inputted into a duty limit portion (DUTY LIMIT) 9447. An upper-limit value of the duty ratio found in an upper-limit setting portion 9448 is also inputted into the duty limit portion 9447. The upper-limit value of the duty ratio is determined by the input-side voltage VB and the output-side voltage VH. When the calculated duty ratio is larger than the upper-limit value, the duty limit portion 9447 outputs the upper-limit value. An output value of the duty limit portion 9447 is inputted into the mode selection portion 9450.

The output-side voltage VH is also inputted into the mode selection portion 9450 and one control mode selected among the first through third mode controls is performed, and the first switching element Q11 and the second switching element Q12 are controlled corresponding to the selected mode control.

Figure 33:
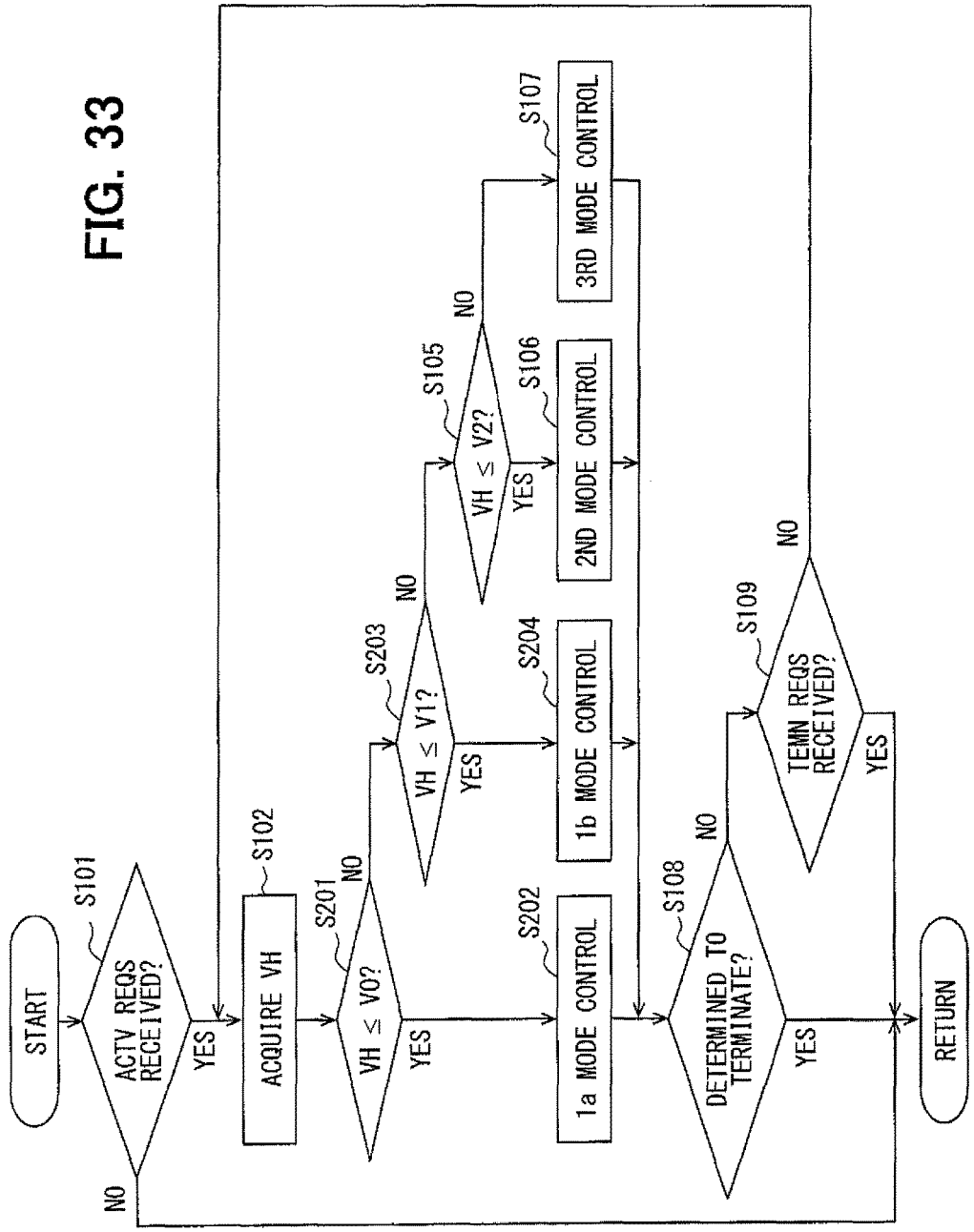
FIG. 33 is a flowchart showing a process executed by the controller according to the ninth embodiment.

The following will describe a process executed by the controller 9400 with reference to a flowchart of FIG. 33. The process shown in FIG. 33 is periodically carried out at a predetermined control cycle. In FIG. 33, the process similar to the process shown in FIG. 9 is indicted by the same reference symbol.

In the process, when determining an activation request is received (S101:YES), the controller 9400 acquires an output-side voltage VH (S102). At S201, the controller determines whether the output-side voltage VH is equal to or lower than a predetermined value V0. When the output-side voltage VH is equal to or lower than the predetermined value V0 (S201:YES), the controller 9400 performs 1a mode control at S202. When the output-side voltage VH is higher than the predetermined value V0 (S201:NO), the controller 9400 further determines whether the output-side voltage VH is equal to or lower than a first predetermined value V1 at S203. When the output-side voltage VH is equal to or lower than the first predetermined value V1 (S203:YES), the controller 9400 performs a 1b mode control at S204. When the output-side voltage VH is higher than the first predetermined value V1 (S203:NO), the controller 9400 process to S105. The process carried out after S105 are similar to the first embodiment, and the detailed description will be omitted.

After one of the 1a mode control, 1b mode control, second mode control, or third mode control is carried out for a predetermined time period, the controller 9400 determines whether to terminate the control at S108. When the controller 9400 determines to terminate the control (S108: YES), the process returns to S101 and a stand-by state is continued until a next activation request is received. When the controller 9400 determines not to terminate the control (S108: NO), the controller 9400 further determines whether a termination request (TEMN REQS) is received in S109. A command signal of the termination request may be sent from a higher stage control device, such as an ECU. When the termination request is received (S109: YES), the controller 300 terminates the process and returns to S101, and a stand-by state is continued until a next activation request is received. When the termination request is not received (S109: NO), the controller 300 returns to S102 and repeatedly execute subsequent steps as described above.

Figure 34A:
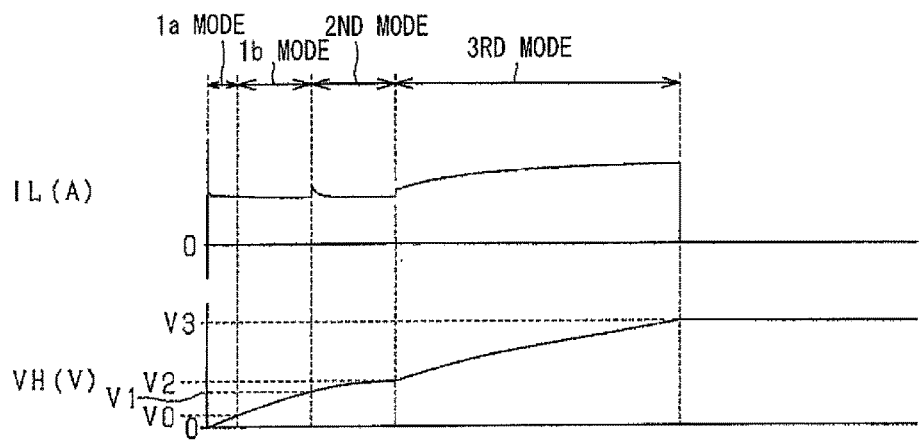
FIG. 34A to FIG. 34C are diagrams showing effects of the process executed in the ninth embodiment.
Figure 34B:
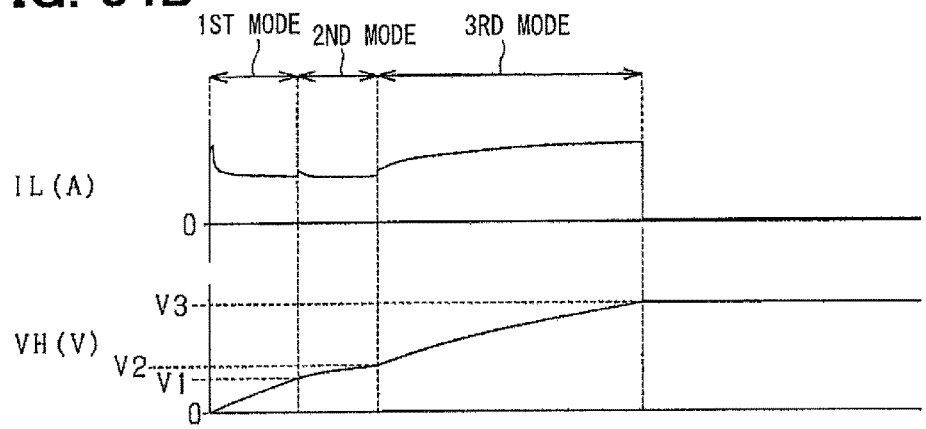
Figure 34C:
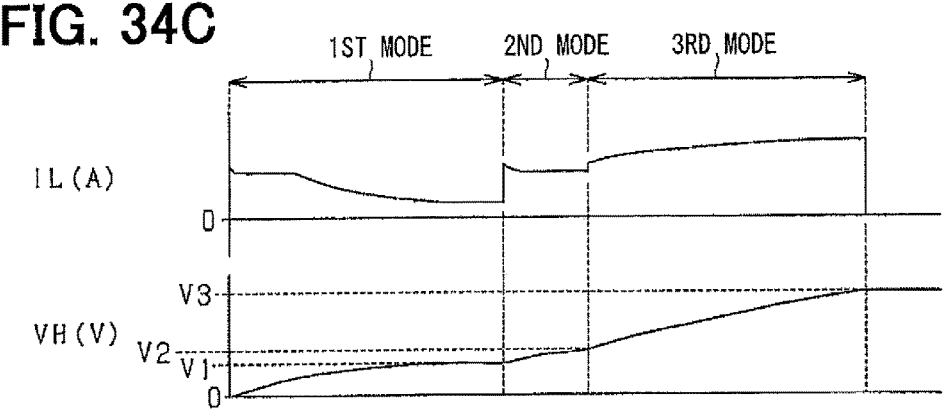

The following will describe advantages provided by the power conversion apparatus according to the present embodiment with reference to FIG. 34A to FIG. 34C. FIG. 34A shows the reactor current IL and the output-side voltage VH when both of the 1a mode control and 1b mode control are carried out in addition to the second mode control and the third mode control. FIG. 34B shows the reactor current IL and the output-side voltage VH when only the 1b mode control is carried out in addition to the second mode control and the third mode control. FIG. 34C shows the reactor current IL and the output-side voltage VH when only the 1a mode control is carried out in addition to the second mode control and the third mode control. In FIG. 34A to FIG. 34C, a termination condition of the third mode control is set as the output-side voltage VH exceeds a predetermined third value V3.

For example, immediately after the start of the charging to the capacitor 201, the output-side voltage VH is lower than the predetermined value V0. When the output-side voltage VH is lower than the predetermined value V0, as shown in FIG. 4A of the first embodiment, the reactor current IL fails to sufficiently decrease to a predetermined low level during the control B. That is, the reactor current IL becomes a current continuous mode in which the current continuously flows. In this current continuous mode, the frequency component of the current increases, and an output from the current detection portion 203 may be delayed. In this case, with a decrease of the execution duration of the control B, an overshoot of the output-side current IH which exceeds the command value is increased. That is, when 1a mode control is not carried out and only 1b mode control is carried out, as shown in FIG. 34B, with an overshoot of the output-side current IH, an overshoot of the reactor current IL may occur for a period of time.

When 1b mode control is not carried out and only 1a mode control is carried out, the execution duration of control A is shortened. Thus, with a proceeding of the charging operation to the capacitor 201, a charging amount per unit time may decrease. Thus, as shown in FIG. 34C, the complete charging of the capacitor 201 requires a longer time although the overshoot of the reactor current IL is restricted.

In the present embodiment, as shown in FIG. 34A, when the output-side voltage VH is equal to or lower than a predetermined value V0, the controller 9400 performs 1a mode control. Thus, a sufficient execution duration of the control B can be secured. Thus, overshoots of the reactor current IL and the output-side current IH can be restricted. When the output-side voltage VH increases to a value higher than the predetermined value V0, the controller 9400 performs 1b mode control. Thus, the execution duration of the control A can be increased. With this configuration, the charging duration of the capacitor 201 can be shortened.

Tenth Embodiment

Figure 35:
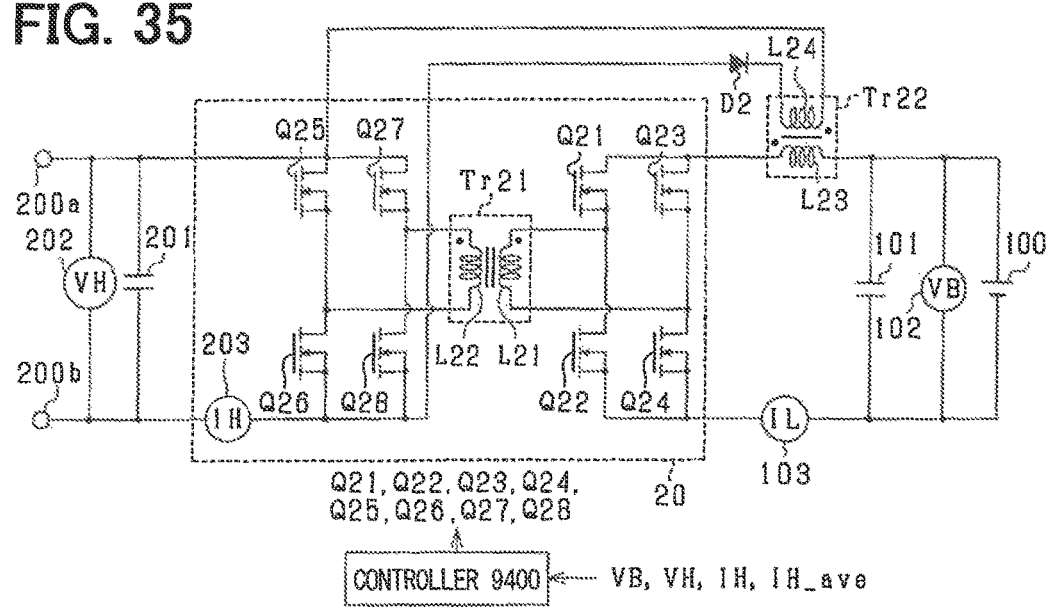
FIG. 35 is a circuit diagram showing a configuration of a power conversion apparatus according to a tenth embodiment of the present disclosure.
Figure 36:
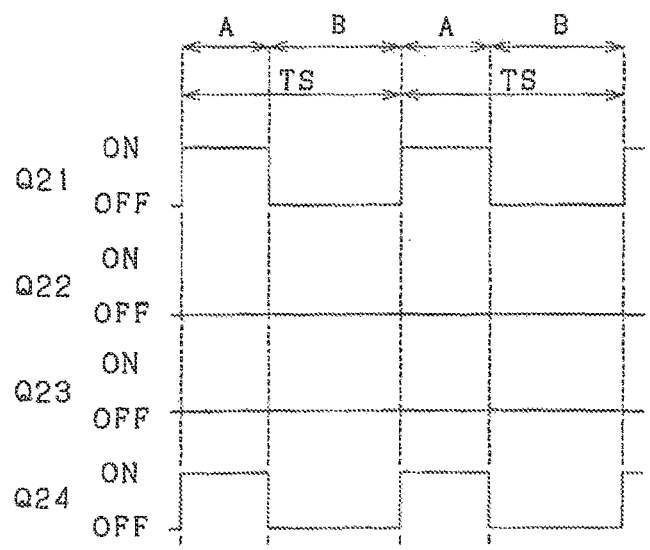
FIG. 36 is a time chart showing 1a mode control according to the tenth embodiment.
Figure 37:
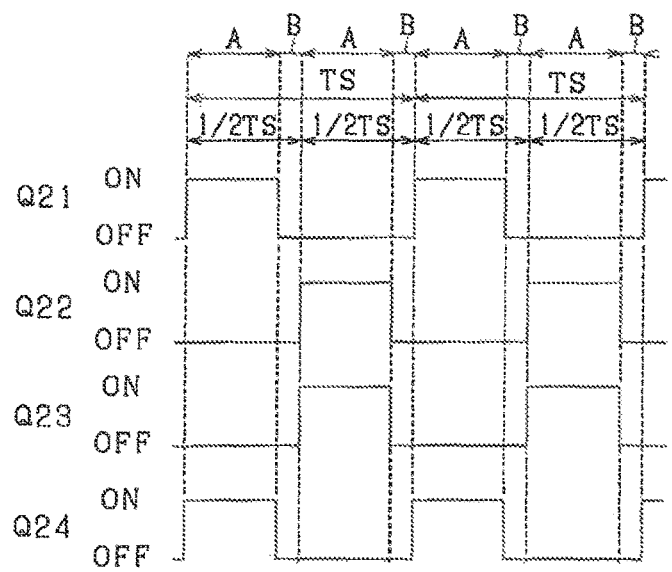
FIG. 37 is a time chart showing 1b mode control according to the tenth embodiment.

The following will describe a power conversion apparatus according to a tenth embodiment with reference to FIG. 35 to FIG. 37. As shown in FIG. 35, the circuit configuration of the present embodiment is similar to the third embodiment. Further, similar to the ninth embodiment, the power conversion apparatus includes the current detection portion 203. The current detection portion 203 detects an output-side current flowing through the output-side circuit and an average value IH_ave of the output-side current at the beginning stage (pre-charge) of the charging operation.

The following will describe the first mode control according to the present embodiment with reference to FIG. 36 and FIG. 37. Further, in the second mode control and third mode control, the switching times of the first to fourth switching elements Q21 to Q24 to ON or OFF states are similar to the first embodiment, and detailed description and drawings will be omitted.

In 1a mode control, the first switching element Q21 and the fourth switching element Q24 are synchronized with one another, and ON state and OFF state is alternately set to each of the first switching element Q21 and the fourth switching element Q24. In 1a mode control, both of the second switching element Q22 and the third switching element Q23 are maintained in OFF states. At this time, an upper limit of the duty ratio of each of the first switching element Q21 and the fourth switching element Q24 is set less than 50%. For example, the upper limit of the duty ratio may be set to 45%.

The ON and OFF controls to the first to fourth switching elements Q21 to Q24 are carried out as described above. As shown in FIG. 36, in 1a mode control, the control A and the control B are alternately carried out. In the control A, the first switching element Q21 and the fourth switching element Q24 are set to ON states and both of the second switching element Q22 and the third switching element Q23 are set to OFF states A. In the control B, all of the first to fourth switching elements Q21 to Q24 are set to OFF states. An execution duration of the control A is less than half of one control cycle Ts.

As another example, in 1a mode control, the first switching element Q21 and the fourth switching element Q24 may be normally maintained in OFF states and each of the second switching element Q22 and the third switching element Q23 may be alternately set to ON state and OFF state. As another example, the switching elements which are normally set to OFF states and the switching elements which are alternately set to ON states and OFF states may be switched at each predetermined number of control cycles.

In 1b mode control, the first switching element Q21 and the fourth switching element Q24 are synchronized with one another, and the second switching element Q22 and third switching element Q23 are synchronized with one another. The control cycle of each of the first to fourth switching elements Q21 to Q24 is set equal to one another. The control cycles of the first switching element Q21 and the fourth switching element Q24 are shifted by half of the control cycle from the control cycles of the second switching element Q22 and the third switching element Q23. For each of the first to fourth switching elements Q21 to Q24, the duty ratio is set to a value less than 50%, and ON state and OFF state are alternately set according to the duty ratio.

In the present embodiment, ON states and OFF states of the first to fourth switching elements Q21 to Q24 are carried out as described above. FIG. 37 shows the specific example of the ON or OFF states of the switching elements in 1b mode control. As shown in FIG. 37, in each control cycle of 1b mode control, control A in which the first switching element Q21 and the fourth switching element Q24 are set to ON states and the second switching element Q22 and the third switching element Q23 are set to OFF states, control B in which all of the first to fourth switching elements Q21 to Q24 are set to OFF states, control A in which the first switching element Q21 and the fourth switching element Q24 are set to OFF states and the second switching element Q22 and the third switching element Q23 are set to ON states, and control B in which all of the first to fourth switching elements Q21 to Q24 are set to OFF states, are carried out in sequence. In 1b mode control, the execution duration of the control A is less than half of one control cycle Ts.

With above-described configuration, the power conversion apparatus according to the present embodiment provides advantages similar to the advantages provided by the power conversion apparatus according to the ninth embodiment.

(Modifications)

Figure 38:
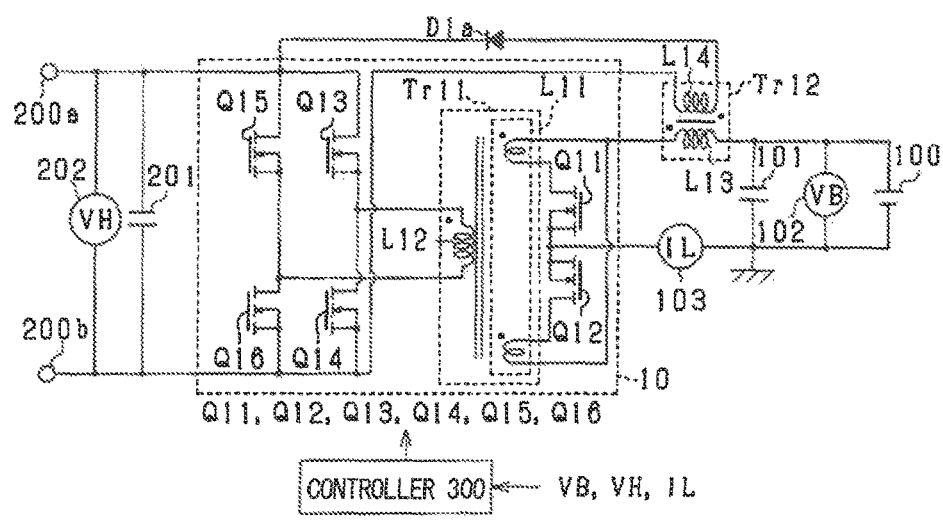
FIG. 38 is a circuit diagram showing an exemplary configuration of the power conversion apparatus of the present disclosure.

In the first embodiment, the diode D1 is provided on the side of the negative-electrode output terminal 200b of the auxiliary coil L14. Alternatively, as is shown in FIG. 38, a diode D1a may be provided on a side of the positive-electrode output terminal 200a of the auxiliary coil L14 instead of the diode D1. With this configuration, effects similar to the effects of the first embodiment can be achieved.

Figure 39A:
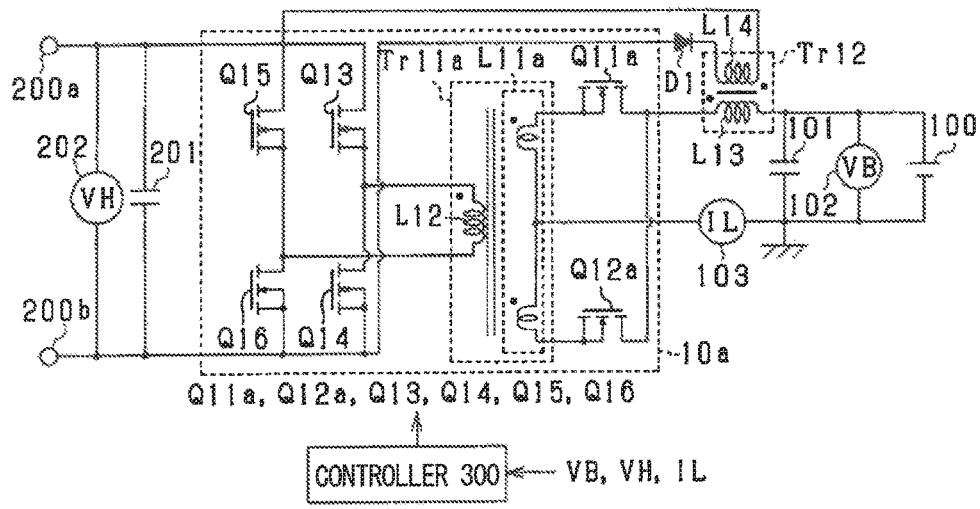
FIG. 39A and FIG. 39B are circuit diagrams showing exemplary configurations of the power conversion apparatus of the present disclosure.

The power conversion circuit 10 of the first embodiment may be configured as shown in FIG. 39A. Specifically, in a power conversion circuit 10a shown in FIG. 39A, a source of a first switching element Q11a and a source of a second switching element Q12a are, respectively, connected to both ends of a first coil Li1a included in a transformer Tr11a. Further, a drain of the first switching element Q11a and a drain of the second switching element Q12a are connected to each other and a connection point of the two is connected to one end of a choke coil L13. In addition, a center tap of the first coil L11a is connected to a negative electrode of a secondary cell 100. A configuration on a side of a second coil L12 is same as the configuration of the first embodiment and a description is omitted herein. Process performed by the controller 300 is same as the process in the first embodiment. In the configuration shown in FIG. 39A, instead of the diode D1, a diode D1a may be provided on the side of the positive-electrode output terminal 200a of the auxiliary coil L14 as shown in FIG. 39B.

Figure 39B:
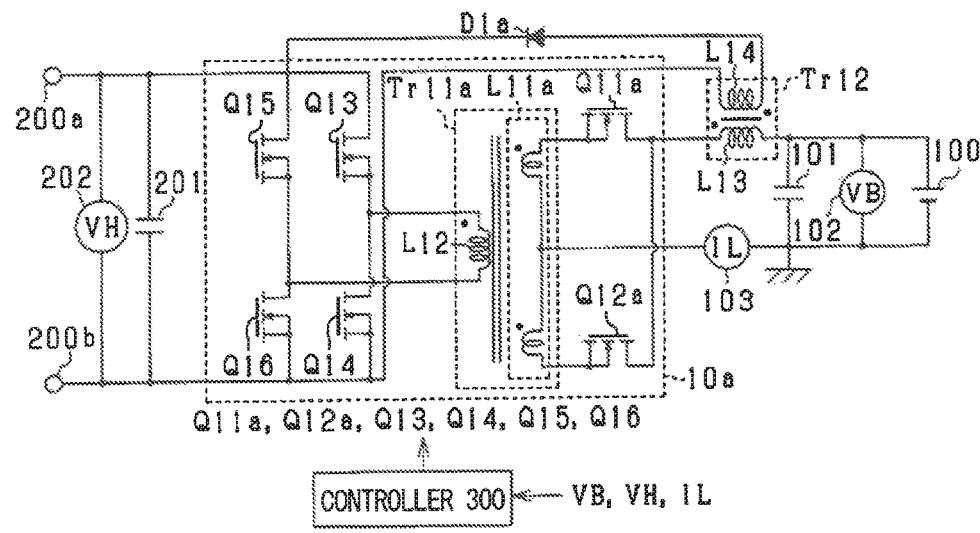
Figure 44A:
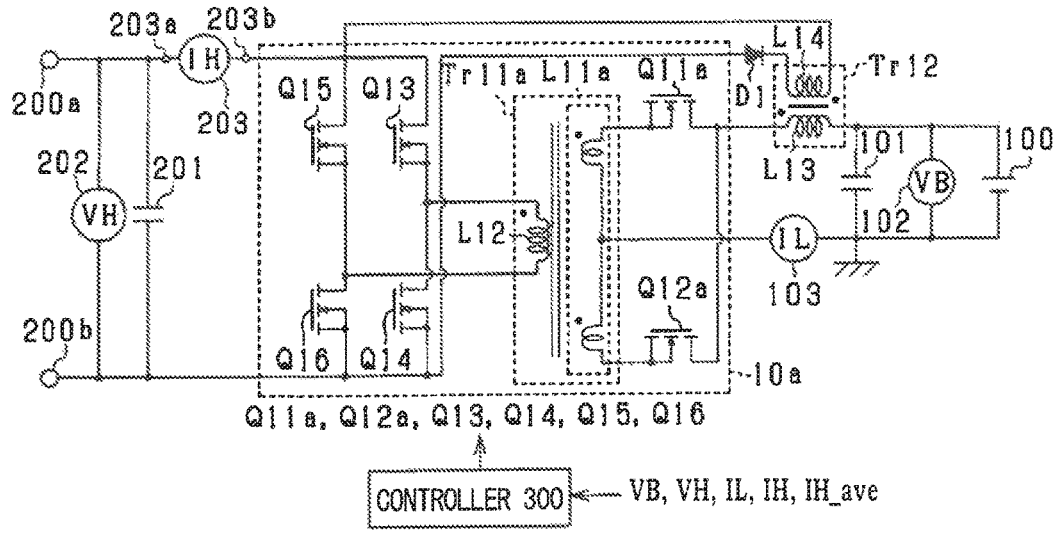
FIG. 44A and FIG. 44B are circuit diagrams showing exemplary configurations of the power conversion apparatus of the present disclosure.
Figure 44B:
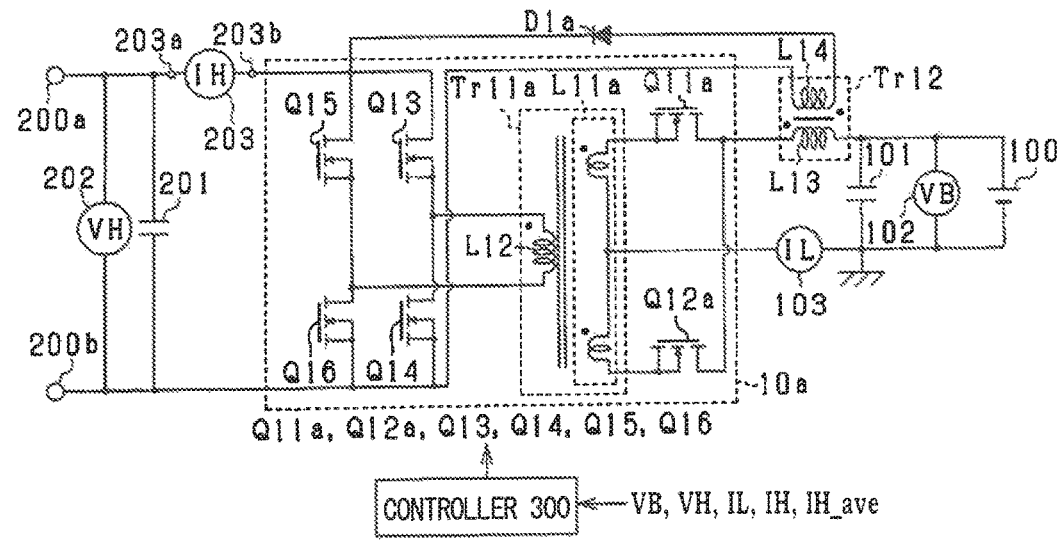

FIG. 44A and FIG. 44B show power conversion circuits 10 similar to those in FIG. 39A and FIG. 39B, respectively, with current detection portion 203 provided therein.

Figure 40:
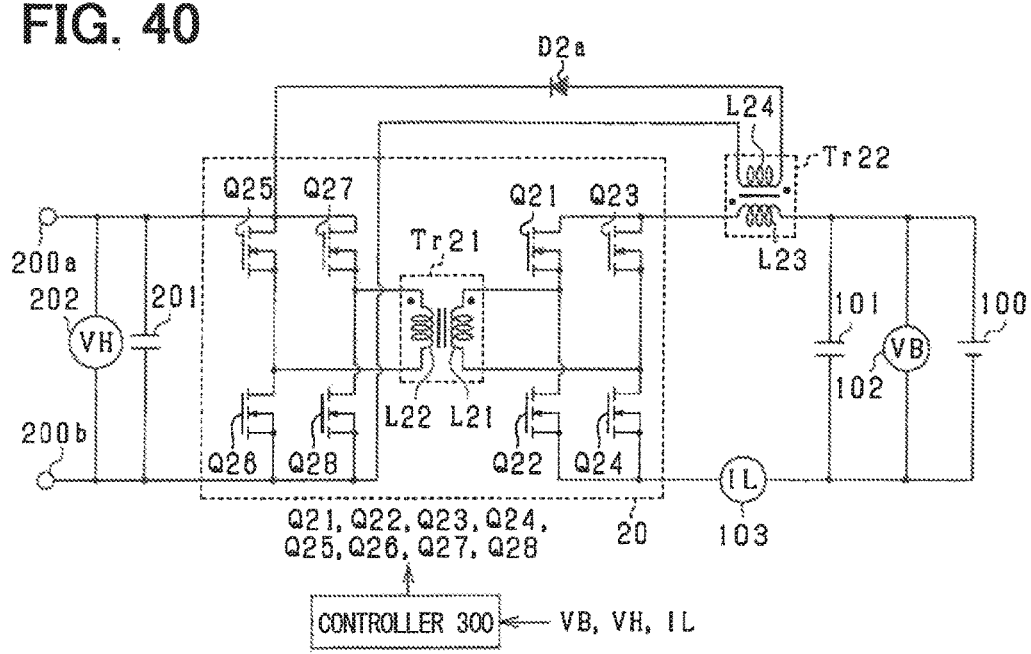
FIG. 40 is a circuit diagram showing an exemplary configuration of the power conversion apparatus of the present disclosure.

As is shown in FIG. 40, in the full-bridge circuit of the third embodiment, instead of the diode D2, a diode D2a may be provided on the side of the positive-electrode output terminal 200a of the auxiliary coil L24. Although it is not shown in the drawing, in the forward active clamp circuit of the fourth embodiment, a diode may be provided on the side of the positive-electrode output terminal 200a of the auxiliary coil L34.

Figure 41:
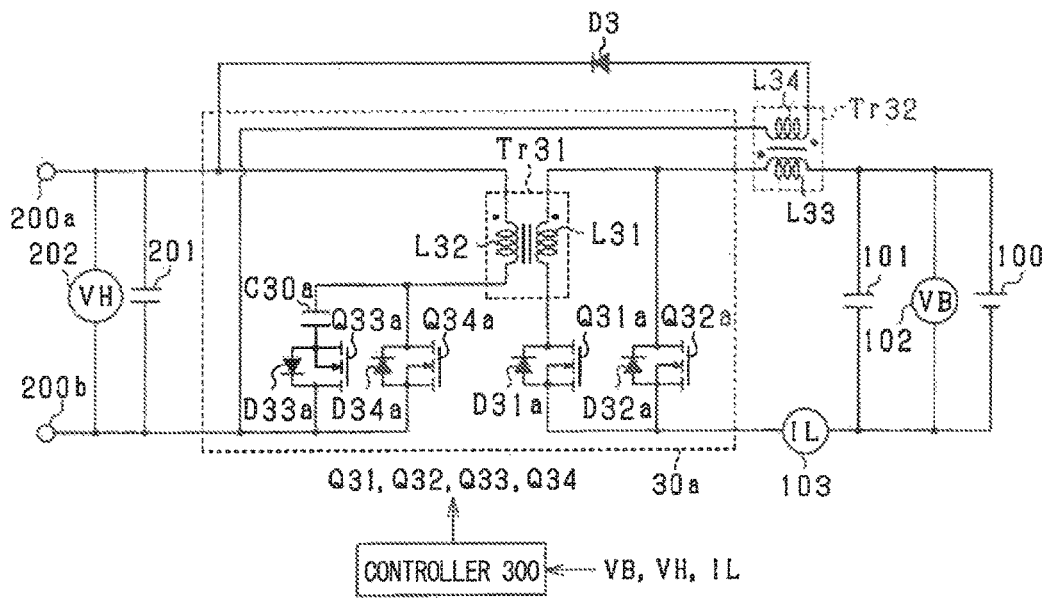
FIG. 41 is a circuit diagram showing an exemplary configuration of the power conversion apparatus of the present disclosure.

In the power conversion circuit 30 (forward active clamp circuit) of the fourth embodiment, the side of the second coil L32 may be configured as shown in FIG. 41. Specifically, one end of a second coil L32 forming an output side of a transformer Tr31 is connected to a positive-electrode output terminal 200a and the other end is connected to a drain of a fourth switching element Q34a. A connection point where the second coil L32 is connected with the drain of the fourth switching element Q34a is connected to a source of a third switching element Q33a via a capacitor C30a, and a source of the fourth switching element Q34a is connected to a drain of the third switching element Q33a. A connection point where the fourth switching element Q34a is connected with the third switching element Q33a is connected to a negative-electrode output terminal 200b. A third diode D33a is connected to the third switching element Q33a in a back-to-back connection and a fourth diode D34a is connected to the fourth switching element Q34a in a back-to-back connection. Specific process performed by the controller 300 is same as the process in the fourth embodiment and a description is omitted herein.

In the foregoing embodiments, all of the first through third mode controls are perfumed. Alternatively, at least two mode controls among the three mode controls may be performed. For example, the first mode control may be performed when the charging operation starts, and the third mode control may be performed by skipping the second mode control when and after the output-side voltage VH exceeds a predetermined value. Alternatively, the second mode control may be performed when the charging operation starts, and the third mode control may be performed when and after the output-side voltage VH exceeds a predetermined value.

In the foregoing embodiments, the diodes D1 or D1a, D2 or D2a, and D3 are used as rectifier elements connected to the auxiliary coils L14, L24, and L34. Alternatively, switching elements may be used instead of the diodes D1, D1a, D2, D2a, and D3. In such a case, when supplying power from the input side to the output side via the auxiliary coil L14, L24, or L34, a current flow is generated by setting the corresponding switching elements to ON states.

Figure 42A:
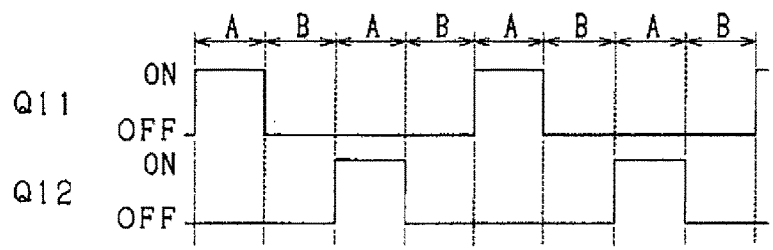
FIG. 42A and FIG. 42B are diagrams showing other examples of the first mode control.
Figure 42B:
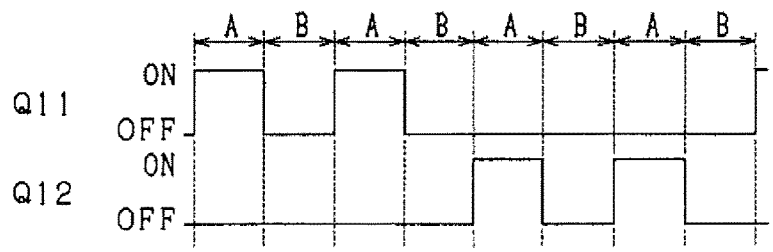

In the first mode control of the first embodiment, a case where the second switching element Q12 is normally set in OFF state has been described. Alternatively, as is shown in FIG. 42A, a pattern in which the first switching element Q11 is set to ON state and another pattern in which the second switching element Q12 is set to ON state may be performed alternately in the control A. Alternatively, as is shown in FIG. 42B, it may be configured in such a manner that the control A in the pattern the first switching element Q11 is set to ON state is performed more than once and subsequently the control A in another pattern the second switching element Q12 is set to ON state is performed more than once.

Figure 43A:
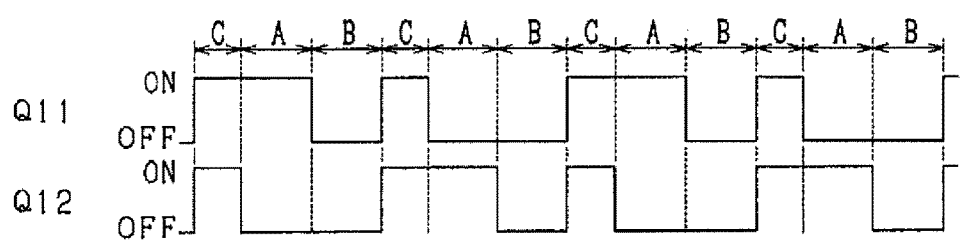
FIG. 43A and FIG. 43B are diagrams showing other examples of the second mode control.
Figure 43B:
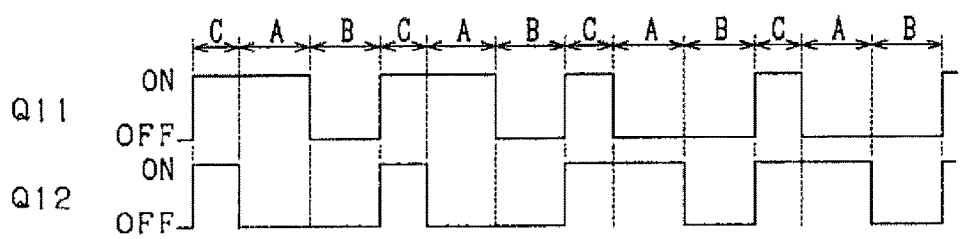

In the second mode control of the first embodiment, the control C is switched to the control A by switching the second switching element Q12 OFF. Alternatively, as is shown in FIG. 43A, a control by which to switch the control C to the control A by switching the second switching element Q12 OFF and a control by which to switch the control C to the control A by switching the first switching element Q11 OFF may be performed alternately. Alternatively, as is shown in FIG. 43B, it may be configured in such a manner that the control by which to switch the control C to the control A by switching the second switching element Q12 OFF is performed more than once and subsequently the control by which to switch the control C to the control A by switching the first switching element Q11 OFF is performed more than once.

The first through third mode controls are performed with reference to the first through third command values Iref1 through Iref3, respectively. Alternatively, by preliminarily determining a length of a period during which each of the control A through the control C is performed in each mode control, the controls A through C may be performed for the preliminarily determined periods.

In the foregoing embodiments, the choke coils L13, L23, and L33 are provided on the positive electrode side of the secondary cell 100. Alternatively, the choke coils L13, L23, and L33 may be provided on the negative electrode side instead. Alternatively, the choke coils L13, L23, and L33 may be provided on the positive electrode side and on the negative electrode side, and auxiliary coils L14, L24, and L34 may be provided to magnetically couple to the corresponding choke coils.

A turn ratio of the auxiliary coil to the choke coil may be set greater than N:1.

The foregoing embodiments have described a case where the power conversion apparatus is installed to a hybrid car. However, a subject to which the power conversion apparatus is installed is not limited to a hybrid car.

In the fifth through seventh embodiments, the control in the power conversion apparatus is changed. Similarly, in the third and fourth embodiments, the control in the power conversion apparatus may be changed That is to say, in the third and fourth embodiments, the respective switching elements may be controlled using the methods of setting the lengths of the control A and the control B described in the fifth through seventh embodiments.

In the fifth embodiment, a length T of the break period Tb is an integral multiple of a length Ts of one control cycle and the control A is started after an elapse of a period as long as the integral multiple times the length Ts of one control cycle. Alternatively, the control A may be started after an elapse of the break period Tb calculated by Formula (3) described above.

In the fifth embodiment, a period during which the control A and the control B are performed alternately is set to the fixed cycle Tf (four control cycles). Alternatively, the control cycle may be varied. That is to say, the control may be performed in such a manner that a value found by multiplying the flyback current ID by the turn ratio N becomes equal to the first command value Iref1 at the end of multiple control cycles and the flyback current ID decreases to 0 within the subsequent break period Tb.

In the eighth embodiment, the output-side current IH is detected by the current detection portion 203 provided to the circuit on the output side and the detected output-side current IH is used for the controls. The configuration and the control of the eighth embodiment may be applied to the third and fourth embodiments above. Also, the current detection portion 203 of the eighth embodiment may be applied to the circuit shown in FIG. 26. In such cases, the current detection portion 203 may be provided to the positive-electrode wire as is shown in FIG. 24 or the current detection portion 203 may be provided to the negative-electrode wire as is shown in FIG. 27. Also, a specific circuit configuration of the current detection portion 203 may be the circuit configuration shown in FIG. 25 or the circuit configuration shown in FIG. 28. A control equivalent to the control shown in FIG. 26 of the eighth embodiment may be performed for the control using the detected output-side current IH and the average value IH_ave of the output-side current IH.

In the 1a mode control of the ninth embodiment, the first switching element Q11 or the second mode control is normally maintained in OFF state. Thus, even though the upper limit of the duty ratio is set to be higher than 50%, control A and control B are alternately carried out. Thus, the upper limit of the duty ratio needs not be set to a predetermined value. Similarly, the upper limit of the duty ratio needs not be set in 1a mode control in the tenth embodiment.

In 1b mode control of the ninth embodiment, the control cycle of the first switching element Q11 is shifted from the control cycle of the second switching element Q12 by half of the control cycle. As a modification, the shift period of the two control cycles may be set to a value other than half of the control cycle. That is, On state duration of the first switching element Q11 and On state duration of the second switching element Q12 are set so that the two ON state durations are not completely overlapped with one another. The shift amount of the two control cycles and the upper limit of the duty ratios may be properly set under above-described condition. This modification is also applied to the tenth embodiment.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A power conversion apparatus supplying power from an input side, which is connected to a direct current power source, to an output side, the power conversion apparatus comprising:
a power conversion circuit including:
a transformer including:
a first coil; and
a second coil that is magnetically coupled to the first coil; and
an active clamp circuit including:
a second switching element connected in series with the first coil;
a first switching element connected in parallel with the series-connected first coil and the second switching element; and
a series-connected body including a third switching element and a capacitor connected in series, the series-connected body being connected with the second coil in parallel connection or in series connection;
a choke coil disposed between the power conversion circuit and the direct current power source;
an auxiliary coil magnetically coupled to the choke coil and connected in parallel with an output side circuit disposed on the output side, the auxiliary coil being wound in a direction so that an excitation current in the output side circuit flows from a negative electrode of the output side circuit to a positive electrode of the output side circuit when an excitation current of the direct current power source flows from a positive electrode of the direct current power source to a negative electrode of the direct current power source through the choke coil, and the auxiliary coil functioning as a flyback transformer;
a rectifier element connected to the auxiliary coil in series and cutting off a power supply from the direct current power source to the output side circuit through the auxiliary coil and a power supply from the output side circuit to the input side; and
a controller, controlling the first switching element through the third switching element, that:
performs, to the first switching element through the third switching element, at least two mode controls among three mode controls which include a first mode control, a second mode control, and a third mode control;
sequentially performs a first control and a second control for a time period in the first mode control, sets the first switching element and the third switching element to off state and sets the second switching element to on state in the first control, and sets the first switching element and the second switching element to off state and sets the third switching element to on state in the second control;
sequentially performs a third control, the first control, and the second control for a time period in the second mode control, sets the first switching element and the third switching element to on states and sets the second switching element to off state in the third control, sets the first switching element and the third switching element to off state and sets the second switching element to on state in the first control, and sets the first switching element and the second switching element to off state and sets the third switching element to on state in the second control; and
sequentially performs the third control and the first control for a time period in the third mode control, sets the first switching element and the third switching element to on states and sets the second switching element to off state in the third control, and sets the first switching element and the third switching element to off states and sets the second switching element to on state in the first control.

2. A power conversion apparatus supplying power from an input side, which is connected to a direct current power source, to an output side, the power conversion apparatus comprising:
a power conversion circuit including:
a transformer including:
a first coil; and
a second coil that is magnetically coupled to the first coil;
a full-bridge circuit including:
a first switching element connected to a positive electrode of the direct current power source;
a second switching element connected in series with the first switching element, one end the first coil being connected to a connection point at which the first switching element is connected with the second switching element, the second switching element being connected to a negative electrode of the direct current power source;
a third switching element connected to the positive electrode of the direct current power source; and
a fourth switching element connected in series with the third switching element, a remaining one end of the first coil being connected to a connection point at which the third switching element is connected with the fourth switching element, the fourth switching element being connected to the negative electrode of the direct current power source;
a choke coil disposed between the power conversion circuit and the direct current power source;
an auxiliary coil magnetically coupled to the choke coil and connected in parallel with an output side circuit disposed on the output side, the auxiliary coil being wound in a direction so that an excitation current in the output side circuit flows from a negative electrode of the output side circuit to a positive electrode of the output side circuit when an excitation current of the direct current power source flows from a positive electrode of the direct current power source to a negative electrode of the direct current power source through the choke coil, and the auxiliary coil functioning as a flyback transformer;
a rectifier element connected to the auxiliary coil in series and cutting off a power supply from the direct current power source to the output side circuit through the auxiliary coil and a power supply from the output side circuit to the input side; and
a controller, controlling the first switching element through the fourth switching element, that:
performs, to the first switching element through the fourth switching element, at least two mode controls among three mode controls which include a first mode control, a second mode control, and a third mode control;

sequentially performs a first control and a second control for a time period in the first mode control, sets the first switching element through the fourth switching element in a first pattern or a second pattern in the first control, sets the first switching element and the fourth switching element to on states and sets the second switching element and the third switching element to off states in the first pattern of the first control, sets the second switching element and the third switching element to on states and sets the first switching element and the fourth switching element to off states in the second pattern of the first control, and sets all of the first switching element through the fourth switching element to off states in the second control;

sequentially performs a third control, a first control, and a second control for a time period in the second mode control, sets all of the first switching element through the fourth switching element to on states in the third control, sets the first switching element through the fourth switching element in the first pattern or the second pattern in the first control, sets the first switching element and the fourth switching element to on states and sets the second switching element and the third switching element to off states in the first pattern of the first control, sets the second switching element and the third switching element to on states and sets the first switching element and the fourth switching element to off states in the second pattern of the first control, and sets all of the first switching element through the fourth switching element to off states in the second control; and sequentially performs the third control and the first control for a time period in the third mode control, sets all of the first switching element through the fourth switching element to on states in the third control, sets the first switching element through the fourth switching element in the first pattern or the second pattern in the first control, sets the first switching element and the fourth switching element to on states and sets the second switching element and the third switching element to off states in the first pattern of the first control, and sets the second switching element and the third switching element to on states and sets the first switching element and the fourth switching element to off states in the second pattern of the first control.

3. The power conversion apparatus according to claim 2, further comprising a voltage detection portion detecting a voltage on the output side as an output voltage, wherein, when the output voltage is lower than a reference value in the first mode control, the controller sets (i) the first switching element and the fourth switching element to on states or off states alternately and maintains the second switching element and the third switching element in off states, or sets (ii) the second switching element and the third switching element to on states or off states alternately and maintains the first switching element and the fourth switching element in off states, when the output voltage is higher than the reference value in the first mode control, the controller sets each of the first switching element to the fourth switching element to on state or off state alternately under conditions that (i) on state durations of the first switching element and the fourth switching element are not overlapped with on state durations of the second switching element and the third switching element and (ii) a duty ratio of each of the first switching element to the fourth switching element is set to be less than 50%, and the duty ratio is a ratio of the on state duration to one control cycle.

4. A power conversion apparatus supplying power from an input side, which is connected to a direct current power source, to an output side, the power conversion apparatus comprising:

a power conversion circuit including:
  a transformer including:
    a first coil having a center tap connected to one of a positive electrode and a negative electrode of the direct current power source; and
    a second coil that is magnetically coupled to the first coil; and
  switching elements connected to a remaining one of the positive electrode and the negative electrode of the direct current power source, the switching elements including:
    a first switching element connected to one end of the first coil; and
    a second switching element connected to a remaining end of the first coil;

a choke coil disposed between the power conversion circuit and the direct current power source;

an auxiliary coil magnetically coupled to the choke coil and connected in parallel with an output side circuit disposed on the output side, the auxiliary coil being wound in a direction so that an excitation current in the output side circuit flows from a negative electrode of the output side circuit to a positive electrode of the output side circuit when an excitation current of the direct current power source flows from a positive electrode of the direct current power source to a negative electrode of the direct current power source through the choke coil, and the auxiliary coil functioning as a flyback transformer;

a rectifier element connected to the auxiliary coil in series and cutting off a power supply from the direct current power source to the output side circuit through the auxiliary coil and a power supply from the output side circuit to the input side; and a controller, controlling the first switching element and the second switching element, that:

performs, to the first switching element and the second switching element, at least two mode controls among three mode controls which include a first mode control, a second mode control, and a third mode control;

sequentially performs a first control and a second control for a time period in the first mode control, and sets one of the first switching element and the second switching element to on state and sets a remaining one of the first switching element and the second switching element to off state in the first control, and sets both of the first switching element and the second switching element to off states in the second control;

sequentially performs a third control, the first control, and the second control for a time period in the second mode control, sets both of the first switching element and the second switching element to on states in the third control, sets the one of the first switching element and the second switching element to on state and sets the remaining one of the first switching element and the second switching element to off state in the first control, and sets both of the first switching element and the second switching element to off states in the second control; and sequentially performs the first control and the third control for a time period in the third mode control, sets the one of the first switching element and the second switching element to on state and sets the remaining one of the first switching element and the second switching element to off state in the first control, and sets both of the first switching element and the second switching element to on states in the third control.

5. The power conversion apparatus according to claim 4, further comprising a voltage detection portion detecting a voltage on the output side as an output voltage, wherein, when the output voltage is lower than a reference value in the first mode control, the controller sets one of the first switching element and the second switching element to on state or off state alternately and maintains a remaining one of the first switching element and the second switching element in off state, when the output voltage is higher than the reference value in the first mode control, the controller sets each of the first switching element and the second switching element to on state or off state alternately under conditions that (i) on state duration of the first switching element is not overlapped with on state duration of the second switching element and (ii) a duty ratio of the first switching element and a duty ratio of the second switching element are set to be less than 50%, and the duty ratio is a ratio of the on state duration to one control cycle.

6. The power conversion apparatus according to claim 5, further comprising:

a current detection portion detecting a current value of the choke coil, wherein the controller controls the switching elements so that the current value of the choke coil becomes equal to a predetermined value in each of the first mode control, the second mode control, and the third mode control.

7. The power conversion apparatus according to claim 6, wherein the controller further includes a slope compensation portion that adds a sawtooth slope signal to the current value of the choke coil, the slope compensation portion does not add the slope signal to the current value of the choke coil in the first mode control and the second mode control, and the slope compensation portion adds the slope signal to the current value of the choke coil in the third mode control.

8. The power conversion apparatus according to claim 4, further comprising:

a voltage detection portion detecting a voltage on the output side as an output voltage, wherein the controller performs the first mode control when the output voltage is lower than a first predetermined value, the controller performs the second mode control when the output voltage is higher than the first predetermined value and lower than a second predetermined value which is set to be higher than the first predetermined value, and the controller performs the third mode control when the output voltage is higher than the second predetermined value.

9. The power conversion apparatus according to claim 4, further comprising:

a voltage detection portion detecting a voltage on the output side as an output voltage, wherein the controller performs the first mode control when the output voltage is lower than a predetermined value, and the controller performs the third mode control when the output voltage is higher than the predetermined value.

10. The power conversion apparatus according to claim 4, further comprising:

a voltage detection portion detecting a voltage on the output side as an output voltage, wherein the controller performs the second mode control when the output voltage is lower than a predetermined value, and the controller performs the third mode control when the output voltage is higher than the predetermined value.

11. The power conversion apparatus according to claim 4, further comprising:

a current detection portion detecting a current value of the choke coil, wherein the controller controls the switching elements so that the current value of the choke coil becomes equal to a predetermined value in each of the first mode control, the second mode control, and the third mode control.

12. The power conversion apparatus according to claim 11, wherein the controller further includes a slope compensation portion that adds a sawtooth slope signal to the current value of the choke coil, the slope compensation portion does not add the slope signal to the current value of the choke coil in the first mode control and the second mode control, and the slope compensation portion adds the slope signal to the current value of the choke coil in the third mode control.

13. The power conversion apparatus according to claim 4, wherein, in the first mode control, the controller maintains an increase amount of a magnetic flux accumulated in the choke coil in the first control to be larger than a decrease amount of the magnetic flux in the second control for a predetermined control cycle and provides a break period during which the second control is continued.

14. The power conversion apparatus according to claim 13, wherein the predetermined control cycle is equal to a time period of a predetermined number of control cycles.

15. The power conversion apparatus according to claim 13, further comprising:

a voltage detection portion detecting a voltage on the output side as an output voltage, wherein the controller reduces a length of the break period shorter with an increase of the output voltage.

16. The power conversion apparatus according to claim 13, further comprising:

a voltage detection portion detecting a voltage on the output side as an output voltage, wherein the controller increases a ratio of a period during which the first control is performed to one control cycle with an increase of the output voltage.

17. The power conversion apparatus according to claim 13, wherein a length of the break period is set so that a current flowing through the choke coil decrease to zero.

18. The power conversion apparatus according to claim 13, wherein
an upper limit is preliminarily set for a ratio of a period during which the first control is performed to one control cycle, and
when the ratio of the period during which the first control is performed to one control cycle is set to be equal to the upper limit and a current flowing through the choke coil decreases to zero by the second control, the controller does not provide the break period.

19. The power conversion apparatus according to claim 13, further comprising:
a current detection portion detecting a current value of the choke coil,
wherein the controller performs the third mode control so that the current value of the choke coil becomes equal to a command value.

20. The power conversion apparatus according to claim 4, wherein,
in the first mode control, the controller sets a length of one control cycle of the first mode control so that a current flowing through the choke coil becomes equal to a predetermined value in the first control and the current flowing through the choke coil decreases to zero when the second control is switched to the first control.

21. The power conversion apparatus according to claim 4, further comprising:
a current transformer detecting a current using a transformer,
wherein the current transformer is disposed between a connection point at which the output side circuit is connected with the auxiliary coil and the power conversion circuit.

22. The power conversion apparatus according to claim 4, further comprising:
a current transformer detecting a current using a transformer, wherein
the current transformer is disposed between a connection point at which the output side circuit is connected with the auxiliary coil and the power conversion circuit, and
the controller controls each of the switching elements so that a peak value of the current that is detected becomes equal to a predetermined value in at least one of the first mode control or the second mode control.

23. The power conversion apparatus according to claim 4, further comprising:
a current transformer detecting a current using a transformer, wherein
the current transformer is disposed between a connection point at which the output side circuit is connected with the auxiliary coil and the power conversion circuit, and
the controller controls each of the switching elements so that an average value of the current that is detected becomes equal to a predetermined value in the third mode control.

* * * * *